O. A. WHEELER.
METHOD AND MACHINE FOR MAKING CUFFS AUTOMATICALLY.
APPLICATION FILED MAY 10, 1915.

1,305,510.

Patented June 3, 1919.
31 SHEETS—SHEET 1.

O. A. WHEELER.
METHOD AND MACHINE FOR MAKING CUFFS AUTOMATICALLY.
APPLICATION FILED MAY 10, 1915.

1,305,510.

Patented June 3, 1919.
31 SHEETS—SHEET 2.

Witnesses:
F. A. Bullington
W. Streng

Omar A. Wheeler
Inventor.

Attorney

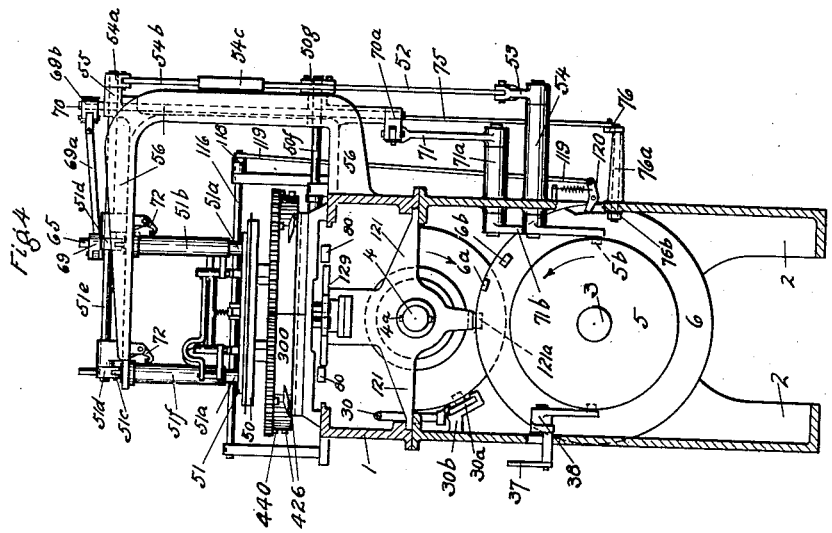
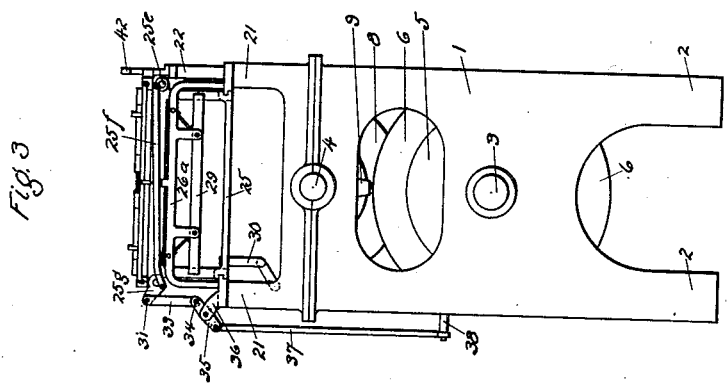

O. A. WHEELER.
METHOD AND MACHINE FOR MAKING CUFFS AUTOMATICALLY.
APPLICATION FILED MAY 10, 1915.

1,305,510.

Patented June 3, 1919.
31 SHEETS—SHEET 4.

Witnesses:
F. A. Bullington
W. Streng

Omar A. Wheeler
Inventor.

Attorney.

O. A. WHEELER.
METHOD AND MACHINE FOR MAKING CUFFS AUTOMATICALLY.
APPLICATION FILED MAY 10, 1915.

1,305,510.

Patented June 3, 1919.
31 SHEETS—SHEET 5.

O. A. WHEELER.
METHOD AND MACHINE FOR MAKING CUFFS AUTOMATICALLY.
APPLICATION FILED MAY 10, 1915.
1,305,510.
Patented June 3, 1919.
31 SHEETS—SHEET 6.
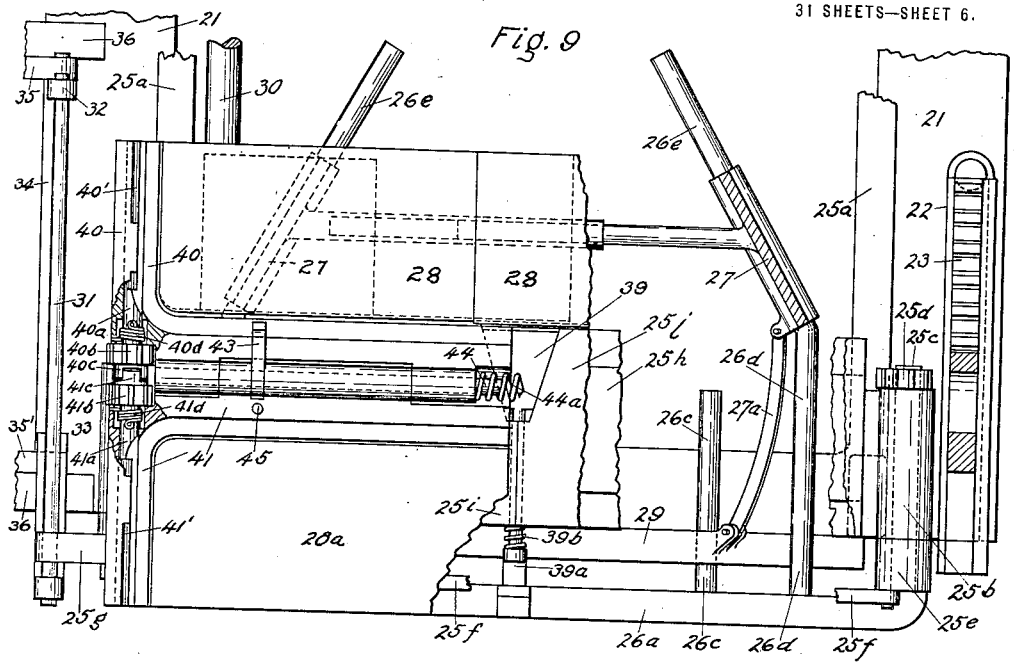
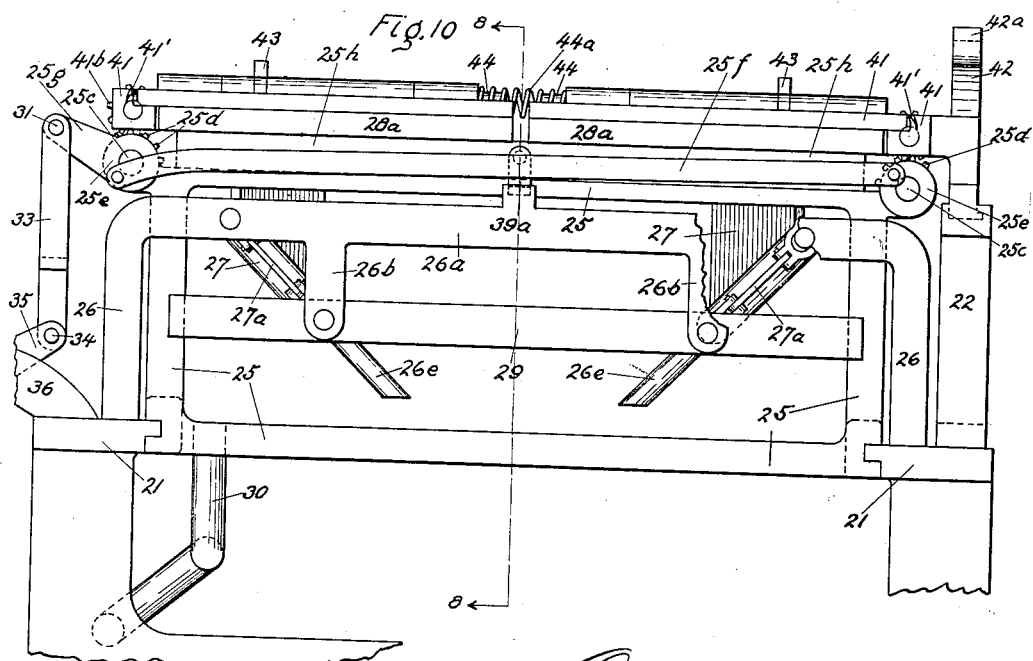
Witnesses:
F. A. Bullington
W. Streng.
Omar A. Wheeler
Inventor.
D. Fitzenberg
Attorney.

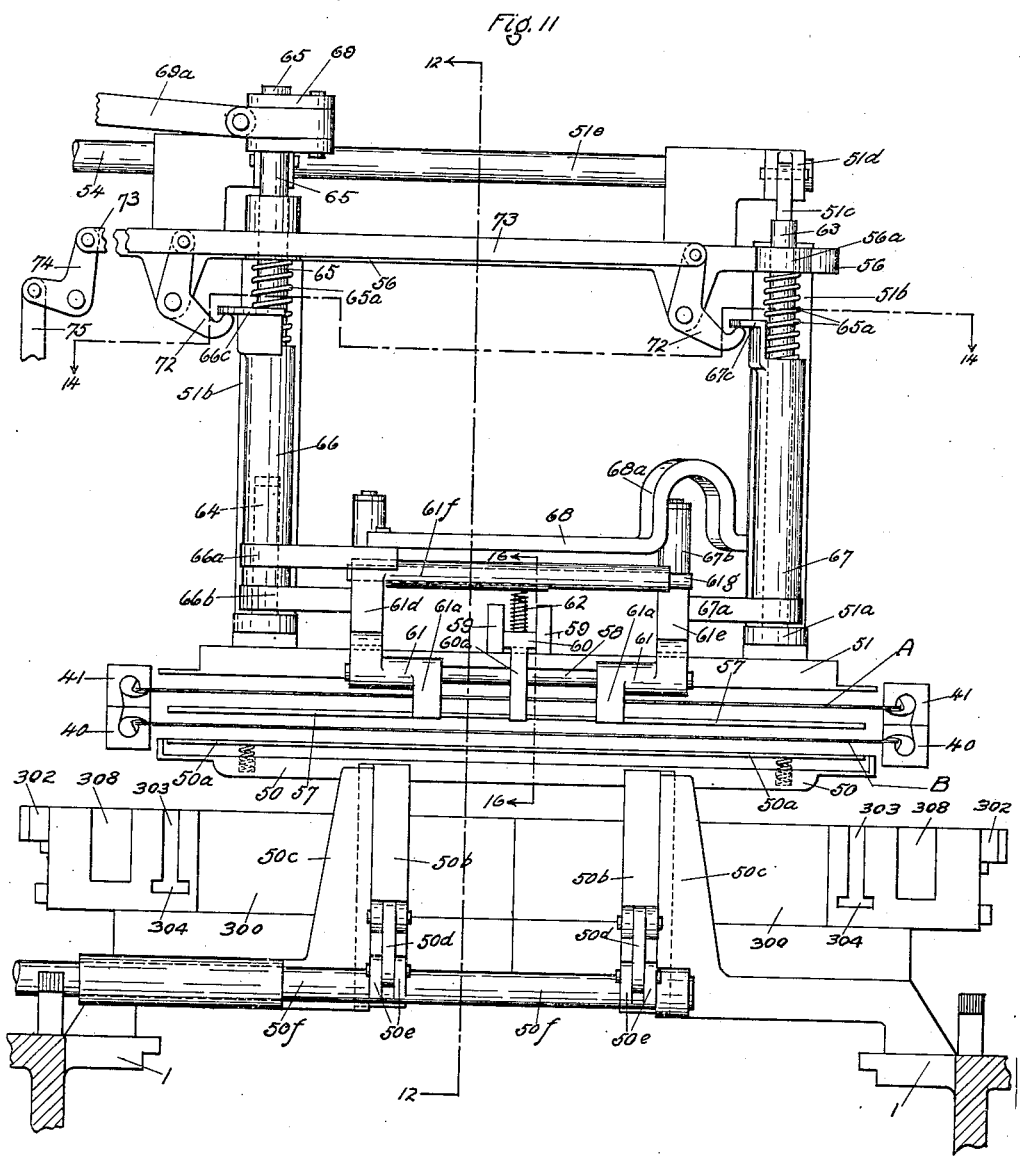

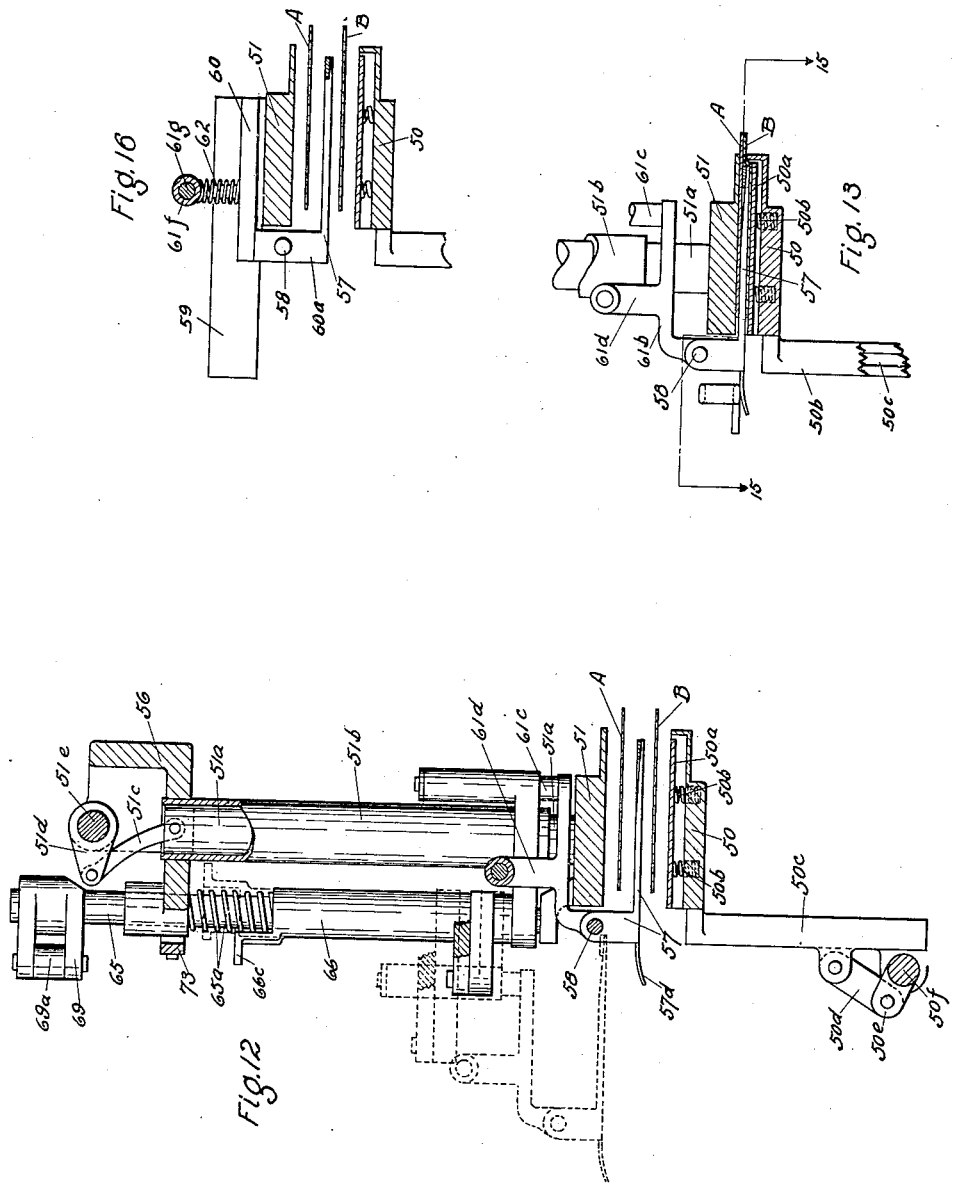

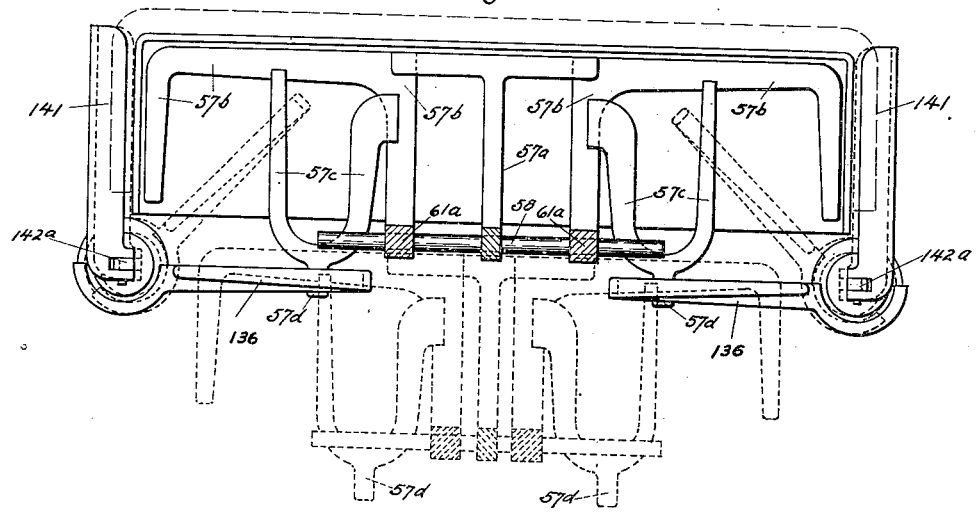

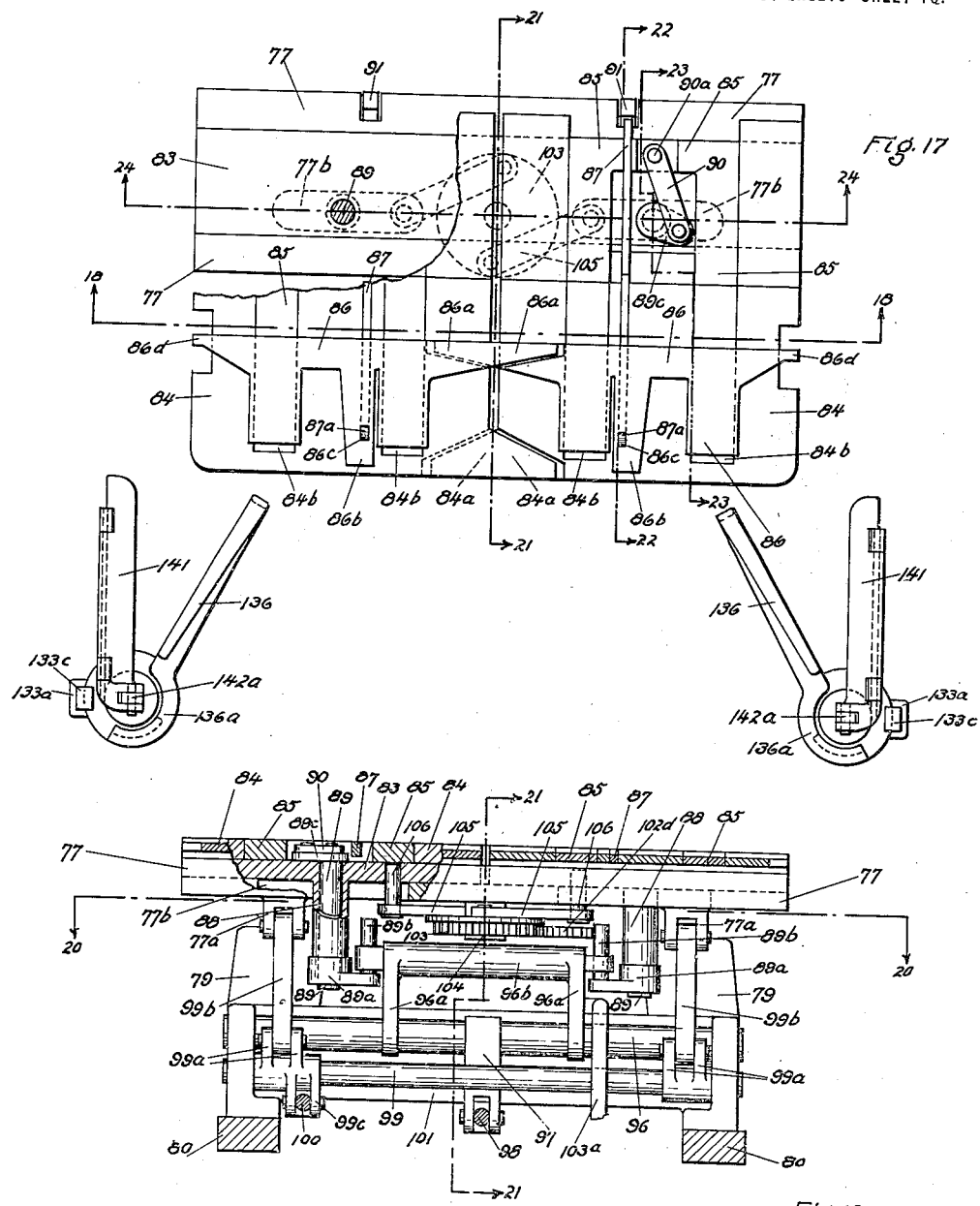

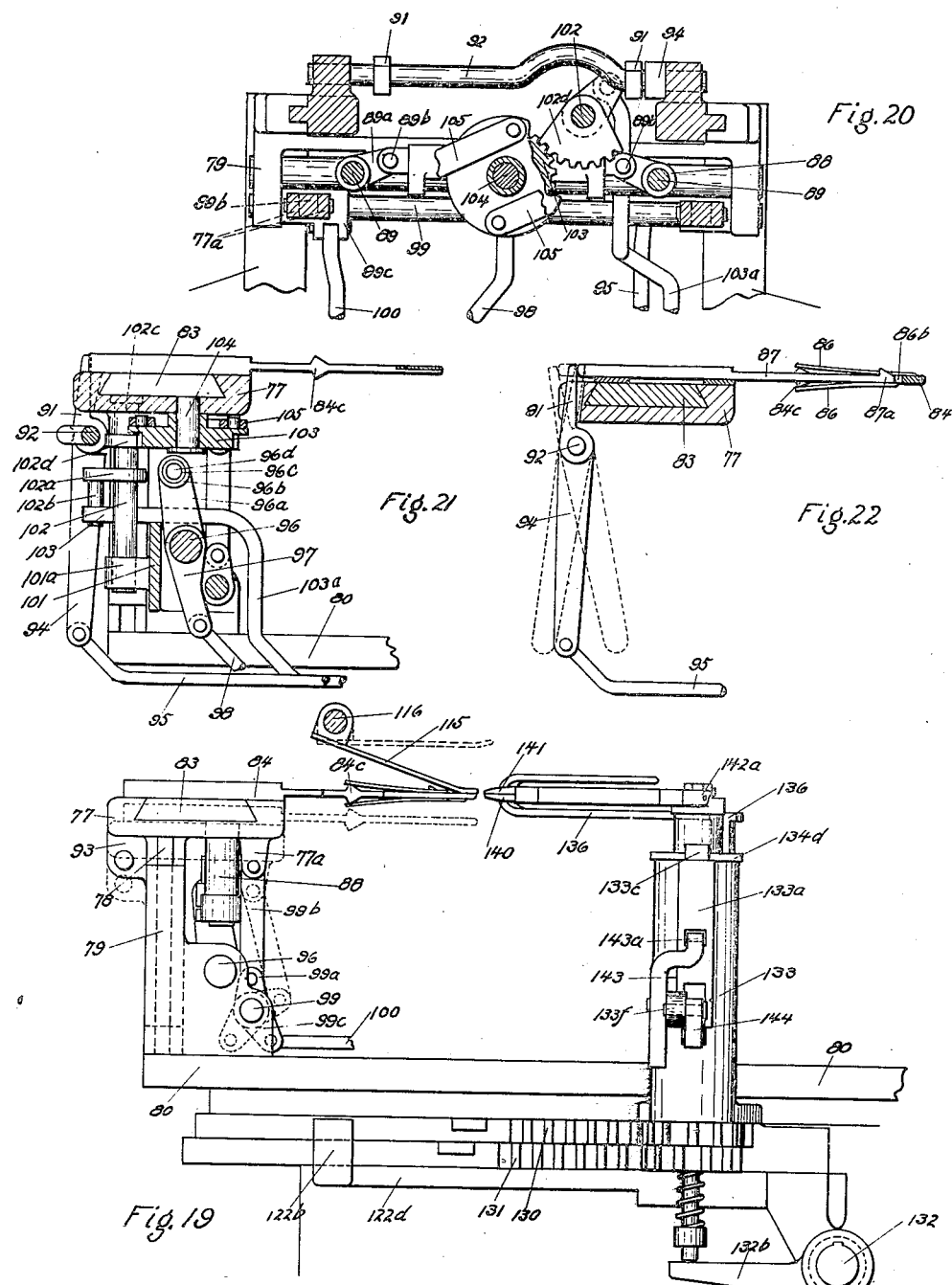

O. A. WHEELER.
METHOD AND MACHINE FOR MAKING CUFFS AUTOMATICALLY.
APPLICATION FILED MAY 10, 1915.

1,305,510.

Patented June 3, 1919.
31 SHEETS—SHEET 12.

Witnesses:
F. A. Bullington
N. Sheng

Omar A. Wheeler
Inventor.
Attorney.

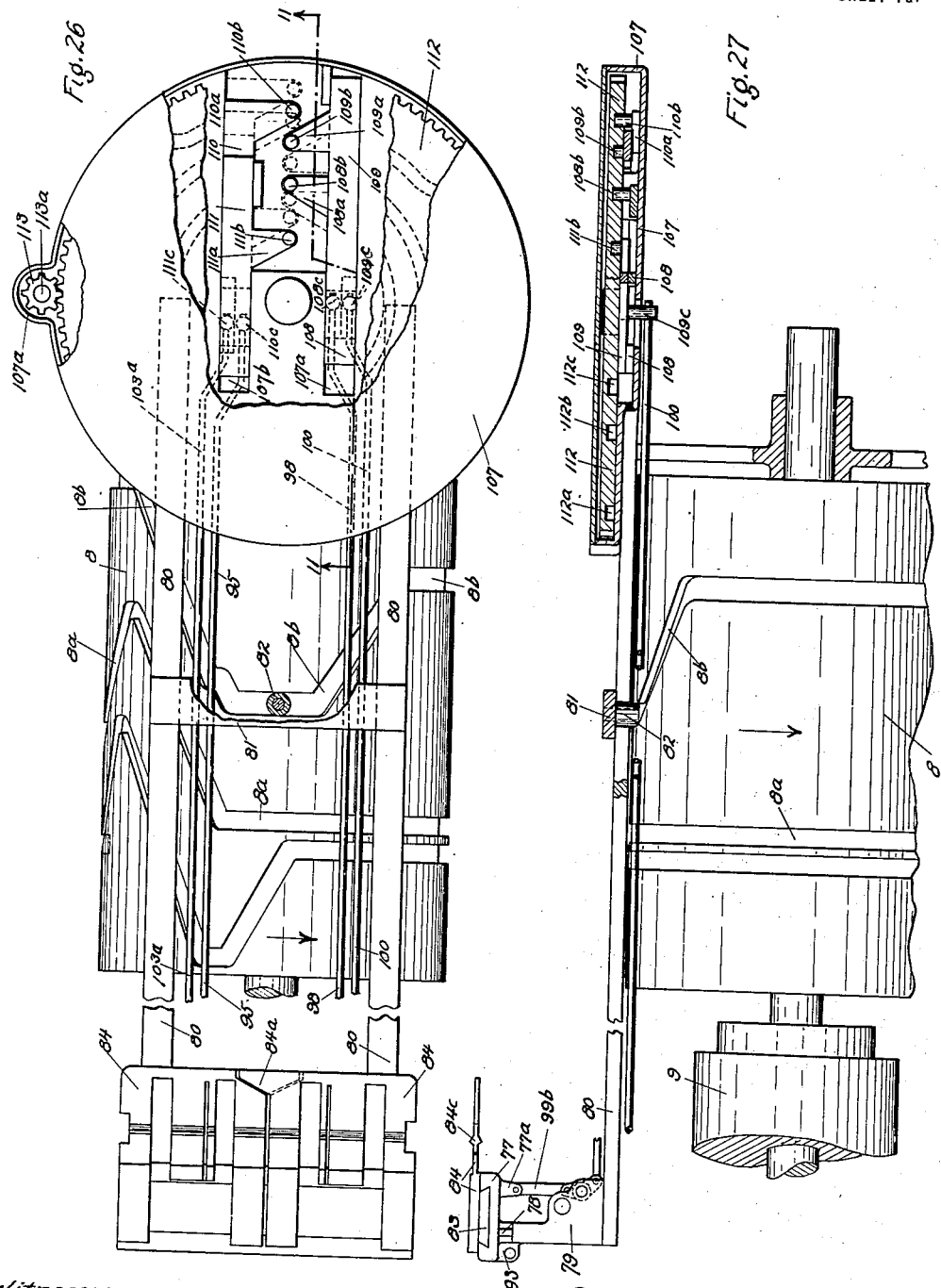

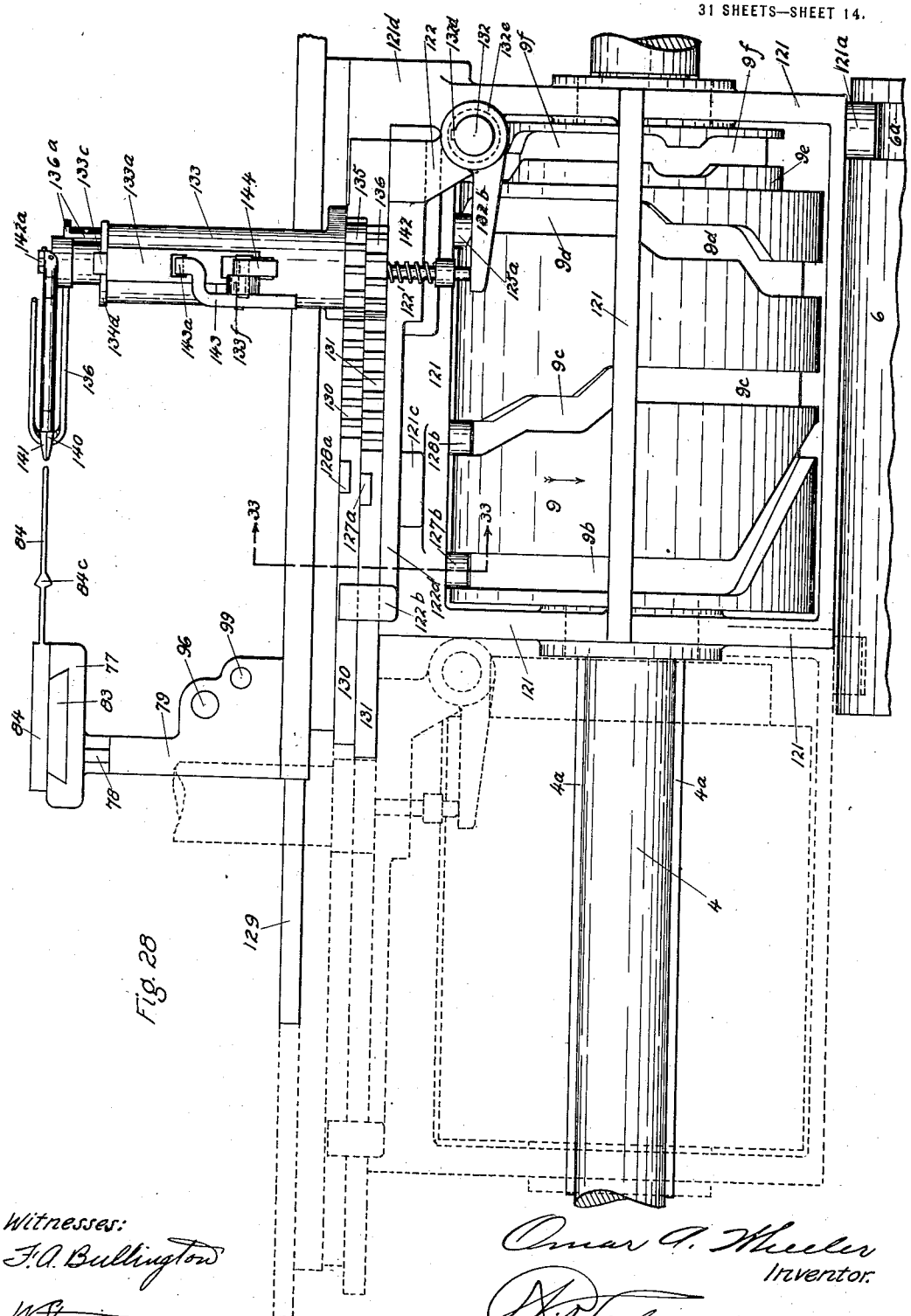

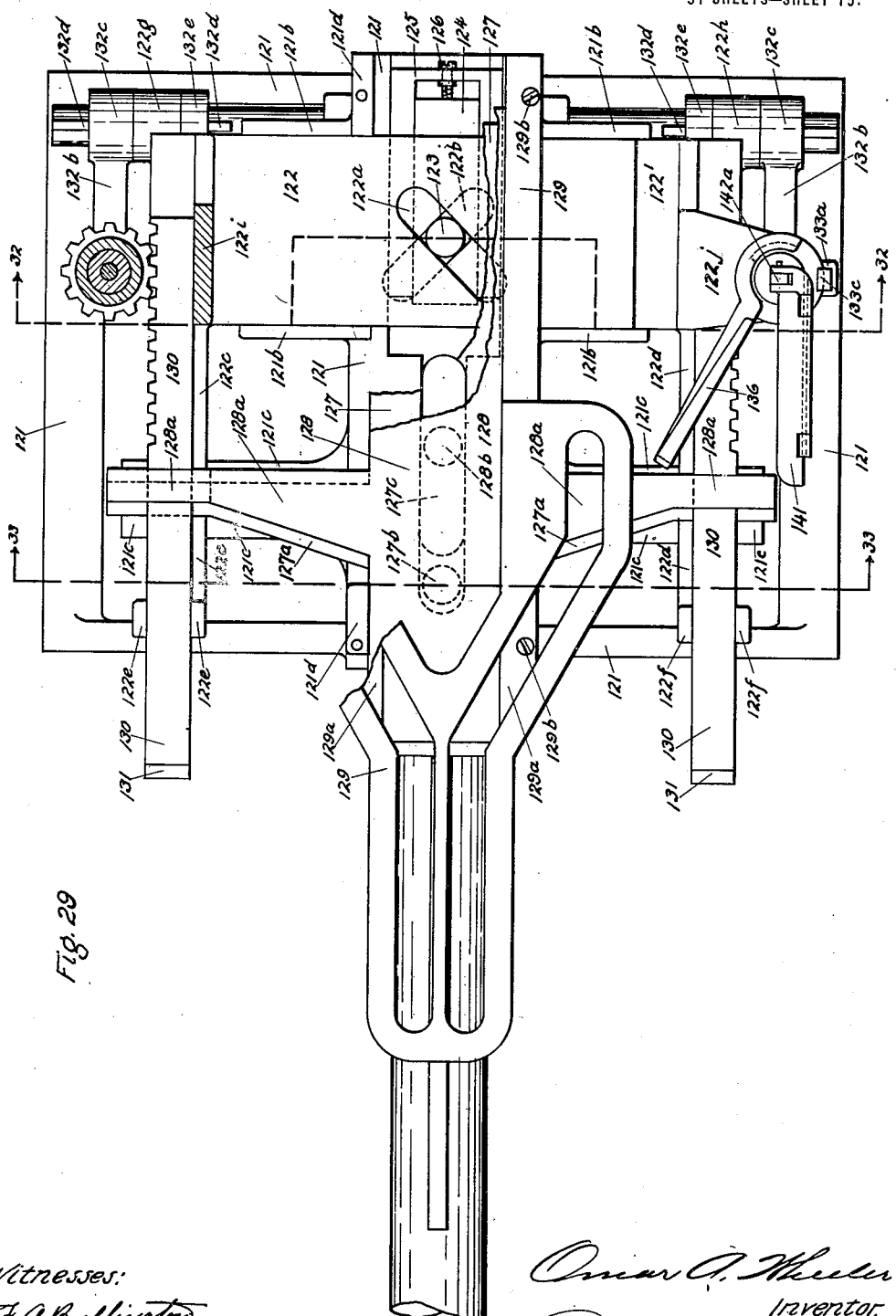

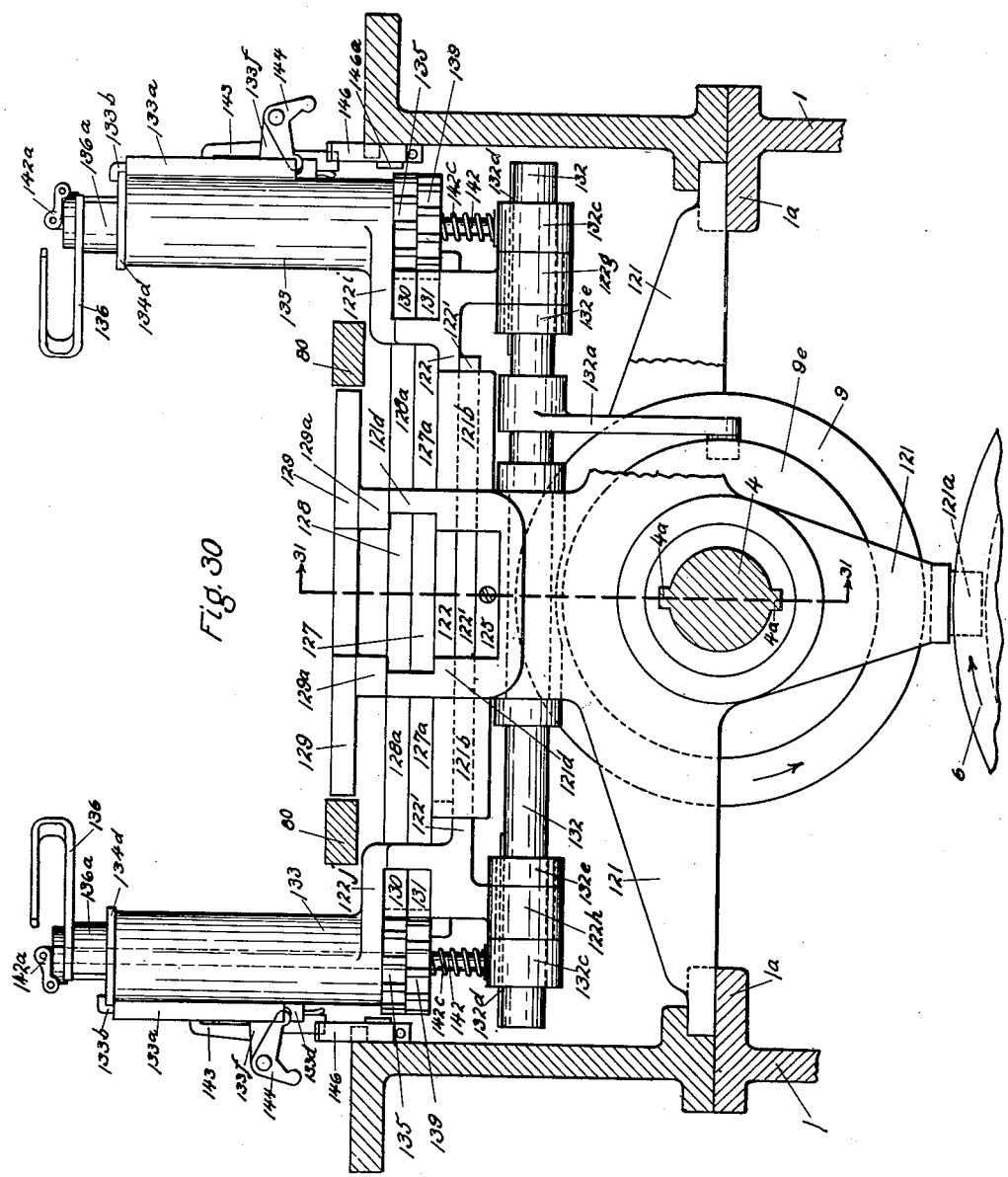

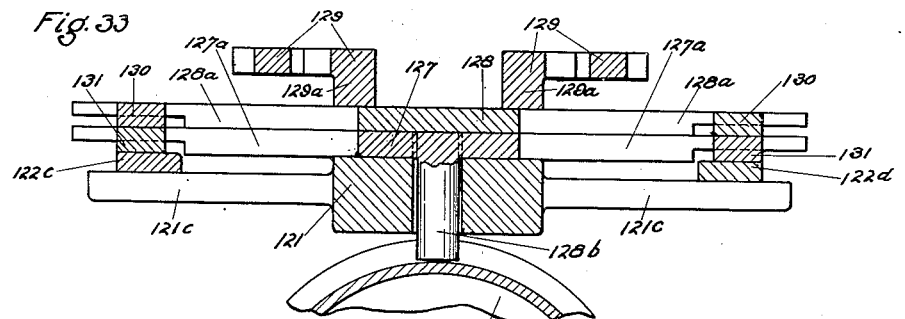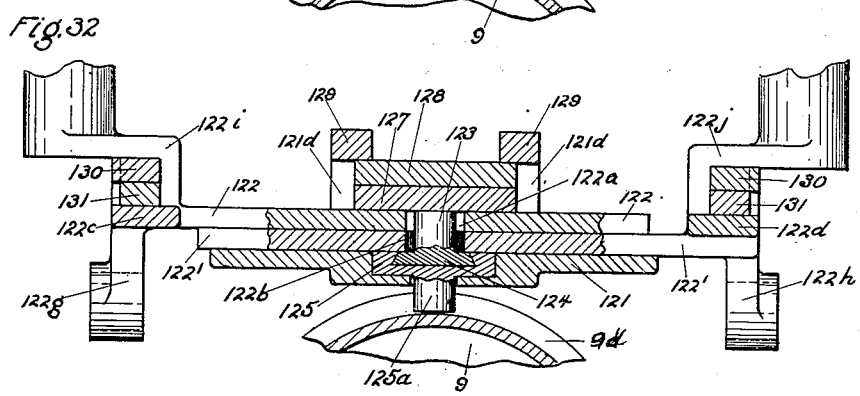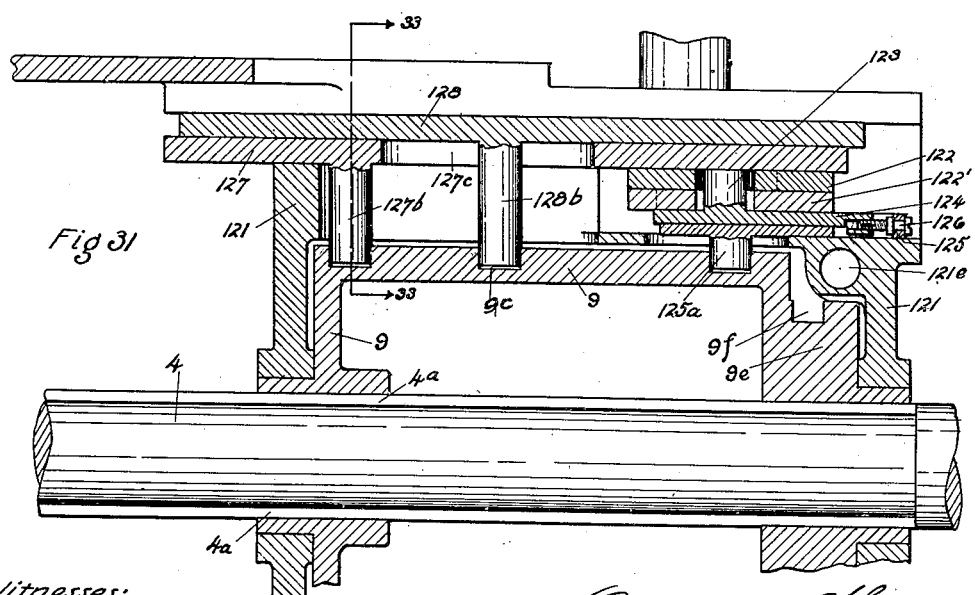

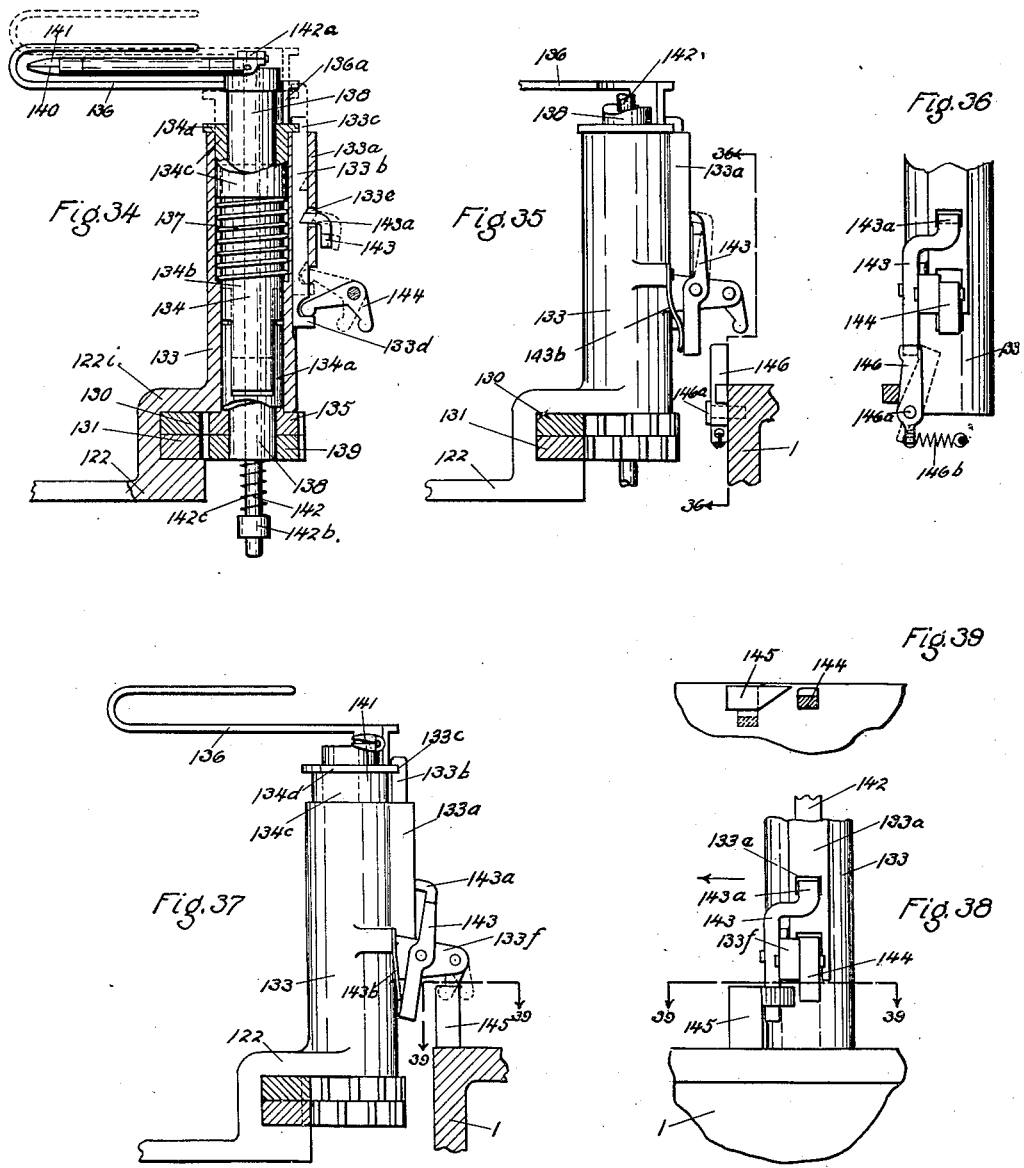

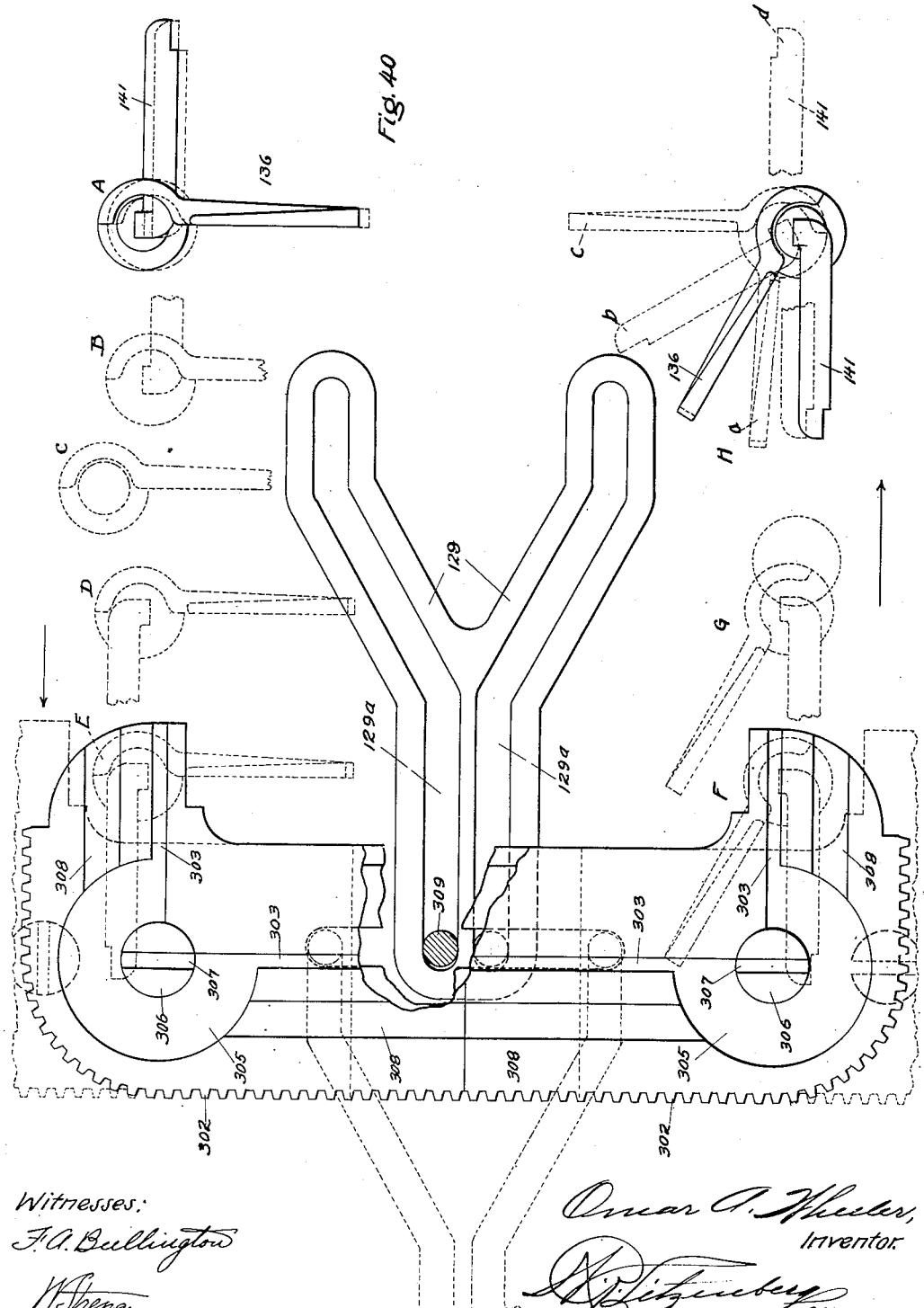

O. A. WHEELER.
METHOD AND MACHINE FOR MAKING CUFFS AUTOMATICALLY.
APPLICATION FILED MAY 10, 1915.

1,305,510.

Patented June 3, 1919.
31 SHEETS—SHEET 20.

Witnesses:

Omar A. Wheeler,
Inventor.

Attorney.

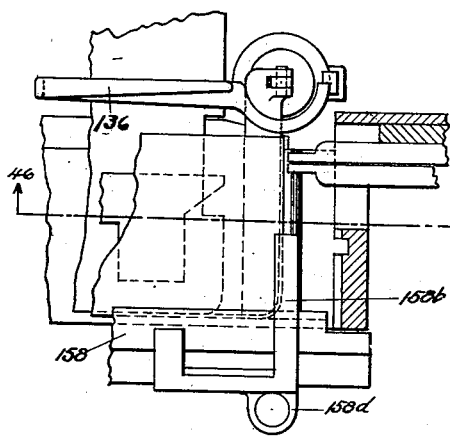
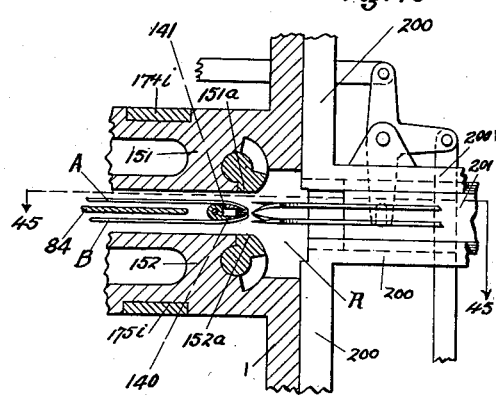
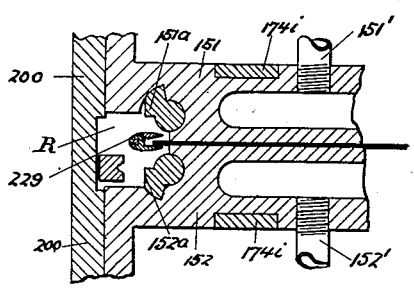
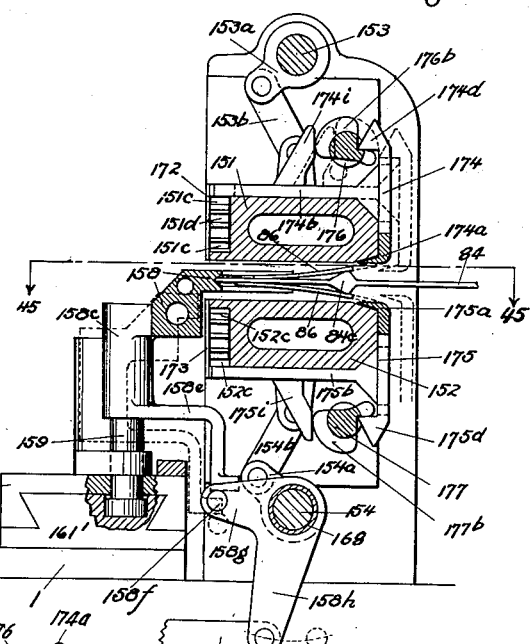
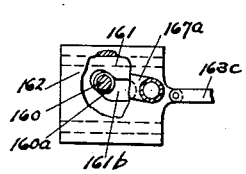
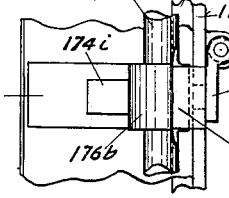

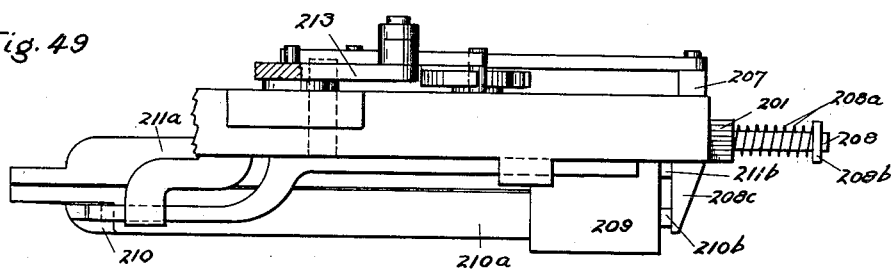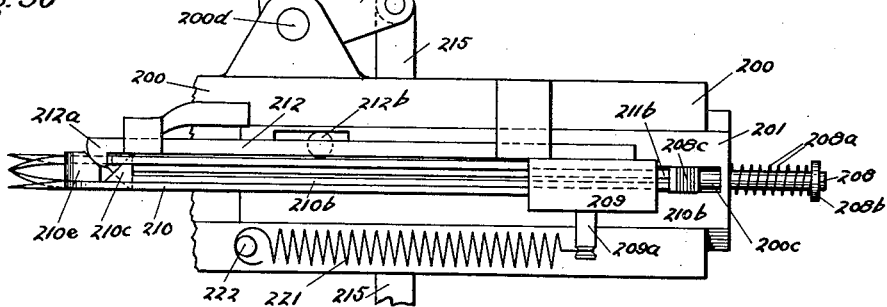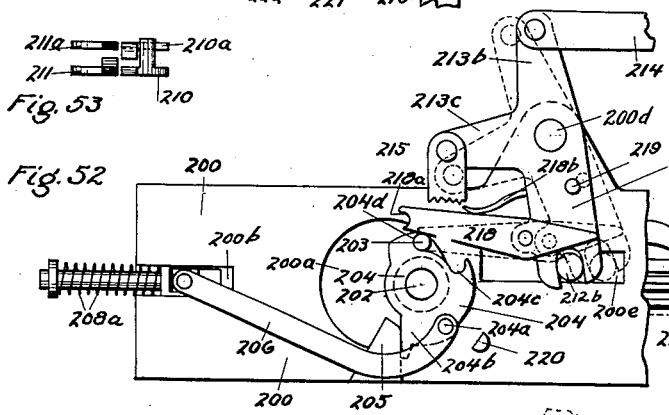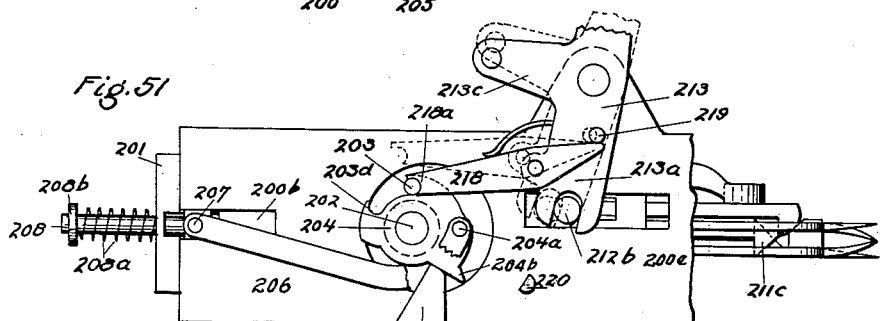

O. A. WHEELER.
METHOD AND MACHINE FOR MAKING CUFFS AUTOMATICALLY.
APPLICATION FILED MAY 10, 1915.
1,305,510.
Patented June 3, 1919.
31 SHEETS—SHEET 23.
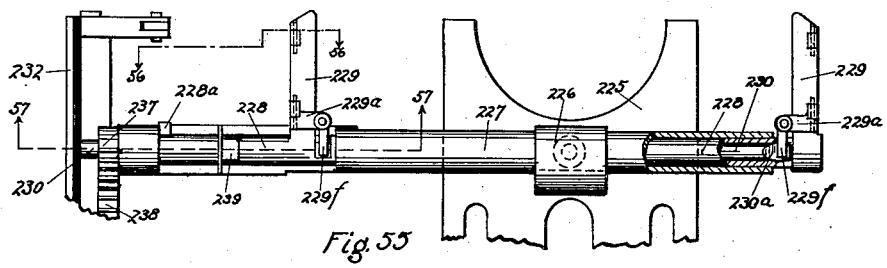
Fig. 55
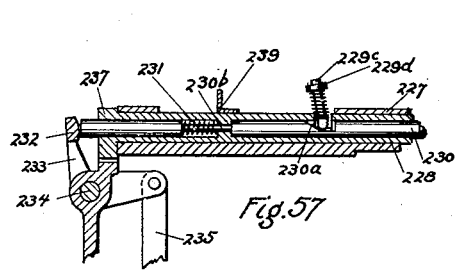
Fig. 57
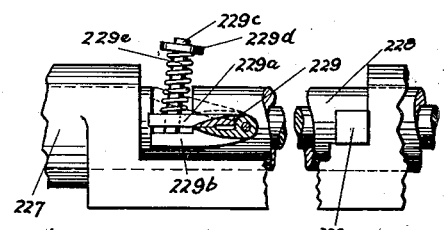
Fig. 56
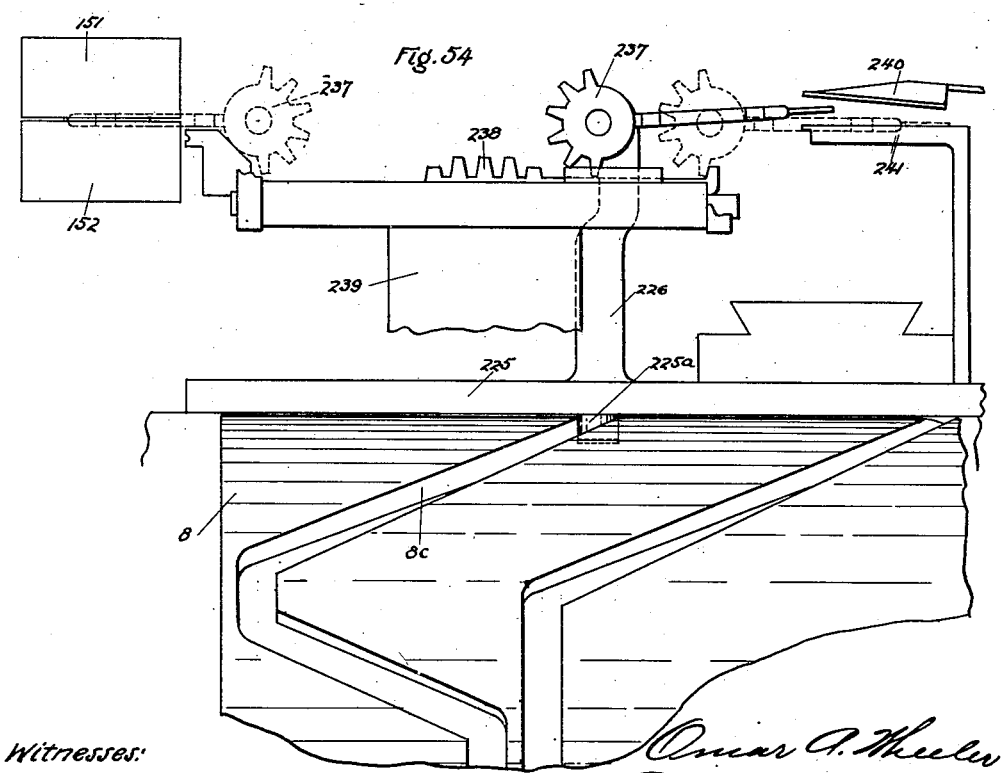
Witnesses:
F. A. Bullington
N. Strong
Omar A. Wheeler
Inventor
Attorney.

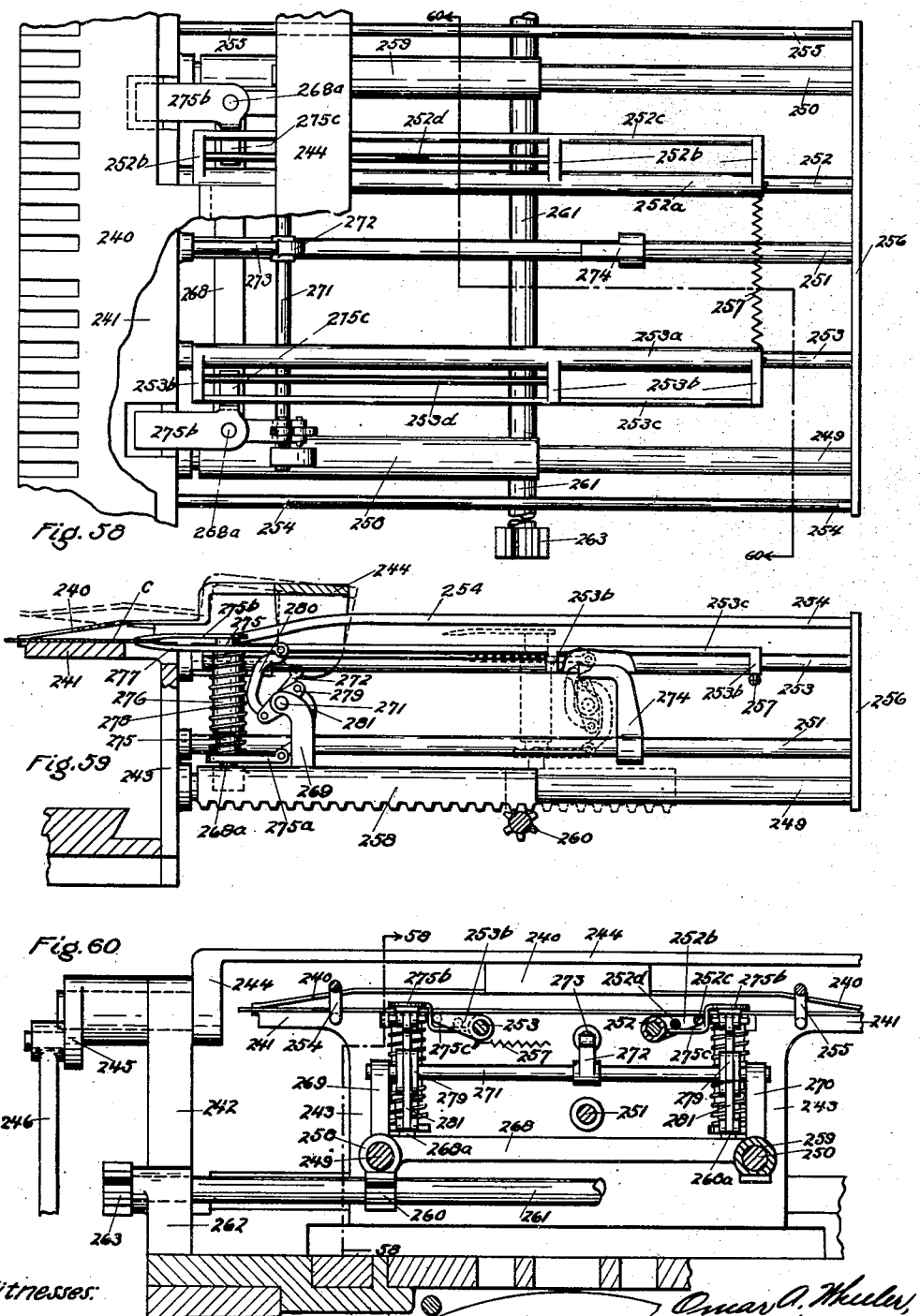

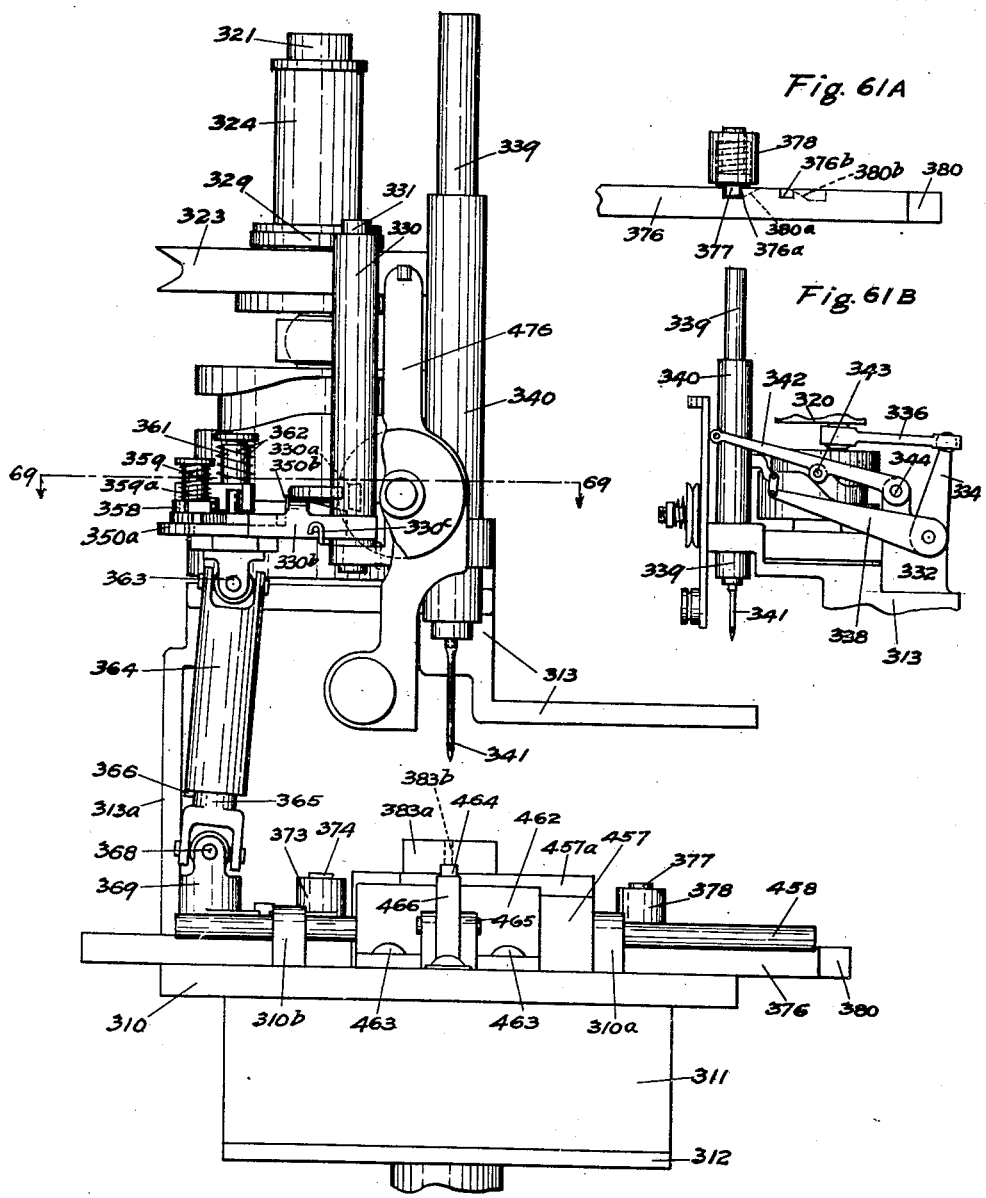

O. A. WHEELER.
METHOD AND MACHINE FOR MAKING CUFFS AUTOMATICALLY.
APPLICATION FILED MAY 10, 1915.

1,305,510.

Patented June 3, 1919.
31 SHEETS—SHEET 26.

Witnesses:

Inventor:

Attorney.

O. A. WHEELER.
METHOD AND MACHINE FOR MAKING CUFFS AUTOMATICALLY.
APPLICATION FILED MAY 10, 1915.

1,305,510.

Patented June 3, 1919.
31 SHEETS—SHEET 28.

Witnesses:
F. A. Bullington
M. Stong.

Oscar A. Wheeler,
Inventor.
Attorney.

O. A. WHEELER.
METHOD AND MACHINE FOR MAKING CUFFS AUTOMATICALLY.
APPLICATION FILED MAY 10, 1915.
1,305,510.
Patented June 3, 1919.
31 SHEETS—SHEET 29.
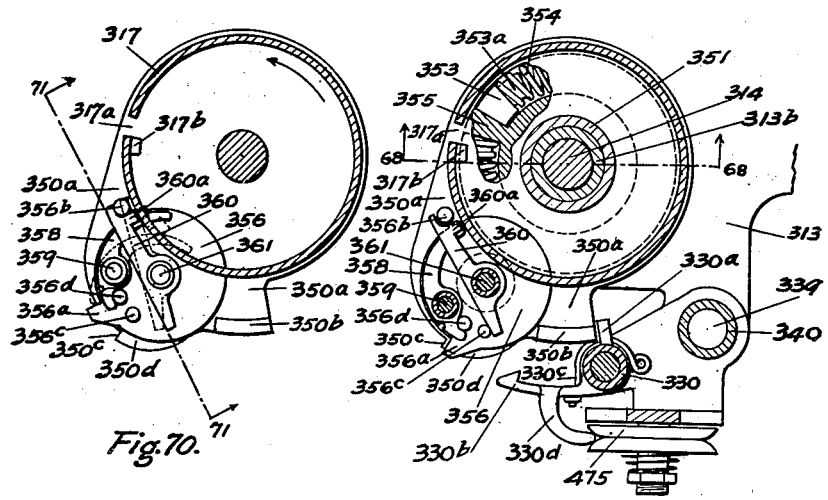
Fig. 69.
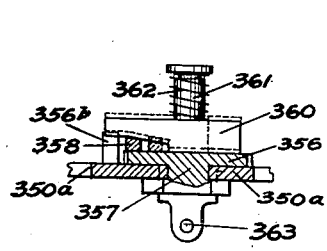
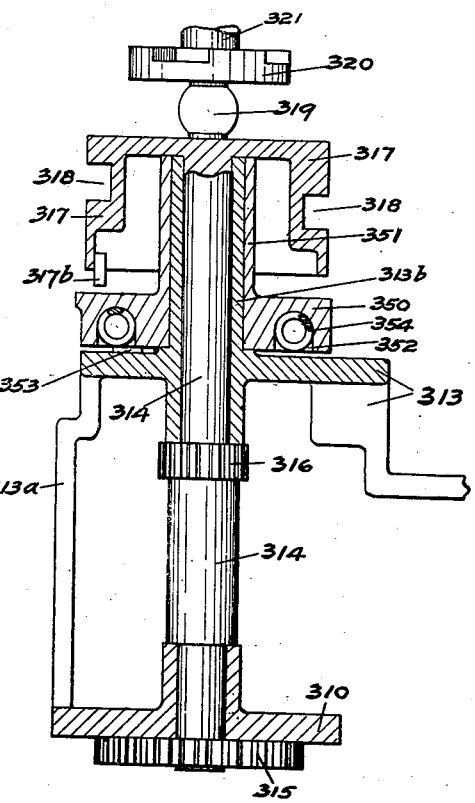
Witnesses:
F. A. Bullington
H. H. Theng
Omar A. Wheeler
Inventor,
Attorney.

O. A. WHEELER.
METHOD AND MACHINE FOR MAKING CUFFS AUTOMATICALLY.
APPLICATION FILED MAY 10, 1915.

1,305,510.

Patented June 3, 1919.
31 SHEETS—SHEET 30.

Witnesses:

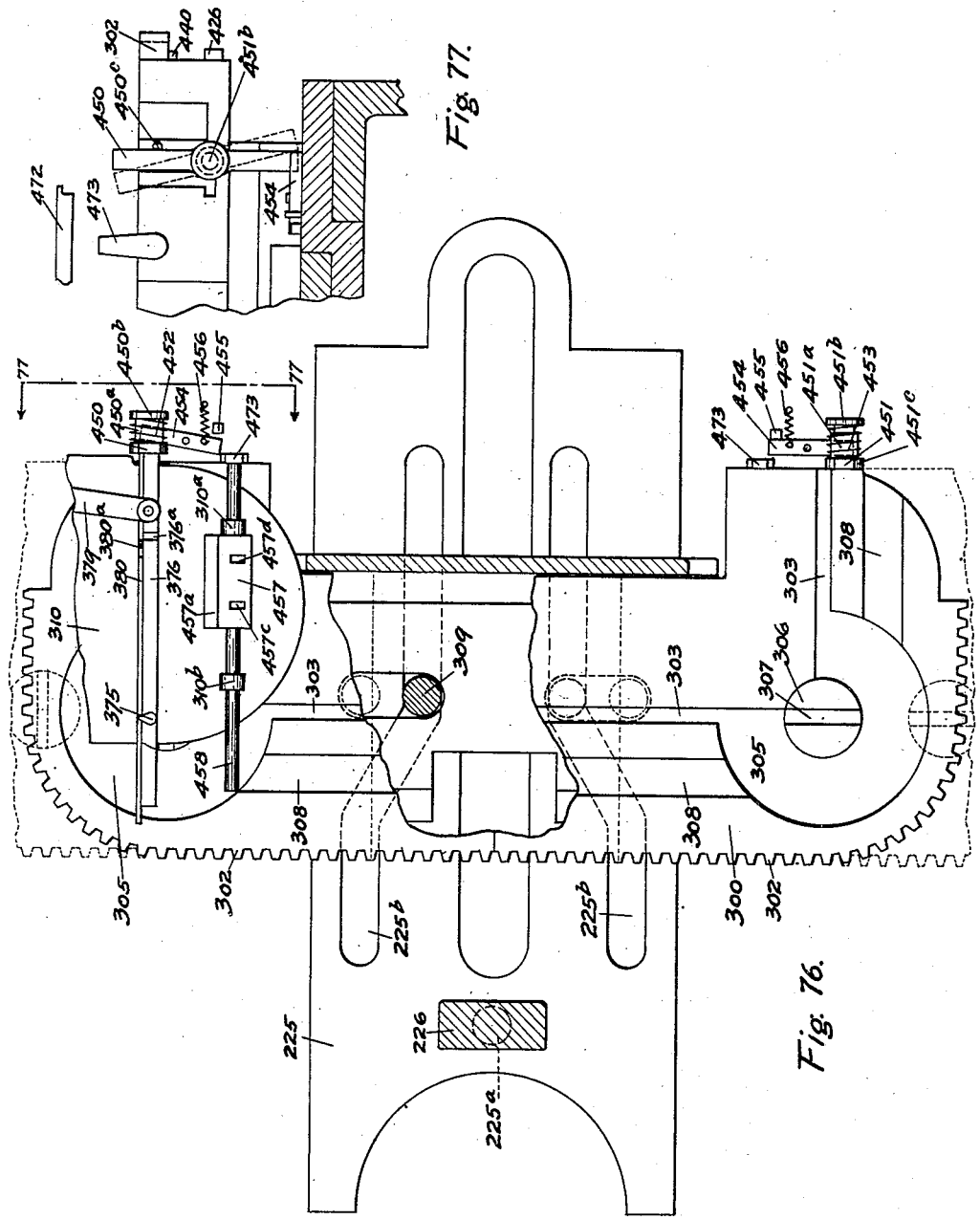

UNITED STATES PATENT OFFICE.

OMAR A. WHEELER, OF PORTLAND, OREGON, ASSIGNOR, BY DIRECT AND MESNE ASSIGNMENTS, TO WHEELER AUTOMATIC MACHINE CO., A CORPORATION OF OREGON.

METHOD AND MACHINE FOR MAKING CUFFS AUTOMATICALLY.

1,305,510.          Specification of Letters Patent.        Patented June 3, 1919.

Application filed May 10, 1915. Serial No. 27,124.

*To all whom it may concern:*

Be it known that I, OMAR A. WHEELER, a citizen of the United States, residing in the city of Portland, county of Multnomah, and State of Oregon, have invented certain new and useful Improvements in Methods and Machines for Making Cuffs Automatically, of which the following is a specification.

My invention relates to improvements in methods and machines for making cuffs automatically, although it is to be understood that it can be embodied in machines for making other articles of manufacture which are made of a plurality of plies of materials.

The principal object of my invention is to provide a machine which will do the complete job of making a cuff, or other similar article, out of material blanks fed thereinto, and do it mechanically and automatically, so that when the material blanks are fed thereinto at one place they will be delivered therefrom as a finished cuff, all sewed, turned, pressed, and re-sewed, and ready for attachment to a sleeve. After a number of years of study and expensive experimental work, I have produced a successful machine of the character above referred to.

Among the other objects of my invention are,—to provide in a machine of the character referred to, mechanism which will automatically grip the blanks or plies of material as placed therein, automatically stretch them, and automatically insert them into clamping members which are automatically closed thereupon, leaving the edges thereof at the ends and one side projecting therefrom sufficiently to be sewed; to provide in combination therewith a traveling sewing mechanism adapted to be automatically moved into operative position and started on a course of travel around the exposed edges of the blanks, sewing them together as it moves; to provide such a sewing mechanism which will do a neat and uniform job, making its stitches of the same uniform length around the corners of the cuff as they are along the straight edges thereof; to provide in such a sewing mechanism means for automatically stopping the same with the needle raised so as to permit the removal of the cuff; to provide mechanism for automatically giving a certain fullness to one side of the cuff as it is thus sewed, so that when the cuff is turned the seam will not be right at the edge of the cuff but will be a little farther in on one side of the cuff so as not to be visible from the outer or right side thereof; to provide mechanism for automatically releasing the clamping members with means for automatically turning the cuff inside out as it is removed from the clamping members after the first sewing operation and for passing it forwardly in the machine with a follower inserted automatically thereinto and moved forwardly therewith for the purpose of stretching the turned cuff as it is passed into a pressing mechanism, with means for turning the rear edges of the blanks or plies inwardly and then pressing the same; to provide means for heating said pressing mechanism; to provide transfer mechanism adapted to grip the ends of the cuff and to remove them from the pressing mechanism and transfer them to a second pair of sewing clamps which automatically close thereupon, leaving the edges exposed as before for a second sewing operation; to provide a second traveling sewing machine adapted to be automatically put into operation for sewing the edges of the cuff as before; and to provide means for removing the sewed cuff from the sewing clamps and delivering it from the machine in finished condition.

Other objects and advantages will be apparent from the following description of one practical embodiment of my invention, taken with the accompanying drawings illustrating the same, and in which,—

Figure 1 is a side elevation of a machine embodying my invention, as seen on the right hand side thereof;

Figures 1$^A$ and 1$^B$ show, respectively, the shape of the material blanks from which a cuff is to be made, and side and cross-sectional views of a finished cuff, as delivered from the machine;

Fig. 3 is a front end elevation of the machine showing only those parts to the left of the line 4—4 on Fig. 1;

Fig. 4 is a vertical sectional view taken on said line 4—4 of Fig. 1;

Fig. 9 is a plan view of the feeder, with parts broken away to show the otherwise hidden mechanism;

Fig. 10 is a front elevation of the feeder;

Fig. 11 is a rear elevation of the clamping mechanism for receiving the material blanks from the feeding mechanism and for holding them together for the first sewing operation;

Fig. 12 is a vertical sectional view thereof taken on line 12—12 of Fig. 11;

Fig. 13 is a partial similar view, but showing the holding clamps closed with the material blanks therein ready for the first sewing:

Fig. 14 is a horizontal sectional view taken on line 14—14 of Fig. 11;

Fig. 15 is a top plan view of a filler member which is automatically inserted between the plies, or material blanks, as they are placed between the holding clamps before the latter are closed;

Fig. 16 is a vertical sectional view taken on line 16—16 of Fig. 11;

Fig. 17 is a top plan view of the follower plate, with parts broken away, showing it in position to hold the sewed edge of a cuff while the turning clamps and loops start the turning operation, after which said follower plate moves into the cuff to complete the turning operation and to stretch the turned cuff;

Fig. 18 is a vertical sectional view of the follower plate mechanism, taken on line 18—18 of Fig. 17;

Fig. 19 is a side elevation of the follower plate and turning mechanism, taken at the left side of Fig. 17;

Fig. 20 is a horizontal sectional view taken on line 20—20 Fig. 18;

Fig. 21 is a vertical sectional view taken on line 21—21 of Figs. 17 and 18;

Fig. 22 is a fragmentary vertical sectional view taken on line 22—22 of Fig. 17, showing the action of the finger clamps, constituting a part of the follower plate, for clamping the sewed edge of the cuff down on to the body of the follower plate;

Fig. 26 is a top plan view of said follower plate and its operating mechanism, with parts broken away;

Fig. 27 is a side elevation of the part shown in Fig. 26, partly in vertical section;

Fig. 28 is a side elevation of the turning mechanism, on the inside of the main frame, showing the cams which operate the same, and also showing the follower plate and its supporting means;

Fig. 29 is a top plan view of Fig. 28 with the follower plate omitted, and with certain parts broken away to show otherwise hidden parts, with other parts shown in sections;

Fig. 30 is an end view at the right hand end of Fig. 28, showing the turning operating mechanism;

Fig. 31 is a vertical longitudinal sectional view, taken on line 31—31 of Fig. 30, with parts broken away;

Fig. 32 is a vertical cross-sectional view taken on line 32—32 of Fig. 29;

Fig. 33 is a similar view taken on line 33—33 of Figs. 28 and 29;

Fig. 34 is a vertical sectional view of one of the turning members, which operates at one end of the cuff;

Fig. 35 is a side elevation of said mechanism, as it appears during the turning operation;

Fig. 36 is a side elevation thereof, from the right hand side of Fig. 35, as seen from line 36—36 on Fig. 35;

Fig. 37 is a side elevation similar to that shown in Fig. 35, but at the other end of its course of travel, and as it is about to receive a cuff from the sewing machine clamp;

Fig. 38 is a fragmentary side elevation thereof at right angles to the view shown in Fig. 37;

Fig. 39 is a fragmentary horizontal sectional view taken on line 39—39 of Figs. 37 and 38;

Fig. 40 is a diagrammatic view showing a Y-shaped cam plate, and the various successive positions of the turning members during the turning operation.

Figure 42:
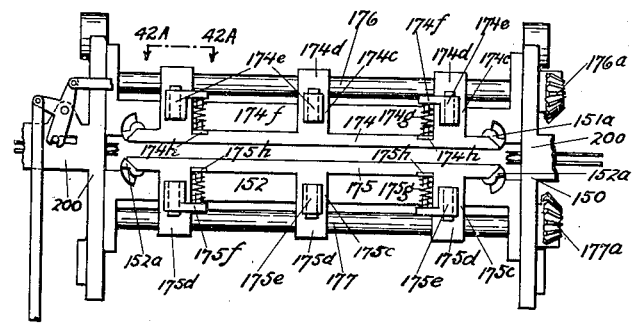
Fig. 42 is a partial front view of the same mechanism.
Figure 43:
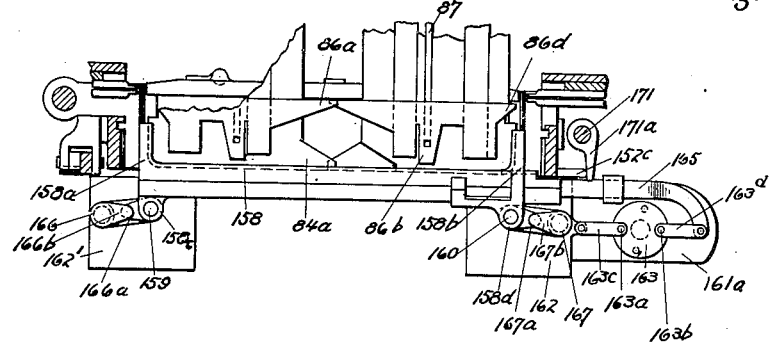
Figure 41:
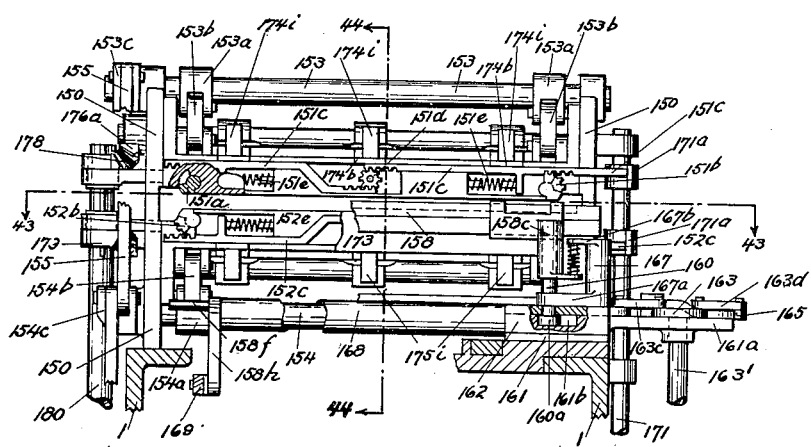
Fig. 41 is a rear view of the infolding and pressing mechanism.

Fig. 42ᴬ is a fragmentary top plan view, on an enlarged scale, taken at line A—A, Fig. 42;

Fig. 43 is a horizontal sectional view taken on the line 43—43 of Fig. 41, with parts broken away, and including a fragmentary portion of the follower member;

Fig. 44 is a vertical sectional view taken on line 44—44 of Fig. 41, on a larger scale;

Fig. 45 is a top plan view of the lower presser member, showing part of the follower plate and one of the turner transfer members associated therewith, as when inserted in the cuff, said view being taken on line 45—45 of Fig. 46;

Fig. 46 is a vertical sectional view taken on line 46—46 of Fig. 45;

Fig. 47 is a fragmentary vertical sectional view of the presser members, showing a transfer member about to grip the cuff to remove the same;

Fig. 48 is a plan view of a detail with a part broken out to show construction.

Figure 62:
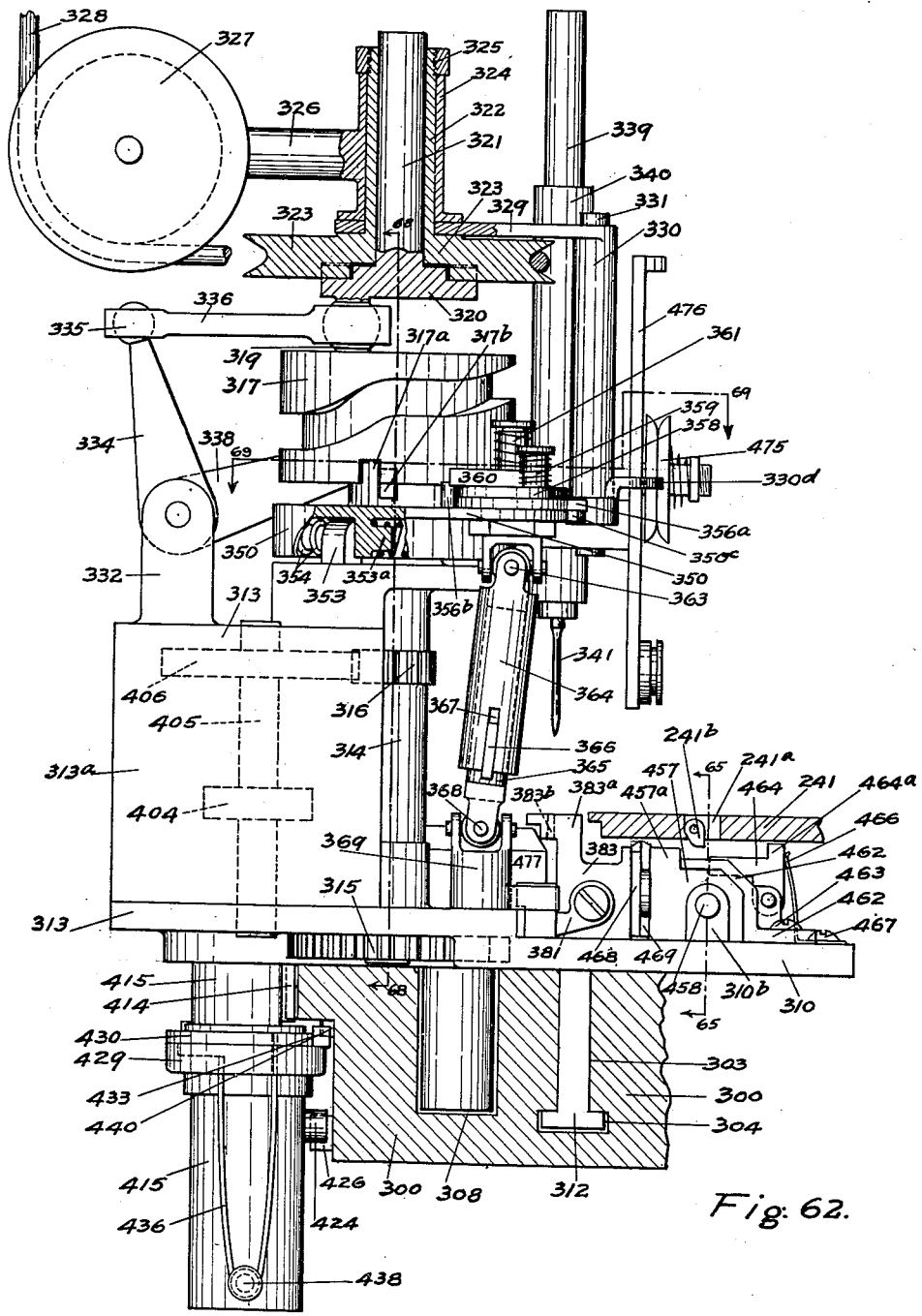
Figure 63:
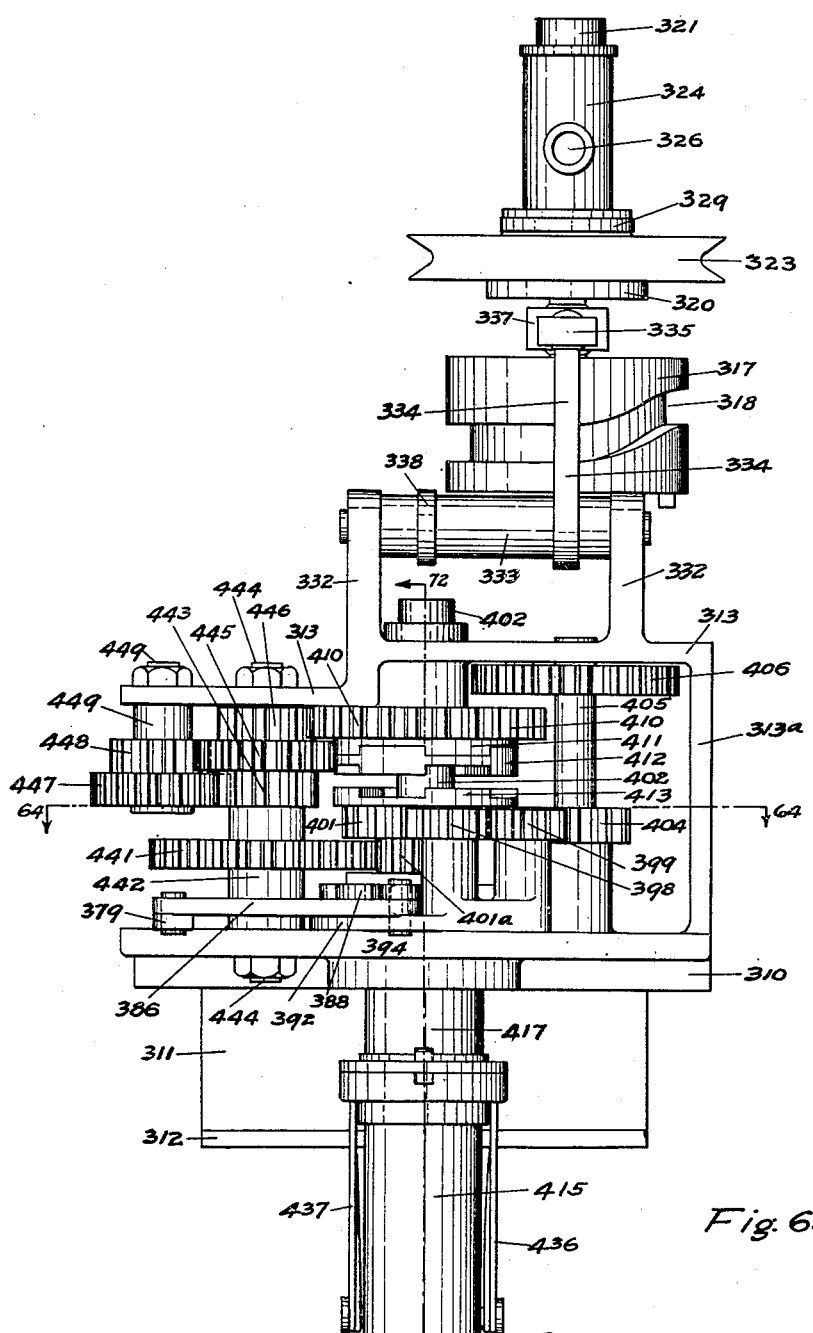
Figure 64:
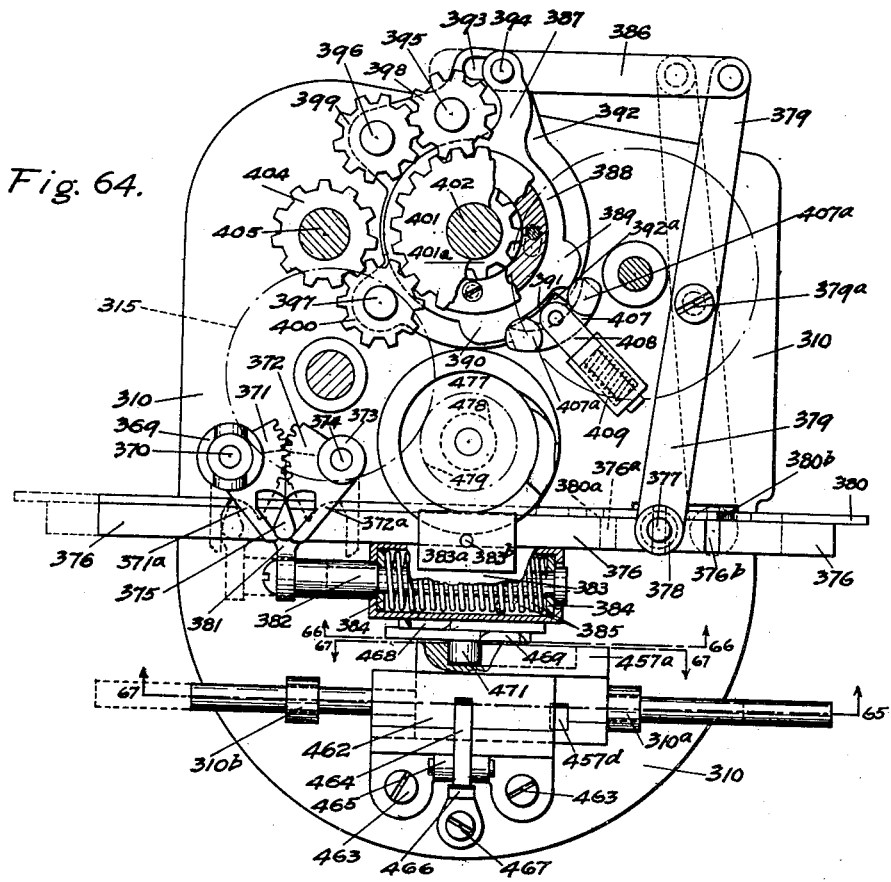
Figure 65:
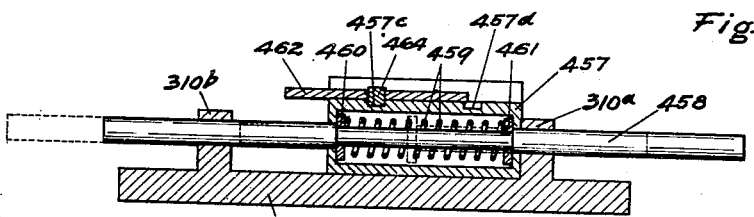
Figure 66:
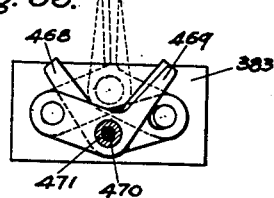
Figure 67:
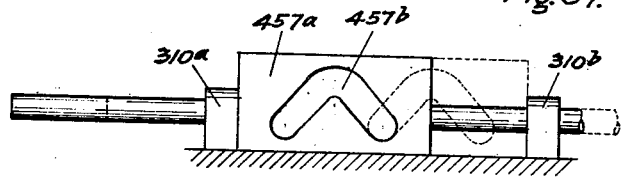
Figure 72:
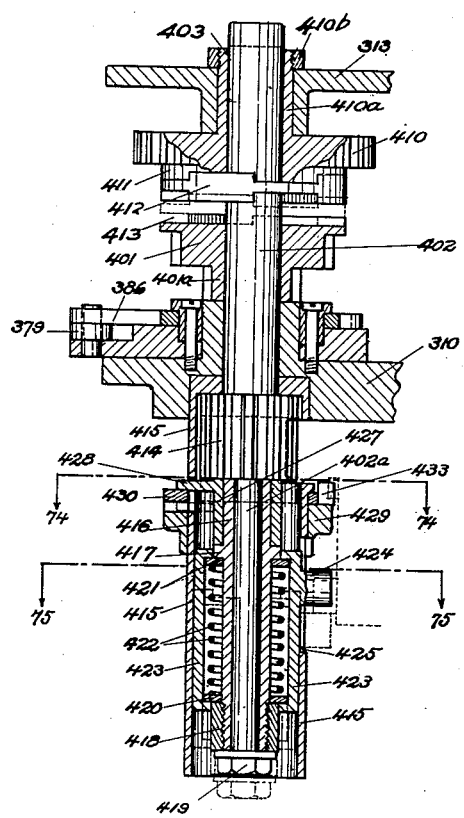
Figure 73:
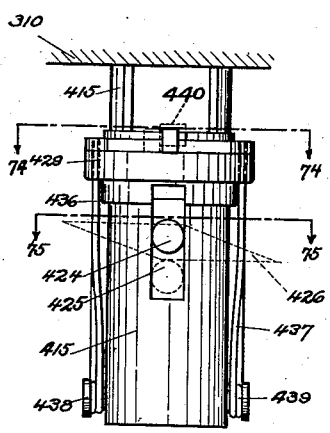
Figure 74:
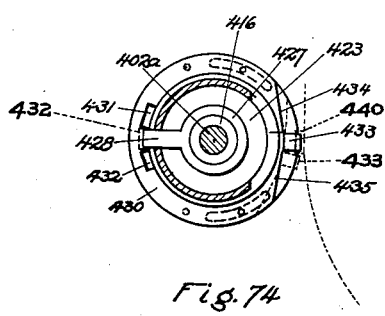
Figure 75:
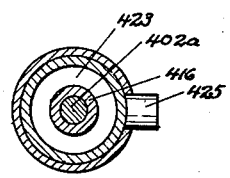

Fig. 49 is a top plan view of a mechanism, one of which operates at each end of the cuff, at the rear corners thereof, during the infolding of the rear or unsewed edges of the cuff;

Fig. 50 is a side elevation of the same, looking at the under side of Fig. 49;

Fig. 51 is a side elevation of the same at the opposite side thereof, showing the gripping members in their open position, as when inserted into the end of the cuff;

Fig. 52 is a similar view showing the gripping members, as when closed upon the top and bottom plies of the cuff;

Fig. 53 is a detailed end view of the gripping prongs, showing their relative positions before closing upon the plies of the cuff, as seen in Fig. 50;

Fig. 54 is a side elevation of a transfer mechanism for removing the cuff from the rear side of the pressing mechanism;

Fig. 55 is a top plan view thereof, with parts broken away and omitted;

Fig. 56 is a fragmentary side elevation on line 56—56, looking in the direction indicated by the arrows;

Fig. 57 is a vertical sectional view on line 57—57, of Fig. 55;

Fig. 58 is a top plan view, with a part broken out, of mechanism for removing the finished cuff from the second sewing machine clamps;

Fig. 59 is a side elevation of the same, partly in section, as on lines 58—58 of Fig. 60;

Fig. 60 is a cross sectional view on lines 60—60 of Fig. 58, looking from the rear;

Fig. 61 is a front elevation of one of the traveling sewing machine mechanisms, with gears omitted;

Fig. 61ᴬ is a detail view of controlling bars carried by the machine for starting and stopping the sewing machine mechanisms;

Fig. 61ᴮ is a fragmentary side elevation of the sewing machine, from the right hand side of Fig. 61, on a smaller scale;

Fig. 62 is a side elevation of the same from the left hand side of Fig. 61;

Fig. 63 is a rear elevation of the same, showing the gears;

Fig. 64 is a horizontal sectional view taken on line 64—64 of Fig. 63;

Fig. 65 is a vertical sectional view through a thread cutter operating mechanism, taken on line 65—65, of Fig. 64;

Fig. 66 is a view of the thread cutter, taken on line 66—66 of Fig. 64;

Fig. 67 is a side elevation of the thread cutter mechanism, taken on line 67—67 of Fig. 64;

Fig. 68 is a vertical section, taken on line 68—68 of Fig. 62;

Fig. 69 is a horizontal sectional view, taken on line 69—69 of Figs. 61 and 62;

Fig. 70 is a similar view of some of the parts shown in Fig. 69 in a moved position;

Fig. 71 is a sectional elevation on line 71—71 of Fig. 70;

Fig. 72 is a vertical sectional view of the speed changing mechanism, taken on line 72—72 of Fig. 63;

Fig. 73 is a side elevation of the lower part of Fig. 72, from the right hand side;

Fig. 74 is a horizontal sectional view taken on line 74—74 of Fig. 72;

Fig. 75 is a horizontal sectional view, taken on line 75—75 of Fig. 72, with spring omitted;

Fig. 76 is a top plan view of a sewing machine supporting and guiding base, with parts broken away, and showing a portion of the sewing machine base plate thereon; and Fig. 77 shows a side elevation of one end of the sewing machine supporting and guiding base, taken on line 77 of Fig. 76.

Referring now more in detail to the drawings, the body 1, of the machine is of rectangular box-like form, having the end leg portions 2—2, as clearly seen in Figs. 1, 2, 3 and 4. Mounted within said box-like body, upon shafts 3 and 4, extending longitudinally thereof, are five operating cam cylinders, designated 5, 6, 7, 8 and 9, having cam grooves therein, which are hereinafter referred to as they come into use. All of said cam cylinders are driven together at the same speed by means of the gears 10 and 11, on the shafts 3 and 4, in mesh with each other and of the same size. Shaft 3 and the gear 10 are driven by a gear 12, also mounted on shaft 3, and driven from a smaller gear 13, upon a short shaft 14, provided at its opposite ends with beveled gears 15 and 16. The beveled gear 16 meshes with a beveled gear 17 on a cross-shaft 18 upon which is mounted a pulley 19, to which pulley the power for operating the machine is applied, as by means of a belt (not shown), said shaft 14 being supported in a bracket 20, secured to the end of the body, as clearly indicated in Figs. 1 and 2.

The various mechanism of the machine hereinafter to be described are controlled and operated by the cam groove in the cam cylinders 5, 6, 7, 8, and 9, as they are revolved in the body of the machine in the manner just described, from the driving pulley 19.

Figure 1:
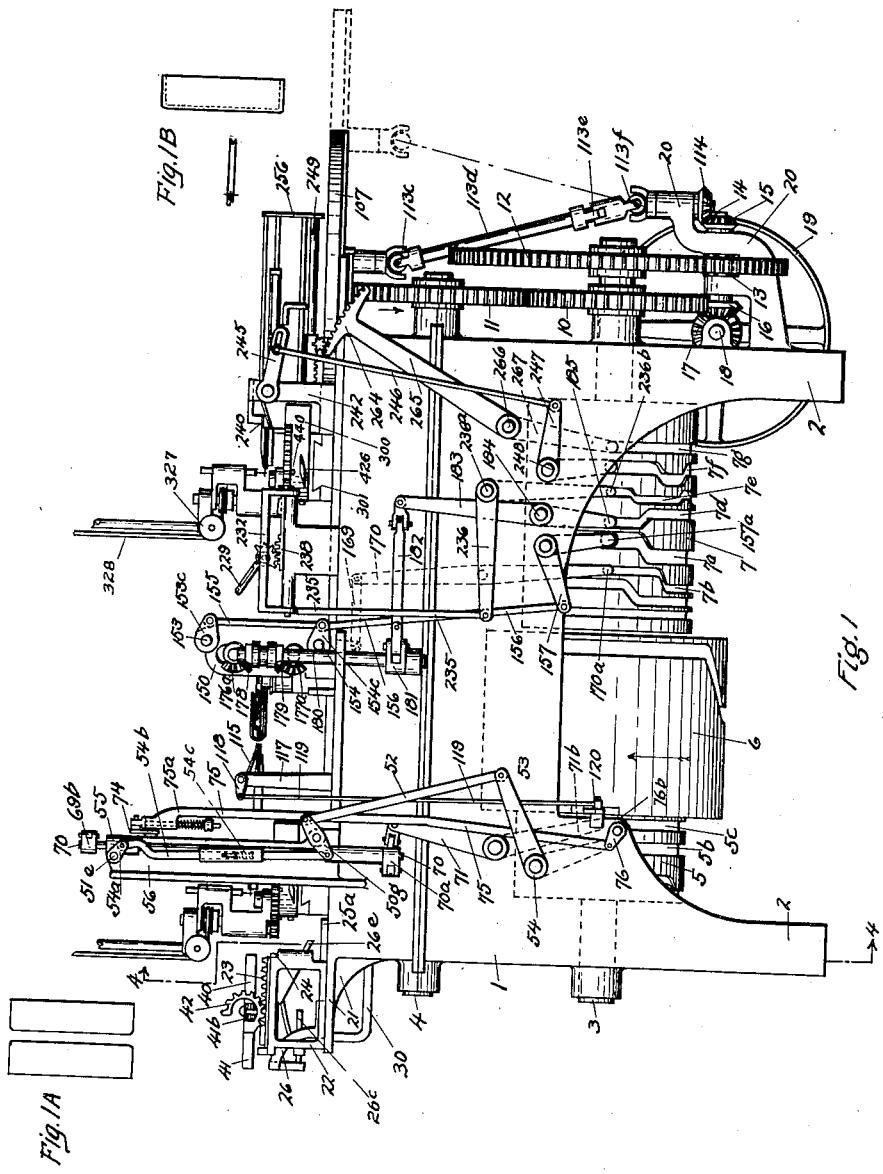

I will now describe the feed mechanism by means of which the plies or blanks of the material are fed into the machine. These blanks are substantially of the form shown in Fig. 1$^A$, while the finished cuff is substantially as shown in Fig. 1$^B$.

Referring now to Figs. 1, 2, 3, 7, 8, 9 and 10, supporting extensions or brackets, 21—21, project from the upper edge of the front end of the body 1. Rigidly mounted upon the right-hand side of the machine, upon the extension or bracket 21, is a supporting frame member 22 of rectangular form and upon the upper edge of which is slidably mounted a rack 23, (see Fig. 7). Said rack 23 is normally held from sliding forwardly on said frame 22 by means of a spring-actuated plunger 24, mounted in the end of the frame 22, as clearly indicated in Fig. 7, which plunger normally projects upwardly past the end of said sliding rack 23, but may be pressed downwardly, in a manner hereinafter described, to allow said rack 23 to be moved forwardly over said plunger to the position shown in the heavier dotted lines in Fig. 7.

Slidably mounted between the said extension or brackets 21, is a carrier or sliding frame 25, of rectangular form, as seen in the front view of Figs. 3 and 10, and at its opposite lower sides having two forwardly projecting base members, 25$^a$—25$^a$, as seen in Figs. 1, 7, 8 and 9. Also rigidly mounted upon said brackets 21—21, outside of said carrier frame 25, are two upwardly and outwardly curved arms, 26—26, Figs. 1, 7 and 8, having a cross-connecting piece, 26$^a$, which is provided with two downwardly projecting arms, 26$^b$—26$^b$, provided with inwardly projecting supporting rods, 26$^c$—26$^c$. Said cross-connecting piece 26$^a$ is also provided near its opposite ends with two inwardly projecting supporting rods 26$^d$—26$^d$, which terminate in two inwardly and downwardly projecting supporting guide rods, 26$^e$—26$^e$, upon which are separately mounted two upstanding carrier brackets, 27—27, across which, from one to the other, is mounted a two-part filler or supporting member, 28, the parts of which are adapted to slidably overlap each other, as said brackets 27—27 are moved toward each other and downwardly upon the guide rods, 26$^e$—26$^e$, in a manner hereinafter described. Said two-part supporting member 28, is shown in a cross-sectional view in Fig. 8, and is of angular form at its back edge. Said brackets 27—27, are pivotally connected, as by means of links, 27$^a$—27$^a$, to a cross-piece 29, which is slidably mounted upon the supporting rods 26$^c$—26$^c$, just outside of the sliding cross-frame 25, and is long enough, as shown in Figs. 9 and 10, to be engaged by said sliding cross-frame, 25, whereby, as said cross-frame 25 is moved outwardly, in a manner hereinafter described, it engages said cross-piece, 29, and moves it and the supporting brackets 27—27, by means of the links 27$^a$—27$^a$, from the dotted line position thereof, shown in Fig. 8, to the full line position shown therein. Said carrier frame 25, is moved forwardly and rearwardly by means of a rod or link 30, connected to the under side of said frame 25, as shown in Figs. 7 to 10, inclusive, and is extended rearwardly through the body of the machine, as shown in dotted lines of Fig. 2, and in Fig. 4, to the position shown through the broken out section of the body in Fig. 2, where it is connected with a cam plate 30$^a$, Figs. 2 and 4, slidably mounted in a supporting bracket 30$^b$, and having a part operating in a cam groove 8$^a$, in the cam cylinder 8, by means of which said rod is moved longitudinally to move said cross-member 25 backward and forward upon said extensions or brackets, 21—21, for a purpose hereinafter again referred to.

Figure 2:
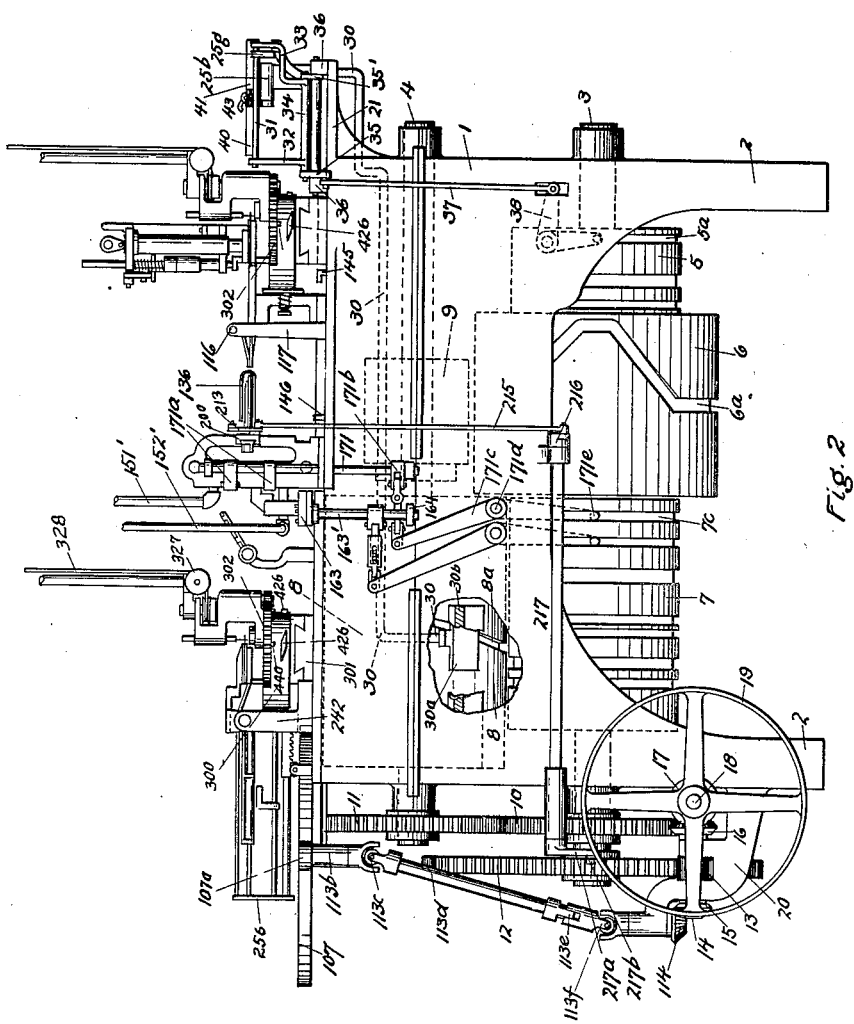
Fig. 2 is a side elevation of the machine as seen on the left hand side thereof.
Figure 6:
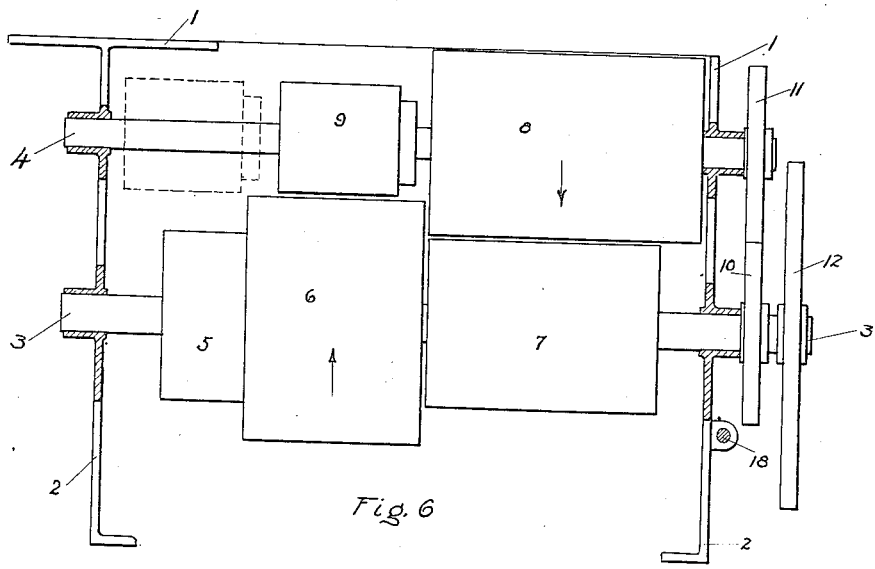
Fig. 6 is a side view of the body of the machine from the right hand side showing the main operating cam cylinders.

Mounted upon said carrier frame 25, at the opposite sides thereof, are two bearing boxes 25$^b$—25$^b$, within which are two shafts 25$^c$—25$^c$, provided at their forward ends with two gear segments, 25$^d$—25$^d$, Figs. 9 and 10, and at their rearward ends with short crank sleeves, 25$^e$—25$^e$, connected together by means of a cross connecting link 25$^f$, whereby said shafts 25$^c$—25$^c$, and their gear segments, 25$^d$—25$^d$, can be rocked or oscillated together in opposite directions, as by means of an arm 25$^g$, Figs. 3, 9 and 10, slidably connected with an operating rod 31, mounted in the upper ends of two end arms, 32 and 33, Figs. 2 and 9, projecting upwardly from a member 34, mounted in the upper ends of two short rocker arms 35 and 35′, pivotally mounted between the supporting brackets 36—36 upon the body of the machine, as clearly indicated in Figs. 2 and 3. The rocker arm, 35, is the longer and is pivoted in its middle with its opposite end connected by means of an operating rod or link 37, through an opening in the side of the machine, with one arm of a bell crank 38, adapted to be rocked by having its other arm operatively connected with a cam groove 5$^a$, in the cam cylinder 5, as clearly indicated in dotted lines in Fig. 2, and in full lines of Fig. 4.

The operation of the two gear segments 25$^d$—25$^d$, is for a purpose now to be described.

Figure 8:
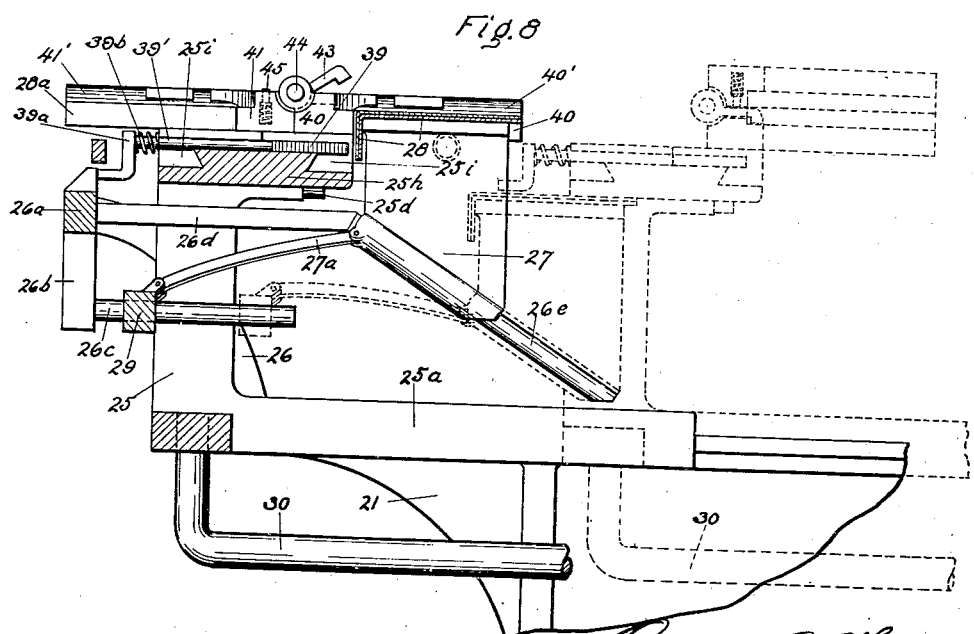
Fig. 8 is a vertical sectional view through the feeder taken on line 8—8 of Fig. 10.

Mounted across the top of the carrier frame 25, secured thereto, Figs. 8 and 9, is a supporting member 25$^h$, constituting a slide member, shown in section in Fig. 8, and upon which are slidably mounted two slide members 25$^i$ and 25$^j$, adapted to be moved slightly toward and from each other cross-wise of the member 25$^h$, for a purpose hereinafter stated. Operating between said slide members 25$^i$ and 25$^j$, is a wedge shaped member 39, Figs. 8 and 9, provided with a stem 39′, adapted to slide between the grooved meeting edges of the rear halves of the members 25$^i$ and 25$^j$, and provided at its end with a bumper piece 39$^a$ and a spring 39$^b$, adapted to engage the cross-piece 26$^a$, when said slide frame 25 moves outwardly to its normal position, whereby said wedge member 39, is forced inwardly to permit the slide members 25$^i$ and 25$^j$ to come together. The function of the said wedge member is to hold said slide members apart during the time said slide frame 25 is in its forward position, for a purpose hereinafter again referred to.

Mounted upon the forward edge of said slide members 25$^i$—25$^j$, are two L-shaped holding members 40—40, between which the filler or supporting members 28—28 fit when in their raised and expanded positions, as indicated in Fig. 9. Hingedly secured to said holding members 40—40, and projecting rearwardly thereof, are two other similar L-shaped holding members 41—41, adapted to be turned over upon the holding members 40—40, in the manner indicated in the dotted line positions, Fig. 7. The ends of said holding members are provided with short operating shafts 40$^a$—40$^a$ and 41$^a$—41$^a$, provided at their adjacent ends with gears 40$^b$—40$^b$ and 41$^b$—41$^b$, the shafts 40$^a$ and 41$^a$, in both instances, being operatively connected together when said holding members are open or in their load-receiving positions, by means of clutch members 40$^c$—41$^c$, clearly indicated in Fig. 9, where one side only is shown. The opposite sides of said members 40 and 41 are of the same construction and arrangement, except that the holding member 41 is provided with a gear ring segment 42, having a toe-like end 42$^a$, adapted when said gear ring is turned over in a position shown in dotted lines, Fig. 7, to engage and depress the plunger 24, whereby to release said slide rack 23, and to permit it to move forwardly with the gear ring 42. Said holding members 40—41, being secured to the top of the carrier frame 25, are moved forwardly with it as it is moved by the rod 30, and as they so move the gear ring segment 42 is caused to turn on the rack 23, thereby turning the holding member 41 over upon the holding member 40, and as it turns its shafts 40$^a$—40$^a$, are, of course, disconnected at their clutches 40$^c$—40$^c$. Each of the holding members 40—40 and 41—41, is provided with clamping jaws, as 40′—41′, secured to, and operated by the shafts 40$^a$—41$^a$, to clamp down the ends of the material blanks, shown in Fig. 1$^A$, when the same are laid upon the support or fillers 28—28, between the holding members 40—40, and upon a similar, one-piece support or filler 28$^a$ between the holding members 41—41. These clamping jaws 40′—41′ project from the shafts 40$^a$—41$^a$, and are adapted to be clamped down upon said material blanks upon the angle portions of the holding members 40 and 41, as best seen in Figs. 8, 9 and 10. The gears 40$^b$—40$^b$, on the stationary holding members 40—40, mesh with the gear segments 25$^d$—25$^d$, which are turned together in opposite directions through the link 25$^f$ and its connections hereinafter described, and as seen in Fig. 10. When the holding members 41—41 are turned over upon the members 40—40, as indicated in dotted lines, Fig. 7, the gears 41$^b$—41$^b$, come into mesh with the gears 40$^b$—40$^b$, and when the segments 25$^d$—25$^d$ are turned, or oscillated, as just described, all of said gears are moved simultaneously so as to open the clamping jaws 40′ and 41′ and thereby release all of the material blanks at once. Springs 40$^d$ and 41$^d$ are mounted upon the shafts 40$^a$ and 41$^a$ and operate to yieldingly hold the clamping jaws 40′—41′ closed. Small holding figures, 43—43, are pivotally attached to the hinge pin, 44—44, of the members 40—41 and are adapted to be pressed yieldingly downward upon the material blanks in the holding members, 40—40, by spring-actuated plungers 45—45, set in the members 41—41, as said members turn over upon the holding members 40—40. The two portions of each of the holding members 40—41, are normally held yieldingly apart by a coiled spring 44$^a$.

The operation of this part of the machine may be briefly described as follows:

The plies or material blanks are laid upon the supports or fillers, 28 and 28$^a$, while in their open position, as seen in Figs. 8 and 9, with their opposite ends in position to be clamped down upon the inner edges of the holding members by the respective gripping jaws 40′ and 41′. As the machine is operated, the cam cylinder 5, moves the rocker arm, 38, drawing the rod or link 37, downwardly, Figs. 2 and 8, and through the connections 35, 33, 31, 25$^g$ and the connecting link 25$^f$, causes the gear segments 25$^d$—25$^d$ to be partially turned outwardly, which operation turns the short shafts 40$^a$ and 41$^a$ inwardly, closing the gripping fingers 40′ and 41′ upon the ends of the material blanks, while a slight further rotation of the segment gears 25ᵈ—25ᵈ, after closing the fingers 40′—41′, tends to move the parts of the holding members 40—40 and 41—41 apart, because the gears 40ᵇ—40ᵇ can not turn any further in that direction. This stretches the material blanks endwise. Simultaneously with this movement, the cam cylinder 8, has commenced to draw the rod 30, and to move the whole carrier frame 25 inwardly. Said carrier frame pushes the supporting brackets 27—27, forwardly ahead of it and as they move upon the downwardly and inwardly inclined rods 26ᵉ—26ᵉ, said supporting brackets 27—27, and the supporting members 28—28, move inwardly and downwardly out of the way, in the manner indicated in dotted lines, Fig. 8, so as to permit the carrier frame 25, and the holding members 40—41, to be moved forwardly by the rod 30. As said mechanism starts forwardly the holding member 41, by means of the gear ring segment 42, is turned over upon the holding member 40, the little fingers 43—43 are closed down upon the rear edge of the lower ply or material blanks and said holding members with the material blanks held therein, are carried forwardly to the dotted line position shown in Fig. 8. In this position the plies or material blanks A and B, are held in a stretched condition between two clamping members 50 and 51, hereinafter again referred to, as seen in Figs. 11 and 12. As said clamping members 50 and 51 are closed upon the said material blanks A. and B, the little gripping jaws 40′ and 41′ in the members 40—40 and 41—41, are released by a slight movement of the bell crank 38, and its connections 37, 35, 33, 25ᵍ and 25ᶠ, hereinbefore described, whereby to permit the withdrawal of the members 40—40 and 41—41 from between the clamping members 50—51. This is accomplished through the rod 30, and its connection with the cam cylinder 8, which operates to move said rod 30, and the carrier frame 25, together with said holding members 40—41, to their normal or loading position. Said carrier frame 25, during its return movement, engages the cross member 29, to which are attached the links 27ᵃ—27ᵃ, and thereby pulls the supporting brackets 27—27, and the supporting members 28—28 backwardly, upwardly and apart, to their normal or load-receiving position, as indicated clearly in Fig. 8. Thus the material blanks are gripped, one is turned over above the other, and they are moved in this position forwardly to the clamping members 50—50.

I will now describe said clamping members 50—51, and the mechanism supporting and operating the same. The lower clamping member 50, comprises a shallow box-like body provided with a spring supported top piece 50ᵃ, adapted to be pressed downwardly within the box-like body of the member 50, for a purpose hereinafter again referred to. Said clamping member 50 is mounted upon vertical slide members 50ᵇ—50ᵇ, Fig. 11, slidably vertical in upright standards 50ᶜ—50ᶜ, by means of links 50ᵈ—50ᵈ, connecting them with the short arms 50ᵉ—50ᵉ on a shaft 50ᶠ, one end of which extends laterally to the side of the machine, and is provided upon its end with a short operating lever 50ᵍ, as seen in Figs. 1 and 4. One end of said operating lever, 50ᵍ, is connected by means of a link 52, to one arm of the bell crank, 53, mounted in a projecting sleeve bearing 54, attached to the side of the machine body, the other arm of which bell crank is operatively connected in a cam groove 5ᵇ in the cam cylinder 5, as clearly indicated in said Figs. 1 and 4. Thus as said cam cylinder 5 is turned, said bell crank 53, through the connecting link 52 and shaft 50ᶠ, operates to raise and lower said lower clamping member 50.

The upper clamping member 51 is secured to the lower ends of two plunger members 51ᵃ—51ᵃ, adapted to be moved up and down in two vertical supporting sleeves or cylinders, 51ᵇ—51ᵇ, as indicated in Figs. 12 and 14. Said plunger members 51ᵃ—51ᵃ are connected at their upper ends as by means of links, 51ᶜ—51ᶜ, to arms, 51ᵈ—51ᵈ, on a shaft 51ᵉ, Figs. 11 and 12, which said shaft 51ᵉ is extended laterally to the side of the machine, as indicated in Fig. 4, where it is supported in a short bearing box 55, upon the upper portion of the main supporting arm 56, which extends from the side of the machine body upwardly and inwardly over the top of the machine for supporting the mechanism now being described. Mounted upon the outer end of said shaft 51ᵉ, is a short crank arm 54ᵃ, which is connected by means of a link 54ᵇ, having a spring compression joint 54ᶜ, to the short rocker arm 50ᵍ, on the shaft 50ᶠ, which operates the lower clamping member 50. Thus by means of the bell crank 53, the links 52 and 54ᵇ, and the shafts 50ᶠ and 51ᵉ, both said lower and upper clamping members 50 and 51 are intermittently moved together and apart to receive and hold material blanks therebetween, in the manner indicated in Figs. 12 and 13.

I have also provided in connection with said clamping members, 50—51, which are adapted to receive the material blanks from the feeding mechanism, hereinafter described, and to hold them for the first sewing operation, what I will call, a coöperative filler member. This filler member operates to give a certain fullness to one side of the cuff, as hereinafter more fully described, and also coöperates to facilitate the entrance of a turning mechanism, hereinafter described, into the cuff.

Referring now to Figs. 4 and 12 to 16, the filler member proper is designated as a whole, 57, and is shown in plan view of Fig. 15, and is composed of a middle T-shaped portion 57ª, and two side or wing portions 57ᵇ—57ᵇ, said wing portions being slidably mounted upon a short shaft 58 and adapted to be moved toward and from said middle T-shaped portion, as indicated in dotted line, Fig. 15. Secured to and moving with said wing portions are two U-shaped members 57ᶜ—57ᶜ, having extension lips, 57ᵈ—57ᵈ, as indicated. Mounted upon the top of the lower clamping member 51, Fig. 14, are two spaced guide members, 59—59, which project therefrom as shown. Slidably mounted therein so as to be moved longitudinally thereof, and also to be raised and lowered therein, is a carrier piece 60, having at its outer end a downwardly extending portion 60ª, through which the shaft 58, is mounted, as indicated in Figs. 12, 15 and 16. Slidably mounted upon said shaft 58, at its opposite ends, are two sleeve members 61—61, having downwardly projecting portions 61ª—61ª, which carry the wing portions 57ᵇ—57ᵇ, shown in Figs. 11 and 15. Said sleeve members 61—61 are also provided with rearwardly projecting arms 61ᵇ—61ᵇ, having at their ends two upstanding studs 61ᶜ—61ᶜ. Also mounted upon said arms 61ᵇ—61ᵇ, are two upstanding members 61ᵈ—61ᵉ. Secured to the upstanding member 61ᵈ, is a tubular member 61ᶠ, slotted along its under side. Secured to the top of the upstanding member 61ᵉ, is a pin 61ᵍ, adapted to have telescopic engagement with the tubular member 61ᶠ, as the members 61—61 are moved toward and from each other, to move the wing members 57ᵇ—57ᵇ, to and from each other, as before referred to. The carrier piece 60 is held yieldingly down by a small coiled spring 62, upon an upstanding pin therein, the upper end of said spring bearing against the under side of the tubular member 61ᶠ.

Mounted upon the top of the clamping member 51, is an upstanding pin 63, having a bearing at its upper end in the arm 56, as indicated at 56ª. Mounted upon the clamping member 51, at its opposite end is an upstanding pin 64, shown in dotted lines, Fig. 11, while through the main supporting arm 56 above, is a pin 65, upon which is secured a sleeve member 66, having the arms 66ª—66ᵇ, and telescoping over the upstanding pin 64, upon the clamping member 51. The end of the arm 66ª, has a sleeve connection with the upstanding pin 61ᶜ, upon the end of the arm 61ᵇ, at that side of the machine. At the opposite side of the clamping member 51, there is rotatably and slidably mounted, a sleeve member 67, having at its lower end an arm 67ª, the outer end of which is provided with an upstanding sleeve bearing, as 67ᵇ, over the upstanding pin 61ᶜ, upon the arm 61ᵇ, as indicated in Fig. 14. The arm 67ª, is also provided with an extension, as 67ᶜ. The end of this extension 67ᶜ, is connected to the end of the arm 66ᵇ, at the opposite side of the clamping member 51, by means of a connecting member 68, having formed therein an arched portion 68ª, in order to pass over the upstanding pin 61ᶜ, and sleeve 67ᵇ, as said members are swung from the position shown in solid lines, Figs. 12 and 14, above the clamping member 51, to the position shown in dotted lines in the same figure.

Mounted upon the upper end of the shaft 65, is a short crank arm 69, connected by means of a link 69ª to a crank arm 69ᵇ, upon the upper end of a shaft 70, rotatably supported by the arm 56, and provided at its lower end with a short crank arm 70ª, connected to a bell crank arm 71, mounted in a suitable sleeve bearing 71ª, on the side of the body of the machine, the other arm 71ᵇ, of said bell crank 71, being connected to be operated by the cam groove 5ᶜ, in the cam cylinder 5. Thus through the connections just described, the vertical shaft 65, is given a rotary oscillating movement and through the sleeve 66, arms 66ª and 66ᵇ, and the connecting member 68, and the arm 67ª, the parts of said filler member 57, are compressed and expanded, and are moved into and out of the clamping members 50 and 51, as indicated in Figs. 12, 15 and 16. In Fig. 12, it will be seen that said filler member 57 is not only moved from between the clamping members 50 and 51, but it is lifted up out of the way as it is withdrawn from between the clamping members, as shown in Fig. 12, in dotted lines.

I will now describe the mechanism for doing this. The sleeve members 66 and 67, are yieldingly held down by coil springs 65ª—65ª, and they are provided at their upper ends with segmental flange members 66ᶜ and 67ᶜ, by means of which they are intermittently lifted and lowered by two bell crank members 72—72, pivotally connected to the main cross arm 56, as clearly seen in Fig. 11. The operating arms of said bell crank members 72—72, are adapted to engage the segmental flanges 66ᶜ—67ᶜ, and the opposite arms thereof are connected by means of a cross member 73, which is extended laterally and connected to another bell crank 74 on the side of said arm 56, and by means of a connecting rod 75, connecting thereto by means of a spring plunger connection 75ª as seen in Figs. 1 and 11. Said rod 75 is connected to a bell crank 76, mounted through a sleeve 76ª, on the side of the machine, as seen in Fig. 4, the opposite end of which bell crank 76, is provided with short arm portions 76ᵇ, adapted to be engaged and operated by lugs 6ª and 6ᵇ, on the end of the cylinder 6, indicated in Figs. 1 and 4, whereby said rod 75, and the described connections up to the bell cranks 72—72, are operated to lift said sleeves 66—67, and said filler 57, lifting it once slightly while it is between the clamping members 50—51, to hold the upper ply or material blank A, of the cuff, against the upper clamping member 50, just as said members are closed, and then lifting said filler 57, out of the way as it is moved out from between the clamping members, 50—51, as shown in dotted lines in Fig. 12.

By reference to Figs. 12 and 13, it will be seen that the lower clamping member 50, has a spring mounted top, as 50ª, supported on small springs, 50ᵇ, set in the base portion thereof. The purpose of this is to make possible and practical a result now to be described. The lower ply, or material blank B, is pressed down into the lower clamping member 50, by the filler 57, as said clamping members 50 and 51 are closed together, as seen clearly in Fig. 13, thus giving a certain fullness to the lower ply or material blank, before they are sewed together around their projecting edges.

The object of forming this fullness in one of the plies of the cuff as it is being thus held and sewed, is to make possible and easy the formation of a bead-like edge to the cuff when it is turned with the turned seam of the first sewing on the inner side of the cuff, or inwardly from the edge thereof, instead of being right at the edge of the turned cuff. This hides the seam from view as the cuff is worn, because it is on the inside of the cuff. This formation to hide the seam, and to form the bead-like edge around the cuff may be better understood by referring to Fig. 1ᴮ, in which outside and sectional views of a finished cuff are shown.

I will next describe a follower member, as I have called it, with its operating mechanism. This follower member performs the function of catching and holding the sewed or rear edge of a cuff as the latter is being carried forwardly in the machine, until the turner members commence the turning operation thereof, after which said follower member also moves forwardly into the cuff during the completion of the turning thereof. To this end the follower member has a certain movement forwardly and backwardly, longitudinally of the machine, and also has a certain vertical movement. Said follower member is lowered to permit the cuff to be picked from the first sewing mechanism and carried forwardly above said follower member. It is then raised and operated in time to catch the rear or sewed edge of the cuff, and to hold it during the initial movement of the turning members, after which it moves forwardly into the cuff, still holding the sewed edge thereof, and facilitating the formation of the bead-like edge of the cuff above referred to.

Referring now to Figs. 17 to 27 of the drawings, this follower member comprises a body member 77, as best seen in Figs. 18, 19, 21 and 27, which constitutes a transverse slide-way, and is supported upon the upper ends of two vertically, movable standards, or supports, 78—78, mounted to move in vertical guide-way in two side brackets 79—79, mounted respectively upon the ends of two main carrier bars, 80—80, slidably mounted in the top of the main body 1 of the machine, and extending forwardly therein, as clearly indicated in Figs. 26 and 27, and provided intermediate their ends with a cross-piece 81, having a downwardly depending operating stud 82, operated upon by the cam groove 8ᵇ in the cam cylinder 8, whereby said follower member is moved forwardly and backwardly, longitudinally of the machine, at the proper times, and in the required manner. Slidably mounted in the slide-way of said body member 77, are two slide members, 83—83, upon which are mounted two plate members, 84—84, of the follower member, and which project forwardly therefrom in the manner indicated, and are adapted to be moved laterally away from and toward each other, by and with said slide members 83—83, in a manner hereinafter described. Said plate members 84—84, have overlapping front edge portions 84ª—84ª, so as to form a continuous edge when said parts are expanded, as just referred to. Said plate members 84—84, also have cut therein U-shaped openings 84ᵇ—84ᵇ, within which are slidably mounted U-shaped members 85—85, resting upon the upper surfaces of the slide members 83—83. Folded around the ends of said U-shaped members 85—85, are spring members 86—86, attached to the ends of the U-shaped members 85—85, so as to be moved forwardly and backwardly therewith, and having overlapping arms, or portions, 86ª—86ª, to form a continuous rear edge, when said members are expanded with the members 84—84. The top portions of said spring members 86—86, are also provided at their opposite edges with forwardly projecting spring fingers 86ᵇ—86ᵇ, having small apertures 86ᶜ—86ᶜ, therein, for a purpose hereinafter referred to. At the outer ends of said spring members 86—86, are extensions 86ᵈ—86ᵈ, which perform a function in connection with the infolding of the corners of the cuff, as hereinafter again referred to. Slidably mounted across said plate members, are two slide bars 87—87, having at their forward ends hook portions 87ª—87ª, adapted to operate through the apertures 86ᶜ—86ᶜ, in the finger members 86ᵇ—86ᵇ.

Mounted on the under sides of said members 83—83, are bearing sleeves 88—88, in which are mounted operating shafts 89—89, provided at their lower ends with crank arms 89ª—89ª, having at their outer ends upstanding pins 89ᵇ—89ᵇ. At the upper ends of said vertical shafts 89—89, are short operating arms 89ᶜ—89ᶜ, connected by means of links 90—90, to the rear ends of the U-shaped members 85—85, as at 90ª—90ª, whereby said U-shaped members 85—85 can be moved forwardly and backwardly, through the plate members 84—84, as said vertical shafts 89—89 are turned, in a manner hereinafter referred to. As said U-shaped members 85—85, are moved backwardly thereby, they pull with them the spring members 86—86, and in this movement the ends of the spring fingers 86ᵇ—86ᵇ are slightly raised off the plate members 84—84, by riding up on the incline of the hook members 87ª—87ª, as will be better understood by referring to Fig. 22. As said U-shaped members 85—85 are again moved forwardly, the spring fingers 86ᵇ—86ᵇ, are also pushed forwardly, and the slide bars 87—87, which have been moved slightly rearwardly by the operation of the fingers on the hooks, 87ª—87ª, thereof, are also moved forwardly therewith, in a manner hereinafter described, so that said spring fingers 86ᵇ—86ᵇ, are not only moved forwardly, but are permitted to spring down again on to the plate. 84—84, so as to catch the rear or sewed edge of the cuff, hereinafter again more specifically referred to. As the slide bars 87—87, are moved rearwardly by the engagement of the spring fingers 86ᵇ—86ᵇ, with the hooks 87ª—87ª thereof, they are stopped at their rear ends by engagement with the upper ends of two rocker levers 91—91, mounted upon a cross-shaft 92, having bearings at its opposite ends in brackets 93—93, on the under side of the body member 77, and adapted to be oscillated by means of a lever 94, connected at its lower end with an operating rod 95, extended forwardly between the carrier bars 80—80, to a cam operating mechanism, hereinafter again referred to. Formed on the plate members 84—84, between the spring members 86—86, as shown in Figs. 19, 21, 22 and 23, are cam lugs 84ᶜ—84ᶜ, adapted to spring the rearward edges of said members 86—86, away from the plate member 84, as they are drawn backwardly, for a purpose hereinafter again referred to.

Figure 24:
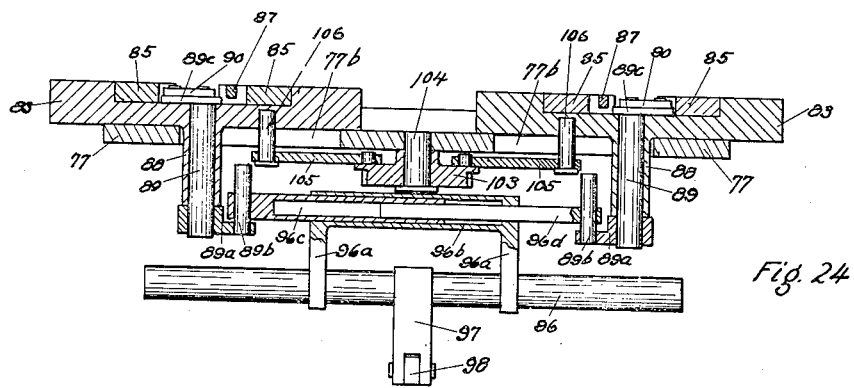
Fig. 24 is a transverse vertical sectional view, taken on line 24—24 of Fig. 17.
Figure 23:
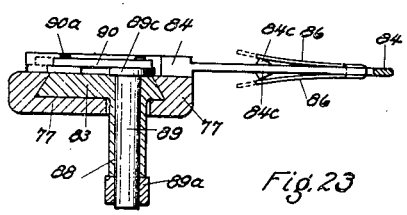
Fig. 23 is a similar vertical sectional view, taken on line 23—23 of Fig. 17, to show the construction of the follower plate, and also the movement of a part thereof.

Mounted between the bracket members 79—79, is a shaft 96, provided with two spaced arms 96ª—96ª, supporting at their upper ends a bearing sleeve 96ᵇ, within which telescopes an operating sleeve 96ᶜ, see Figs. 18 and 24, connected at its outer end with the upstanding pin 89ᵇ, and an operating rod 96ᵈ, connected at its outer end with the upstanding pin 89ᵇ, and an operating rod 96ᵈ, connected at its outer end with the upstanding pin 89ᵇ, at the opposite side of the machine. This construction is adapted to permit the slide members 83—83, and their downwardly depending sleeves 88—88, and the plate members 84—84, carried thereby, to be moved laterally, as indicated in Fig. 24, which movement is accomplished in a manner hereinafter described. An operating arm 97, is mounted upon said shaft 96 and extends downwardly for connection with an operating rod 98, extending forwardly between the carrier members 80—80, for connection to an operating cam, hereinafter again referred to. A second shaft 99, is also mounted between said standard members 79—79, and is provided at its opposite ends with arms 99ª—99ª, connected by means of links 99ᵇ—99ᵇ, to ears 77ª—77ª, on the under side of the body member 77, whereby said body member 77, and all the mechanism carried thereby, can be raised and lowered, by the rocking of said shaft 99. This is accomplished by means of an operating rod 100, attached thereto, by means of the arms 99ᶜ—99ᶜ, and extended forwardly between the carrier bars 80—80, for connection to an operating cam mechanism, hereinafter again referred to.

Figure 25:
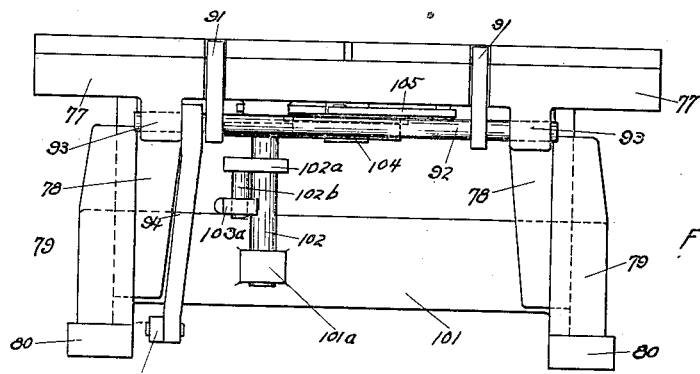
Fig. 25 is an elevation, looking at the left side of the mechanism shown in Fig. 19.

There is also mounted between said side standards 79—79, a connecting plate 101, having formed thereon a bearing 101ª, as illustrated in Figs. 21 and 25, slidably mounted in which is a shaft 102, provided intermediate its ends with an operating arm 102ª, having a pin 102ᵇ, slidably connected in the end of an operating rod 103ª, projecting above the cross-plate 101, and extended forwardly between the carrier bars 80—80, for connection with a cam operating mechanism, hereinafter again referred to. The upper end of said shaft 102, has a supporting bearing through the body member 77, as at 102ᶜ, Fig. 21, and is also provided near its upper end with a gear segment 102ᵈ, adapted to mesh with a gear 103, mounted upon a short spindle 104, in the under side of the body 77, as clearly indicated in Figs. 18, 21 and 24, and connected by means of two links 105—105, and pins 106—106, to the under sides of the slide members 83—83, moving in the body member 77, which is provided with slots 77ᵇ—77ᵇ, to permit said slide members 83—83, and their downwardly depending sleeves 88—88, to be moved apart laterally as shown in Fig. 24, thus operating or spreading the plate members 84—84 mounted thereon.

The operating rods 95, 98, 100 and 103ª, connected to the various parts of the follower mechanism, as hereinbefore referred to, and extended forwardly between the carrier bars 80—80, as clearly shown in Figs. 26 and 27, are operated by a cam mechanism which I will now describe. Mounted upon the ends of the carrier bars 80—80, and moving therewith is a pan like body member 107, having two grooves 107ª and 107ᵇ, formed in its bottom. Slidably mounted in the bottom groove 107ª, is a slide bar 108, provided with an arm 108ª, having an upstanding cam pin 108ᵇ, and connected at its forward end by means of a downwardly depending pin 108ᶜ, to the rod 98, shown in dotted lines in Fig. 26. Slidably mounted in said groove 108ª, upon said slide bar 108, is another slide bar 109, having a projecting arm 109ª, and an upstanding cam pin 109ᵇ, and a downwardly depending pin 109ᶜ, projecting through a slot in the slide bar 108, and also through the bottom of said pan like body 107, as clearly indicated in Fig. 27, and connected to the operating rod 100. Slidably mounted in the bottom of the groove 107ᵇ, is a slide bar 110, having a cam arm 110ª, provided with an upstanding cam pin 110ᵇ, and at its forward end connected by means of a downwardly depending pin 110ᶜ, to the rod 95.

Slidably mounted in said groove 107ᵇ, upon said slide bar 110, is a second slide bar 111, having a cam arm 111ª, provided with an upstanding cam pin 111ᵇ, and at its forward end with a downwardly depending pin 111ᶜ, projecting through a slot in the cam bar 110, and in the bottom of the body 107, and connected to the rod 103ª, as indicated in dotted line, Fig. 26, one of said connections being shown at 109ᶜ, Fig. 27. Revolubly mounted in said pan-like body 107, is a cam plate or disk 112, provided in its under face with a series of cam grooves 112ª, 112ᵇ, and 112ᶜ, operating upon the upstanding cam pins 108ᵇ, 109ᵇ, 110ᵇ, and 111ᵇ, said cam plate being provided with teeth around its outer edge, and adapted to be driven by a small gear 113, inclosed in an extension 107ª of the body 107, and operated by a short shaft 113ª, in a bearing 113ᵇ, and connected by means of a universal joint at 113ᶜ, to a shaft 113ᵈ, adjustably connected at its lower end as at 113ᵉ, and a universal joint 113ᶠ, and adapted to be operated by a beveled gear 114, in the upper end of the bracket 20, which beveled gear is driven from the beveled gear 15, which is connected to be driven from the main drive pulley 19. Thus it will be seen that said cam plate 112 can be driven without interference with its bodily movement upon the main carrier bars 80—80, so as to perform the function of operating the rods 80, 95, 98, 100 and 103ª, as hereinbefore described, and for the purposes referred to.

Coöperating with the follower plate 84, and the holding fingers 86ᵇ—86ᵇ, which are adapted to hold the sewed edge of the cuff down upon the main plates 84—84, are two finger prongs 115—115, mounted upon a shaft 116, in two upright standards 117—117, provided at one end with a crank arm 118, operated by a rod 119, connected at its lower end to a cam lever 120, adapted to be intermittently operated by the cam cylinder 6, as shown in Figs. 1 and 4, to lift said finger prongs 115—115, which normally rest down on the plate 84.

I will next describe the turner and transfer mechanism, which operates to pick the cuff from the first sewing machine clamps 50 and 51, after it has been sewed, and to move it forwardly in the machine, above the follower member, which has just been described and which has been moved toward the front of the machine and to its lowermost position to permit this transfer. As the turner transfer mechanism carries the cuff in a stretched condition, as hereinafter more fully described, above the follower member, the latter rises in time to catch and hold the rear or selvage edge of said cuff as it is being carried forwardly by the turner and transfer mechanism. At this stage of the action, the turner members start to turn inwardly, carrying the ends of the sewed cuff between the plies thereof, the follower member moving into the cuff as the turning is completed.

This turner and transfer mechanism is best shown in Figs. 28 to 40, to which reference is hereby made in connection with the following description thereof.

Mounted upon the upper shaft 4, around the cam cylinder 9, and adapted to slide upon said shaft 4, with said cam cylinder 9, and upon slide ways 1ª—1ª, on the inside of the main body of the machine, is a carrier frame 121, provided at its rear under side with a downwardly projecting cam stud 121ª, which is adapted to be operated by the cam groove 6ª, in the main cam cylinder 6, and by means of which said carrier frame 121, and the cam cylinder 9, therein, are moved along said shaft 4, for a purpose hereinafter again referred to. Said cam cylinder 9, is feathered to said shaft 4, as at 4ª—4ª, so as to be turned therewith and at the same time to be slidable thereupon. Said cam cylinder 9, is also provided with cam grooves 9ᵇ, 9ᶜ and 9ᵈ, and has a reduced end portion 9ᵉ, having therein a cam groove 9ᶠ.

Mounted to slide one upon the other, transversely in the top of the carrier frame 121, are two over lapping slide members 122—122′, provided with diagonally disposed slots 122ª—122ᵇ, arranged cross-wise of each other, as clearly shown in Fig. 29, through which slots project an operating stud 123, mounted upon a slide plate 124, adjustably mounted in a slide frame 125, and adjustable therein by means of a screw 126. Said slide plate 124 and the slide frame 125, are movable together as a unit by means of an operating stud 125ª, projecting downwardly from the slide frame 125, through the top of the carrier frame 121, in which said slide frame 125 is seated, into the cam groove 9$^d$ in the cam cylinder 9, whereby as said cam cylinder 9 revolves, said members 124 and 125 are moved longitudinally of the carrier frame to effect the expansion and contraction of the slide members 122—122′, through the action of the stud 123, in the diagonal slots 122$^a$—122$^b$. The adjustment of the slide plate 124, carrying the stud 123, within the slide frame 125, makes possible variable relative adjustments of the slide members 122—122′, for a purpose hereinafter again referred to. Said slide frame, 125, is slidably seated in the top of the carrier frame 121, which is adapted to receive and hold the same, as will be understood from Figs. 28, 29 and 30. Said carrier frame 121, also has formed thereon guide portions 121$^b$—121$^b$, at the opposite sides of said slide members 122—122′. It is also provided with laterally extended arm portions 121$^c$—121$^c$, and at its opposite ends is provided with upstanding, U-shaped portions, as 121$^d$—121$^d$, Fig. 30, to serve as confining guideways. Two slide plates, 127—128, are slidably mounted in the middle portion of the top of said carrier frame 121, longitudinally thereof, above said slide plates 122—122′, and are provided with laterally projecting arm members, 127$^a$ and 128$^a$, respectively, for a purpose hereinafter described. The plate 127 is provided with a downwardly depending stud 127$^b$, extending through a slot in the top of the carrier frame 121, into operating engagement with the cam groove 9$^b$, in the cam cylinder 9. The plate 128 is also provided with a downwardly depending stud 128$^b$, extending through a slot 127$^c$, in the plate 127, and into operating engagement with the cam groove 9$^c$, in the cam cylinder 9, whereby said plates 127 and 128, with their arms, 127$^a$ and 128$^a$, can be moved independently of each other, or together simultaneously, longitudinally of the machine by said cam cylinder 9.

A Y-shaped cam plate 129 is mounted upon the top of the mechanism, now being described, and moves therewith, being provided along its under side with two side bars, or portions, 129$^a$—129$^a$, by means of which it is screwed, as at 129$^b$—129$^b$, to the upper portions 121$^d$—121$^d$, of the carrier frame 121. Said Y-shaped cam member operates to spread and contract the sewing machine supporting and guide base members, hereinafter described.

The slide members 122—122′, which operate transversely of the carrier frame 121, are provided at their outer ends, respectively, with forwardly extending side portions, 122$^c$ and 122$^d$, having at the opposite sides of their ends lug guide portions, 122$^e$ and 122$^f$, respectively. Slidably mounted upon each of said members 122—122′, and their forwardly extending side portions 122$^c$ and 122$^d$, are two rack bars, 130 and 131, slidably mounted one above the other, said rack bars being reciprocated longitudinally by the arms, 127$^a$ and 128$^a$, respectively, and to this end are provided with notches through which the ends of said arms project, as indicated in Figs. 28, 29, 30 and 31, the arms 127$^a$—127$^a$ operating the rack bars 131—131, at the outer ends.

Formed as a part of the slide members 122—122′, at their outer ends and movable laterally therewith, are downwardly projecting bearing brackets, 122$^g$ and 122$^h$, slidable upon a shaft 132, which is supported at its middle portion through a bearing 121$^e$, Fig. 31, in the main carrier frame 121. Secured to said shaft is a downwardly depending rocker arm 132$^a$, adapted to its lower end to be operated by the cam groove 9$^f$, in the reduced end 9$^e$, of the cam cylinder 9, whereby to rock said shaft 132. Mounted upon said shaft near its opposite ends, are two rocker fingers, 132$^b$—132$^b$, adapted for a purpose hereinafter again referred to, and having their body portions 132$^c$—132$^c$, feathered to said shaft, as at 132$^d$—132$^d$, so as to be turned therewith and slidable thereon, and having reduced sleeve, or hub-like portions extending through the bearings 122$^g$ and 122$^h$, as indicated in dotted lines, and provided at their ends with retaining rings 132$^e$—132$^e$, thus said rocker fingers, 132$^b$—132$^b$, the bearings 122$^g$—122$^h$, and the retaining rings 132$^e$—132$^e$, are all movable together upon the shaft 132, with their respective slide members 122—122′. The rocker fingers, 132$^b$—132$^b$, are oscillated vertically by the turning of the said shaft through the rocker arm 132$^a$, connected with the cam groove 9$^f$, in the reduced part 9$^e$, of the cam cylinder 9.

The object and purpose of the mechanism so far described is to operate the members which actually grip, transfer and turn the cuff. I will now describe these members and their operation.

Mounted upon the outer ends of the slide members 122—122′ upon shelf-like extensions 122$^i$ and 122$^j$ thereof, are two upstanding cylindrical members 133—133. As these turning members at the opposite sides of the machine are identical, and are operated in the same way, I will use the same reference numerals for the corresponding parts of both, as I have done for the rack bars 130—130 and 131—131, and the rocker fingers 132$^b$—132$^b$, which have a part in the operations of said turning members. Rotatably mounted in said cylindrical member 133, is a two-part cylindrical member 134, composed of the parts 134$^a$ and 134$^b$. The lower part 134$^a$, is provided at its lower end with an operating gear 135, adapted to be turned by said rack bar 130 when the latter is reciprocated in either direction. The part 134$^b$, has a sliding or clutch like connection with the part 134$^a$, whereby it can be raised and lowered without disconnecting it, as indicated in dotted lines, and is provided at its upper end with an enlarged portion 134$^c$, having a flange 134$^d$, overlying the upper end of the cylindrical member 133. Secured to the upper end of said enlarged portion 134$^c$, by means of a segmental extension 136$^a$, is a loop 136, adapted to move and turn therewith. A spring 137, anchored at its lower end in the wall of the cylindrical member 133, and at its upper end bearing against the lower end of said enlarged portion 134$^c$, normally tends to raise the part 134$^b$, with its loop 136, to the raised or dotted line position indicated in Fig. 34. Rotatably mounted in said cylindrical member 134, is a hollow shaft 138, provided at its lower end with a gear 139, adapted to be driven by the rack bar 131, when the latter is moved in either direction, and at its upper end provided with a gripping jaw member 140 to which is hingedly secured an upper jaw member 141, adapted to be raised and lowered by means of an operating rod 142, extending through said hollow shaft 138, and connected to said movable jaw 141, as at 142$^a$, said operating rod being provided at its lower end with a ring 142$^b$, and a spring 142$^c$ thereon, between the ring 142$^b$, and the lower end of said hollow shaft 138, whereby to normally keep said operating rod drawn downwardly, and the jaw 141, closed upon the jaw 140. It will thus be seen that the hollow shaft 138 and the jaws 140 and 141, can be revolved within the cylindrical member 134, and will be moved through the loop 136, when the latter is in its lower position, as shown in full lines in Fig. 34, and that the loop can be raised above said jaws and can also be revolved independently, while in the up position or the down position. The operating rod 142, is intermittently raised by its rocker finger 132$^b$, on the shaft 132, as hereinbefore described.

Mounted on the side of the cylindrical member 133, is an extension 133$^a$, within which is slidably mounted a bar 133$^b$, having a notch in its upper end which fits over the flange 134$^d$, as at 133$^c$. At its lower end said bar 133$^b$, is provided with a notch to form a projecting lip 133$^d$. A lever 143 is pivotally mounted to one side of an arm 133$^f$, on the side of said cylindrical member 133, and is provided at its upper end with a hook 143$^a$, adapted to pass through an aperture 133$^e$, in the extension 133$^a$ and to hook into the slide bar 133$^b$, for the purpose of holding said slide bar 133$^b$, and the cylindrical member 134$^b$, with the loop 136, down in the position shown in full lines, Figs. 34 and 35. Said lever 143, is normally pressed outwardly at its lower end by spring 143$^b$, operating against the lower end thereof, whereby to normally move its upper end 143$^a$, through the aperture 133$^e$. Also pivotally mounted upon said arm 133$^f$, is a bell crank 144, one arm of which is adapted to engage on the lip 133$^d$, of the slide bar 133$^b$, while its other end is adapted to be engaged by a cam member 145, mounted upon the main body of the machine 1, when said cylindrical member 133, is moved adjacent thereto, whereby said bell crank 144, is operated to move the bar 133$^b$, and its loop 136, downwardly from the dotted line position, shown in Fig. 34, to the solid line position shown in the same figure.

The cam member 145, which operates the bell crank 144, for the purpose of moving the loop 136 downwardly, is mounted on the main body of the machine adjacent the first sewing mechanism, as indicated in Fig. 2. At the other end of the travel of said turning members, which is adjacent the press into which the cuff is inserted at the finish of the turning operation, is yieldingly mounted upon the body 1 of the machine, a trip lever 146, upon a pivot 146$^a$, held in normal position by means of a spring 146$^b$, as shown in Fig. 35 and Fig. 36. This trip lever is positioned to engage the pivoted arm 143 at the right time during the movement of said turner mechanism, whereby to release the bar 133$^b$, and to allow the member 134$^b$, and the loop 136, to be moved upwardly by the spring 137. The time and purpose of these different movements will be set forth in a later description of the operation of the mechanism now being described.

Mounted upon the sides of the main body 1—1, are two upstanding supporting bearing side members 150—150, between which are mounted two movable presser members 151—152, one above the other, and adapted to be moved toward and from each other. Mounted across the tops of said side members 150—150, is an operating shaft 153, provided with crank arms 153$^a$—153$^a$, near its opposite ends, connected by means of links 153$^b$—153$^b$, to the top of the presser member 151, whereby to raise and lower the same when said shaft 153 is rocked. Mounted across the bottoms of said side members 150—150, is a second operating shaft 154, provided near its ends with crank arms 154$^a$—154$^a$, connected by means of links 154$^b$—154$^b$, to the bottom of the lower presser member 152, so that when said shaft 154 is rocked, said lower presser member will be raised and lowered. At one end said shaft 154, is provided with a crank arm 154$^c$, which is connected by means of a link 155, with a crank arm 153$^c$ at the outer end of the upper shaft 153, whereby to rock said shafts 153—154 simultaneously, and thereby move said presser members 151 and 152 together and apart. The rocking of said shafts is accomplished by means of a link 156, Fig. 1, connected at its lower end with an arm of a bell crank 157, the other arm of which bell crank is operatively held in a cam groove 7ª, in the cam cylinder 7, as at 157ª, Fig. 1. As the presser members 151 and 152 are moved apart to receive a turned cuff therebetween, as in the manner hereinbefore described, the follower member 84 moves into the cuff between the presser members, occupying the position indicated in Fig. 44.

A forming member 158 moves into the opposite side of the presser members to form the edges and ends of the cuff. This forming member 158, comprises a body, shown in cross section in Fig. 44, and in plan view in Fig. 43. At one end thereof, as at 158ª, Fig. 43, said forming member is of L-shape, so as to operate around one end of the cuff, and is provided at its opposite end with an adjustable end portion 158ᵇ, adapted to be moved to and away from the other end of the presser members. Said forming member is also moved back and down away from the presser members, to the position indicated in dotted lines, Fig. 44. These movements of the forming member are accomplished by the following mechanisms: The main body 158, is provided at one end with a sleeve bearing member 158ᶜ, and the movable end portion 158ᵇ, is provided with a similar bearing sleeve 158ᵈ, which said bearing sleeves are slidably mounted upon vertical pins 159—160, supported as hereinafter stated.

Secured to the top of the main body 1, of the machine, at opposite sides thereof, adjacent said side members 150—150, are slideway and bearing members 161—161′, said member 161 being provided with a lateral extension 161ª. Slidably mounted over said bearing members 161—161′, are block-like members 162—162′. Rotatably mounted upon the extension 161ª, is a crank disk 163, upon the upper end of a shaft 163′, having a bearing at its lower end in an arm 164, Fig. 2, mounted upon the side of the body of the machine. Said crank disk 163, is provided with two upstanding crank pins, 163ª and 163ᵇ, the pin 163ª being connected by means of a link 163ᶜ, with the block-like member 162, and the pin 163ᵇ, being connected by means of a link 163ᵈ, to the end of an arm 165, which is extended across the machine and connected to the block-like member 162′, at the opposite side of the machine. Thus it will be seen that as said crank disk 163, is oscillated in opposite directions by its shaft 163′, in a manner hereinafter described, it will operate through the links 163ᶜ—163ᵈ, to move the block-like members 162—162′ toward and from each other on the slide and bearing members 161—161′. Mounted upon said block-like bearing members 162—162′, are two sleeves 166—167, Fig. 41, provided at their lower ends with arms, 166ª and 167ª, respectively, and at their upper ends with arms 166ᵇ, and 167ᵇ, respectively. To the arms 166ª and 167ª, are secured the vertical pins 159 and 160, upon which the bearing sleeves 158ᶜ—158ᵈ slide. Said pins 159 and 160, at their lower ends pass through slots in the block-like members 162—162′, and are provided at their lower ends with anti-friction cam rollers 159ª and 160ª, adapted to work in cam slots, as 161ᵇ, so that as said block-like members 162 and 162′ are moved toward and from each other, in the manner hereinbefore described, they will cause said pins 159 and 160 to be moved in the slots 161ᵇ, and thereby move the forming member 158, toward and away from the presser members, and through the operation of the cam disk 163 and its connecting links 163ᶜ—163ᵈ, moves the body of the forming member longitudinally and the movable end portion of the forming member 158ᵇ, thereon, in an opposite direction, whereby to move said forming member away from the presser members, both at the long side and at the ends, whereby to give the necessary clearance for the forming member to be moved, not only outwardly, but downwardly into the dotted line position shown in Fig. 44. The sleeve members 158ᵇ—158ᶜ, are each provided with a forwardly and downwardly projecting arm, as 158ᵉ, Fig. 44, bearing at their lower ends upon lifting pins as 158ᶠ, projecting laterally from arms, as 158ᵍ, mounted at the opposite ends of a sleeve 168, upon the shaft 154, one of said arms 158ᵍ, constituting a part of a bell crank, the other arm of which is designated 158ʰ, Figs. 41 and 44, and is secured by means of a bar 169, to the upper end of an operating pivoted lever 170, as shown in dotted lines of Fig. 1, said lever being operatively connected at its lower end in a cam groove 7ᵇ, in the cam cylinder 7, as at 170ª, whereby said sleeve 168 and the arms connected to its opposite ends can be intermittently rocked to raise and lower said forming member 158, and at the same time permit the latter to be moved slightly outwardly before being lowered, as hereinbefore referred to, and as will be clearly understood by reference to Fig. 44.

The presser members 151 and 152, are recessed at their opposite ends, as at R, and are provided with rotating portions 151ª and 152ª, at the opposite ends of the pressing faces of said presser members 151 and 152, whereby as said revoluble portions are turned down into operating positions, as shown in Fig. 46, their flat portions form continuations of the pressing faces of said members 151 and 152, and when turned out of their operating positions, as shown in Fig. 47, they leave exposed the ends of the cuff being pressed between said presser members, as clearly indicated in Fig. 47, whereby it is possible for transfer clamps, as hereinafter referred to, to be inserted into the recesses R at the opposite ends of said presser members, for the purpose of gripping the ends of the cuff, which has been pressed, and for removing the same from the presser members. In order that these revoluble members may be simultaneously operated, they are each provided at one end with a segmental gear portion, as at 151$^b$—152$^b$, Fig. 41, adapted to be operated upon by reciprocating rack bars 151$^c$—151$^c$, which are operated by a gear 151$^d$, common to both rack bars, as clearly shown in Fig. 41, said lower presser member 152, being provided with the same kind of mechanism, operated in the same manner. In order that said rack bars may be normally held in their outermost positions, coiled springs 151$^e$ and 152$^e$, are interposed between them, so as to keep them moved to their outermost positions and to normally hold the revoluble end portions 151$^a$ and 152$^a$, in their normal, or pressing positions, which are as shown in Fig. 46.

In order to operate said rack bars 151$^c$—151$^c$, and 152$^c$—152$^c$, an operating shaft 171, is mounted at the side of the machine, as indicated in Figs. 2 and 41, and provided near its upper end with laterally projecting fingers 171$^a$ and 171$^a$, adapted to intermittently press inwardly on the ends of the racks 151$^c$ and 152$^c$, as clearly shown in Figs. 41 and 43. Said shaft 171 is provided at its lower end with a crank arm 171$^b$, operatively connected by means of links, as shown in Fig. 2, to the upper end of a bell crank 171$^c$, which is pivotally mounted in the side of the machine, as at 171$^d$, and connected at its opposite end, as at 171$^e$, in the cam groove 7$^c$, whereby said shaft 171 and the operating fingers 171$^a$—171$^a$ can be intermittently rocked to operate said rack bars, for the purpose of intermittently removing said revoluble end portions of the presser members away from the ends of the cuffs, as indicated in Fig. 47. Cover plates 172 and 173, are mounted over the edges of said presser members 151 and 152, in order to retain said rack bars in their proper places, as will be understood by reference to Figs. 41 and 44.

The presser members 151 and 152, it will be noted by reference to Figs. 44 and 47, are hollow, and have connected thereto, steam supply pipes 151' and 152', which supply pipes may be connected to any source of steam supply, or other heating medium, for the purpose of heating said presser members.

I will next describe the mechanism adapted to turn the rear, or unsewed edges of the cuff inwardly, as the cuff is being placed between the presser members 151 and 152, as shown in Figs. 42 and 44. Said mechanism comprises two plate members 174 and 175, the upper member 174 being provided along its lower edge with an inturned lip portion 174$^a$, and the lower member 175, being provided along its upper edge with an inturned lip portion 175$^a$, said inturned lip portions, 174$^a$ and 175$^a$, being adapted to fit the tapered corner of the presser members 151 and 152, as indicated in Fig. 44. Said members 174 and 175, are attached to the outer ends of plate members 174$^b$ and 175$^b$, there being three of each slidably mounted, respectively, upon the tops and bottoms of the presser members 151 and 152. Said plate members, 174—175, are also provided with extensions 174$^c$ and 175$^c$, which extensions are provided at their upper and lower ends, respectively, with inwardly projecting cam heads 174$^d$ and 175$^d$. The carrying plates 174$^b$ and 175$^b$, are provided at their ends with lug heads 174$^e$ and 175$^e$, through slots in the extension members 174$^c$ and 175$^c$, as clearly shown in Fig. 42, whereby to permit movement of said members 174 and 175, relative to said lugs, as indicated by the dotted line positions of the members 174 and 175 in Fig. 44, the lugs, or heads 174$^e$ and 175$^e$, being shown in Fig. 42, but omitted from Fig. 44, in order to avoid confusion of the lines. The end lugs 174$^e$ and 175$^e$, are provided with short arms 174$^f$ and 175$^f$, upon which bear coiled springs 174$^g$ and 175$^g$, which rest at their opposite ends upon supporting lugs 174$^h$ and 175$^h$, whereby to normally move said inturning plate members 174—175, away from the presser members 151 and 152, as shown in dotted lines, Fig. 44. Said plate members 174$^b$ and 175$^b$, are also provided opposite the cam heads 174$^d$ and 175$^d$, with upstanding lug members 174$^i$ and 175$^i$. Mounted above and below the presser members 151 and 152, are two shafts 176 and 177, provided at their outer ends with segmental gears 176$^a$ and 177$^a$, and also provided, each with three cam members, as 176$^b$—177$^b$, said cams 176$^b$, operating between the cam heads 174$^d$ and the lugs 174$^i$, and the cams 177$^b$, operating between the cam heads 175$^d$ and the cam lugs 175$^i$, each of said cams having a small portion operating against the cam heads 174$^d$ and 175$^d$, and a larger portion operating against the lugs 174$^i$ and 175$^i$, whereby as said shafts 176 and 177, are oscillated in one direction, the small portions of said cams operate to move the cam heads 174$^d$ and 175$^d$, upwardly and downwardly, respectively, and their larger portions operating upon the cam lugs 174$^i$ and 175$^i$, to move the carrying plates 174$^b$ and 175$^b$, rearwardly, thus moving the inturning members 174 and 175, to the operating positions shown in solid lines, Fig. 44. As said shafts 176 and 177 are rocked in the opposite direction, the larger portions of the cams 176$^b$ and 177$^b$, move against the cam heads 174$^d$ and 175$^d$, to force said inturning plates 174 and 175 outwardly to the dotted line positions, shown in Fig. 44, the coiled springs 174$^g$ and 175$^g$, operating to move downwardly and upwardly, respectively. Thus as the shafts 176 and 177, are oscillated, the inturning plate members 174 and 175, are intermittently moved from dotted line position, as shown in Fig. 44, to the solid line position shown therein. Said shafts are oscillated by means of segmental gears 178 and 179, upon a vertical shaft 180, provided at its lower end with a crank arm 181, connected by means of a link 182 to the upper end of an arm 183, pivotally mounted in the side of the machine, as at 184, and connected at its lower end with a cam groove $7^d$, in the cam cylinder 7, as at 185, whereby said vertical shaft 180 is oscillated from said cam cylinder 7, for operating said inturning plates 174 and 175.

As the turned cuff with the follower plate 84 therein moves between the presser members 151 and 152, as shown in Fig. 44, the rear or unsewed upper and lower edges of said cuff lie, respectively, adjacent the inturned lip members $174^a$ and $175^a$, which are then in the solid line position, Fig. 44. Very soon after the entrance of the cuff into the presser members, said inturning members 174 and 175, are moved slightly backwardly and downwardly, bearing the rear edges of said cuff toward each other, at which time the upper and lower spring portions 86—86 of the follower plate, are moved rearwardly and are spread farther apart by the diamond shape cam $84^c$, on the follower plate 84, as indicated in dotted lines, Fig. 44, (also Fig. 23), whereupon the inturning plates 174 and 175, are again moved, inwardly and apart, turning the rear, or unsewed edges of the cuff inwardly around the edges of the spring members 86—86, after which said spring members 86—86, are moved forwardly again and the inturning plates are tightened up against the presser members 151 and 152, which presser members are at this time moved a little farther apart to give clearance, and the follower plate 84 is withdrawn from between said presser members. The presser members are then closed, pressing the whole cuff, including the inturned rear edges thereof.

Coöperating with the infolding members, which operate upon the rear, unsewed edges of the cuff in the manner just described, there are mounted upon the opposite sides of the body of the machine, adjacent said presser members 151 and 152, and coöperating therewith, two similar mechanisms adapted to reach into said presser mechanism and grip the upper and lower plies of the material at the inturned ends thereof, near the rear edges, and to hold said ends in an inturned position while the rear unsewed edges of the cuff are folded inwardly for the pressing operation, as just described, thereby preventing the ends or rear corners of the cuff from opening outwardly as the rear edges are turned inwardly. These mechanisms at the opposite ends of the presser members are alike and a description of one of them will be sufficient, as they are connected together and operated simultaneously in exactly the same way. Mounted upon the opposite sides of the body, 1—1, adjacent said presser members 151 and 152, are supporting members 200, each having a laterally projecting portion, as indicated in Figs. 42 and 46, which show the attached ends of these mechanisms, while Figs. 49 to 53 inclusive, show the details of said mechanism, now to be described. The laterally projecting members 200, are each provided with a dove-tailed slideway therein, within which is slidably mounted a beveled carrying member 201, upon which is mounted to move therewith most of the operating mechanism of this part of the machine. Said laterally projecting supporting members 200—200, each have through their sides a round opening $200^a$, through which projects a bearing sleeve or spindle 202, mounted upon and moving with the carrying plate 201. Also mounted upon said carrier plate within said opening and adjacent said spindle 202, is a pin 203. Rotatably mounted upon said spindle 202, is a crank plate, or member, 204, provided with a crank pin $204^a$, a cam extension $204^b$, adapted to engage a first cam member 205, mounted upon the body 200. Said member 204, is also provided in its edge with stop notches $204^c$ and $204^d$, facing each other, as clearly indicated in Figs. 51 and 52, and adapted to alternately engage the pin 203, as it is oscillated upon the spindle 202. Connected at one end of the crank pin $204^a$, is a pitman arm 206, connected at its opposite end to a stud 207, projecting through a slot $200^b$, in the body 200, and mounted upon a slide member 208, slidably mounted in the carrier plate 201, and moving therewith, which said slide member 208 extends outwardly from the end of the body 200, and is provided with a coiled spring $208^a$, bearing at its outer end against a collar $208^u$, and at its inner end against the end of the carrier plate 201, whereby to normally move said slide member 208 outwardly through the carrier member 201. Also mounted upon said slide member 208, and projecting through a slot $200^c$, in the carrier member 201, is a fixed arm $208^c$, clearly shown in Figs. 49 and 50. Mounted upon the carrying plate toward its outer end, is a block, or member 209, to which are attached at their outer ends two pairs of spring prongs, or fingers, 210 $210^a$ and 211 $211^a$, said pairs of prongs or fingers at their inner ends being adapted to be moved together and apart in pinching fashion, as shown in Fig. 52. Slidably mounted between each pair of said spring prongs, or fingers, are slide members, as $210^b$ and $211^b$, projecting beyond said block member 209, at their outer ends, as shown in Figs. 49 and 50, whereby said slide members are moved longitudinally through said block member 209, and between their respective pairs of prongs, or fingers. At their forward ends, said slide members are provided with cam heads 210ᶜ and 211ᶜ, each having an inclined cam surface operating through apertures in the spring prongs, or fingers, 210—211, as will be understood by reference to Figs. 50, 51 and 52, whereby as said slide members 210ᵇ and 211ᵇ, are moved inwardly by the arm 208ᶜ, said cam heads 210ᶜ and 211ᶜ, operate to move the fingers of their respective pairs apart, as indicated in Figs. 50 and 51. Mounted upon the forward end of the finger prong 210, is a cam lug 210ᵉ. Slidably mounted in the side of the body 200, above the fingers 210 and 211, is a cam member 212, provided at its forward end with a cam head, 212ᵃ, adapted when moved forwardly to engage the cam lug 210ᵉ, and to depress the prongs, or fingers, 210—210ᵃ, in the manner indicated in dotted lines in Fig. 52. Said cam member 212, is provided with a laterally projecting pin 212ᵇ, which extends through a slot 200ᵉ, in the body 200, as shown in Fig. 52. Mounted upon the side of the body 200, is a bearing stud 200ᵈ, upon which is mounted a 3-armed bell crank, 213, one arm 213ᵃ, of which is slidably connected with said pin 212ᵇ, the arm 213ᵇ, of which is connected by means of a link or connecting rod 214, to the corresponding part of the other similar mechanism at the opposite side of the machine, and the other arm 213ᶜ, of which is connected by means of a link or connecting rod 215, to a crank member 216, upon the end of a rod 217, extending along the side of the machine and provided at its opposite end with an arm 217ᵃ, the end of which is operatively connected in a cam groove in the inner face of the gear 12, as at 217ᵇ. The arm 213ᵃ of said 3-armed bell crank, is provided with a pivoted pawl member 218, provided at its long end with a notch 218ᵃ, adapted to engage, at times, with the pin 203, fixed on the carrier member 201, and projecting through the opening 200ᵃ, in the body 200, said pawl being normally pressed downwardly by means of a spring 218ᵇ. A stop pin 219, is mounted on the 3-armed bell crank 213, and against which the opposite end of said pawl 218 strikes near one limit of its movement. Also mounted upon the side of the body 200, is a lug member 220, adapted to be engaged by the cam portion 204ᵇ, on the crank cam 204, when the latter has been moved, bodily, forwardly with the carrier member 201, as shown in Fig. 52, whereby the cam portion 204ᵇ, of the cam disk 204 (the same being in the same relative position as shown in Fig. 51), strikes the lug member 220, so as to turn said member 204 and move the pin 204ᵃ, downwardly off of center, whereby the pitman 206, under the action of the spring 208ᵃ, moves it around to the position shown in Fig. 52.

The block member 209, is provided with a laterally extending pin 209ᵃ, and is connected by means of a spring 221, connected at its forward end to a pin 222, on the side of the member 200, as clearly shown in Fig. 50, whereby it tends to normally draw said block member 209, and the spring prongs, or fingers, connected therewith, inwardly toward the machine proper, together with the other members.

Referring to Fig. 40, I have shown in a diagrammatic manner, the various movements and positions of the transfer and turner mechanisms, the different positions assumed thereby during their travel in one direction, as indicated by the arrow, being shown at the top of the figure, and the different positions assumed thereby, during their travel in the other direction, being shown at the bottom of the figure. Referring to the top of Fig. 40, and to the right-hand side thereof, the transfer jaws 140—141, and the turner loop 136, as shown in full lines, position A, have just finished the turning operation of a cuff between the presser members, as will be understood by reference to Fig. 46, the jaw members still gripping the sewed ends of the cuff, as shown in said Fig. 46, with the cuff stretched between the jaw members at the opposite sides of the machine. The loop 136, is in its raised position, above the jaw members, as indicated in dotted lines, Fig. 34. The next movement is inwardly a short distance to slacken the cuff, as indicated in dotted line in said A-position, and the opening of the jaw members, after which said mechanism moves directly outwardly to the B-position, the loops and the jaw members still standing in the same positions relative to each other, as shown. Said transfer and turner members are then moved outwardly and to the C-position, the jaw members not being indicated, but they remain in the same relative position shown in the B-position to permit of the expansion of the follower plate, the forward edge of which is within the cuff, occupying the position therein just vacated by said transfer jaws, long enough to shape the cuff and during the infolding of the rear or unsewed edges thereof, and during the pressing of the cuff, as hereinbefore described in connection with Figs. 41, 42 and 43. The transfer and turning members stand in the C-position until the follower plate is compressed and moved outwardly from the cuff between the presser members, and downwardly to a position below the swinging plane of the transfer jaws 140 and 141, and then toward the front of the machine between said transfer and turner members.

During the movement from the C to the D-positions the transfer jaws 140—141, also swing around to the opposite side, and the transfer and turner members move inwardly and forwardly to the D-position, and thence forwardly to the E-position, the loop 136, having been drawn downwardly in horizontal alinement with the jaws, as indicated in full lines, Fig. 34, and the jaws having been opened so that as they pass to the E-position, they pass over the exposed ends of the cuff, between first sewing machine clamps 50—51, as may be seen in Fig. 15. The sewing machine base, hereinafter described, and shown in full lines in Fig. 40, has been expanded, as indicated in dotted lines in said Fig. 40. The transfer jaws are closed upon the ends of the cuff in this position, and are ready to remove the same therefrom as soon as the clamps 50—51 open. As soon as this takes place said transfer and turner members are moved slightly inwardly, to slacken the cuff, as indicated in dotted lines, Fig. 15, and the loop 136, moves between the plies of the cuff, as clearly indicated in Fig. 15, occupying the position shown in dotted lines in said Fig. 15, and also in the F-position of Fig. 40. The filler mechanism 57, as said loop moves into the cuff, is moving outwardly and upwardly out of the way, as shown in dotted lines, Fig. 12. As the loops 136 move into the cuff, the wings 57$^b$ of the follower plate are moving inwardly toward each other, and the whole follower plate is starting outwardly to the dotted line position. The loops 136, therefore, press downwardly on the outer arms 57$^c$ of the U-shaped members, flexing said members in a way to spread the plies of the material so as to facilitate the entrance of the loops 136 thereinto. The transfer jaws and the loops, while still occupying the same relative positions, as shown in the F-position of Fig. 40, are moved outwardly to the G-position, carrying the cuff with them, with the loops between the plies thereof. They stand in this position for a short time, during the retirement of the feeding mechanism, which has moved into the first sewing machine press with another set of material blanks. During this pause, the sewing machine base members hereinafter described, stand in expanded position, indicated in dotted lines, Fig. 40, to permit said feeding mechanism to place another set of material blanks in the sewing machine press. The transfer and turner members next move forwardly, carrying the cuff with them, above the follower plate, which has been moved downwardly and toward the front of the machine, to a position adjacent the presser members, shown in full lines in the H-position of Fig. 40. Said transfer and turner members are then moved bodily inwardly, as indicated in dotted lines in the H-position of Fig. 40, after which the loop 136 swings outwardly toward the transfer jaws 141 to the $a$-position, and the jaws then swing inwardly through the loops and move to the $b$-position, carrying the ends of the cuff through the loops and stretching them around the loops, while the rear or unsewed selvage edge of said cuff is being held by the follower plate, in the manner hereinbefore described. The transfer jaws 140—141, continue to swing forwardly toward the presser members, the follower plate moves forwardly with the rear, or selvage, edge of the cuff, and the loop swings forwardly to the presser members and to the $c$-position at a greater speed than the movement of the jaws, until the loops are substantially parallel with the jaws, and adjacent the presser members, whereupon the loops are raised above the transfer jaws and stand crosswise of the machine, as in the $c$-position, while the transfer jaws are swung inwardly between the presser members to the $d$-position, shown in dotted lines, Fig. 40, which is also the same position as shown in solid lines in the A-position of said Fig. 40, which was the starting place of this description of the movements of the transfer and turner mechanisms. In this position the cuff is in a turned condition and is stretched between the jaw members at opposite sides of the machine, said jaw members being clamped upon the inturned sewed ends of the cuff. The next movement is the opening of the jaw members and the slight inward movement of the transfer and turner members, as shown in dotted lines in the A-position of said Fig. 40, whereupon the operation is repeated.

I will next describe a transfer mechanism for removing the cuffs, one by one, from the presser mechanism, and transferring them to a second sewing machine clamp for a second sewing operation. This mechanism is shown in Figs. 54 to 57 inclusive, and is also seen in the general top plan view of the whole machine, Fig. 5. Slidably mounted in the top of the machine is a carrier plate 225, operated by means of a stud connection, as at 225$^a$, with a cam groove 8$^c$, in the cam cylinder 8, whereby said carrier plate 225, is moved forwardly and thence backwardly, in timed relationship with the other mechanism, as said cam cylinder 8, is revolved. Mounted upon said carrier plate, is a standard 226, through which is fixedly mounted a bearing sleeve 227. Rotatably mounted in said bearing sleeve 227, is an operating tubular member 228, having mounted thereon, adjacent the opposite ends of the bearing sleeve 227, two pairs of transfer jaw members 229—229, each of said jaw members being provided at its attached end with fingers 229$^a$ and 229$^b$, as clearly indicated in Figs. 55 and 56. Projecting upwardly from each of the fingers 229$^b$, through the fingers 229$^a$, are pins 229ᶜ, provided at their upper ends with collars 229ᵈ, and having coiled springs 229ᵉ, mounted thereon, between said collar and the upper fingers 229ᵈ, which springs operate through the fingers 229ᵃ—229ᵇ, to normally hold the transfer jaw members 229, closed. The fingers 229ᵃ, are provided with angular extensions 229ᶠ, which project through slots in the tubular member 228, and are engaged by a cam rod 230, having cam notches therein, as at 230ᵃ, adapted when said cam rod is moved longitudinally within said tubular member 228, to lift the extension 229ᶠ, and through its connections to open one of the jaw members 229. Said cam rod 230, has a reduced portion 230ᵇ, as seen in Fig. 57, upon which, within the tubular member 228, is a coiled spring 231, bearing at one end against an annular fixed portion on the inside of said tubular member 228, and at its opposite end against said rod 230, whereby to normally hold said rod with the cam surfaces 230ᵃ, in an inoperative position relative to the extension fingers 229ᶠ. Said rod 230 extends through the end of tubular member 228, as clearly shown in Figs. 55 and 57, and is adapted to be engaged by an operating bar 232, mounted upon arms 233—233, pivotally attached to the side of the machine, as at 234, and extending along the course of travel of said transfer members, as will be understood by reference to Fig. 5, one of said arms 233, being in the form of a bell crank and attached by means of a link 235, to a bell crank 236, seen in Fig. 1, pivotally mounted in the side of the machine as at 236ᵃ, the other end of which bell crank is operatively connected with a cam groove 7ᵉ, in the cam cylinder 7, as at 236ᵇ, whereby said operating bar 232 is intermittently moved to move said cam rod 230 longitudinally and thereby intermittently open and close the jaw members 229—229.

Figure 5:
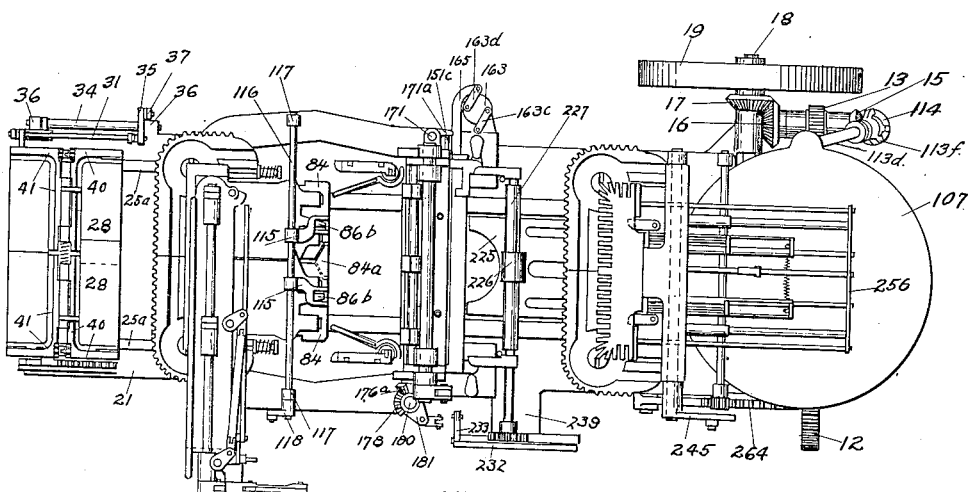
Fig. 5 is a top plan view of the machine.
Figure 7:
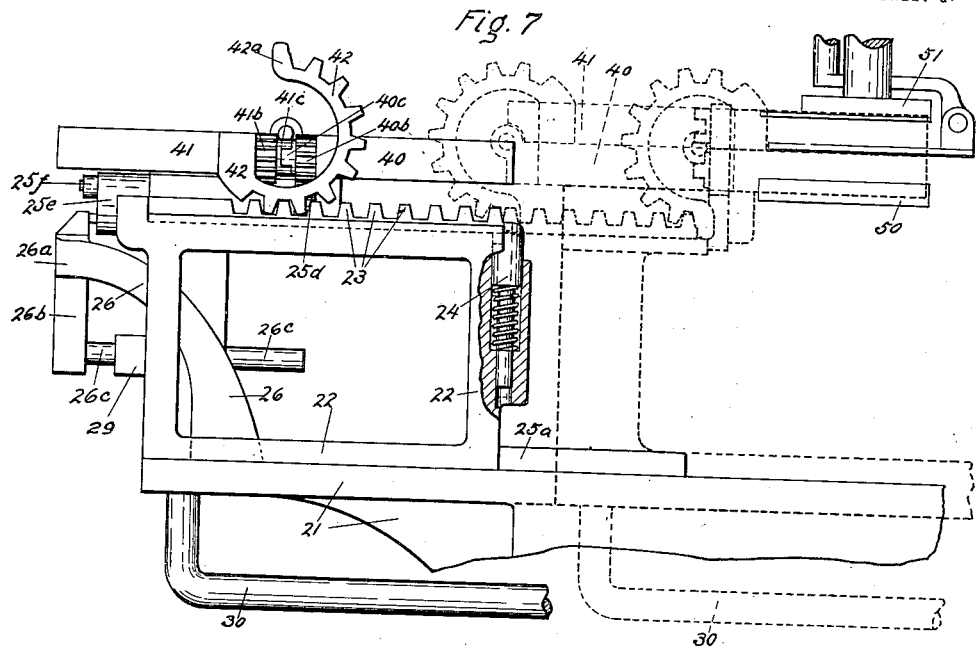
Fig. 7 is an enlarged side elevation of the feeder mechanism, located at the front end of the machine, showing its parts in their normal positions in full lines, and in intermediate, and in fully advanced, positions in dotted lines.

The tubular member 228, is provided at one end with a gear segment 237, adapted to mesh with a rack bar 238, fixedly mounted upon a supporting extension 239, on the side of the machine, as shown in Fig. 5, and positioned so that as said carrier plate 225, and the mechanism just described, is moved forwardly and backwardly, said segmental gear 237, will engage said rack bar 238, and thereby revolve, or oscillate, said tubular member 228, and the jaws 229—229, mounted thereupon and turning therewith, from one side to the other, as shown in full and dotted line positions thereof, in Fig. 54. In the dotted line position, at the left of said Fig. 54, said jaws have been moved forwardly, in open condition, between the presser members 151—152, and over the opposite ends of the cuff edges, as will be understood by reference to Fig. 47. As the carrier plate 225, and the transfer mechanism mounted thereon, are moved in the opposite direction, the presser members 151 and 152, having opened, and the jaw members 229—229, having closed, it will be evident that the cuff will be carried with the jaw members 229—229, straight out from between the presser members 151—152, until the gear segment 237 engages the rack bar 238, whereupon said segmental gear 237, and the transfer jaws will be turned over to the position shown in solid lines in Fig. 54, and the continued movement thereof, to the dotted line position at the right hand side of Fig. 54, stopping between a second sewing machine clamp mechanism, the upper and lower jaws of which are designated 240 and 241. The cam rod 230 is again moved by the operating bar 232, upon the jaws 229—229, of the transfer mechanism, and the sewing machine clamps 240—241, close upon the cuff, and the transfer jaws are carried back to their normal, or rest, position, which is as indicated in Fig. 1.

In order to hold the tubular member 228, and its transfer jaws 229—229, from turning loosely during the time the gear segment 237, is disengaged from the rack bar 238, a spring plate 239, is mounted to bear yieldingly thereupon, as shown in Figs. 55 and 57. The bearing sleeve 227, at and beyond the jaw 229, is cut away for a portion of its length, as clearly indicated in Figs. 55 and 56, and a stop lug 228ᵃ, is mounted on the tubular member 228, and is adapted to stop the revolving movement at opposite sides, by engaging with the edges of the bearing sleeve member 227. The cam rod 230, while slidably mounted within the tubular member 228, must also rotate therewith, because of the bearing of the finger extensions 229ᶠ—229ᶠ, upon flat surfaces thereof, at the lower side of the cam surfaces 230ᵃ—230ᵃ, whereby said jaw members 229—229, can be opened and closed at either limit of their travel, from one dotted line position, shown in Fig. 54, to the other dotted line position, shown in said Fig. 54, in one instance opening and closing to pick up the cuff, and in the other instance opening to deliver the cuff to the second sewing machine clamps 240—241.

I will next describe a mechanism for removing the finished cuff from the second sewing machine clamps and for passing them rearwardly in position to be removed from the machine. Mounted upon the top of the machine proper, at opposite sides thereof, are two supporting standards as 242—242, shown in Figs. 1, 2 and 60.

Also mounted upon the top of the machine between the standards 242—242, is an upstanding bracket member 243, having a forwardly projecting ledge or clamping member 244, which constitutes the fixed clamp of the second sewing machine clamping mechanism, hereinbefore referred to. Movably mounted above said clamp member 241, is a coöperating clamp member 240, supported at its rear edge upon a rocker member 244, which is mounted in the standards 242—242, and provided at one end with a crank arm 245, connected by means of a link 246, to one arm 247, of a bell crank, pivotally mounted in the side of the machine, as at 248, Fig. 1, the other arm of which bell crank is operatively connected with a cam groove 7$^f$, in the cam cylinder 7, and by means of which said crank arm 245, and the movable clamp member 240, are intermittently rocked in order to open and close said second sewing machine clamp member 240. Extending rearwardly from the bracket member 243, is a frame composed of the rods, 249, 250, 251, 252, 253, 254 and 255, anchored at their rear ends by means of a connecting plate 256. Rotatably mounted upon the rods 252 and 253 are two sleeves 252$^a$ and 253$^a$, having arms 252$^b$ and 253$^b$, at their opposite ends and intermediate their ends, for supporting rods 252$^c$ and 252$^d$, and 253$^c$ and 253$^d$, respectively, the rods 252$^d$ and 253$^d$ extending only between the arms 252$^b$ and 253$^b$ at the front ends of the sleeves 252$^a$ and 253$^a$, and the middle arms on said respective sleeves. A spring 257 attached to downwardly projecting fingers on the sleeves 252$^a$ and 253$^a$, operate to turn said sleeves in opposite directions and so as to hold their respective arms, 252$^b$ and 253$^b$, down in the positions shown in Fig. 60.

Slidably mounted upon the rods 249 and 250, are tubular racks 258 and 259, adapted to be moved upon said rods 249 and 250, by means of gears 260, mounted upon a cross shaft 261, and supported in bearing brackets, as 262, mounted upon the top of the machine at opposite sides thereof, as will be understood by reference to Fig. 60, said shaft 161 being provided at one end with a gear 263, adapted to be actuated by means of a gear segment 264, upon the upper end of an arm 265, pivotally mounted upon a shaft 266 in the side of the body of the machine, which shaft is also provided with an arm 267, indicated in dotted lines, Fig. 1, and having its opposite end operatively engaged with a cam groove 7$^g$, in the cam cylinder 7, by means of which said arm 265 and its gear segment 264, are oscillated for the purpose of operating said shaft 261, and thereby moving said tubular racks 258 and 259 longitudinally upon said rods 249 and 250. Said tubular racks are connected at their forward ends by means of a cross bar 268, and are provided opposite each other with upstanding brackets 269 and 270, connecting which is a shaft 271, adapted to be oscillated therein, for a purpose hereinafter described. Mounted upon the middle of said shaft 271, is a cam finger 272, adapted when said shaft 271 is moved forwardly, to engage a rearwardly projecting stud 273, mounted in the bracket member 243, whereby said shaft 271 is rocked rearwardly. An upstanding cam finger 274, is mounted upon the rod 251, as clearly indicated in Figs. 58 and 59, and is adapted to engage the cam finger 272, upon said shaft 271, when the latter has been moved with the tubular racks 258 and 259 rearwardly, upon the rods 249 and 250.

Mounted upon the connecting bar 268, adjacent the tubular racks 258 and 259, are upstanding studs 268$^a$—268$^a$. Slidably mounted upon said studs 268$^a$—268$^a$, are tubular members 275—275, provided at their lower ends with supporting arms 275$^a$—275$^a$, and at their upper ends with spring jaw members 275$^b$—275$^b$, as clearly seen in Fig. 58, which jaw members have laterally projecting arms 275$^c$—275$^c$, adapted to under lie and support the rods connecting the arms 252$^b$ and 253$^b$, upon the sleeve 252$^a$ and 253$^a$, and by means of which said arms 252$^b$, are raised in a manner hereinafter described.

Telescopically mounted over said tubular members 275—275, are sleeves 276—276, provided at their upper ends with jaw members 277—277, adapted to coöperate with the jaw members 275$^b$—275$^b$. Mounted upon said tubular members and sleeves are coiled springs 278—278, bearing at their lower ends upon the arms 275$^a$, attached to the lower ends of the tubular members 275, whereby to move the latter downwardly, and at their upper ends bearing against the jaw members 277, mounted upon the sleeves 276, whereby to move said jaw member 277 upwardly, against the jaw member 275$^b$. Thus said jaw members 275$^b$ and 277 are normally held yieldingly together. Mounted upon the shaft 271, which extends between the upstanding brackets 269—270, at its opposite ends are two rocker levers 279—279, one end of each of said rocker levers is connected by means of bent links 280—280, to the lower jaw members 277—277, and the opposite ends of said rocker lever 279, are connected by means of bent links 281—281, with the arms 275$^a$—275$^a$, upon the lower end of the tubular members 275—275.

Thus it will be seen that when said shaft 271 is rocked by the engagement of the cam finger 272 thereon, with the upstanding cam finger 274, said rocker arms 279 and their bent links 280 and 281, are rocked into the positions shown in dotted lines in Fig. 59, which operates to lift the supporting arms 275$^a$ and their tubular members 275 and the jaw 275$^b$, and to depress the jaw members, 277, thereby opening the jaw members, as indicated in dotted lines, Fig. 59. As said jaw members are opened the cuff, which is being removed, is left lying across the rods 254 and 255, which, it will be noticed, taper downwardly at their forward ends, so as to raise the outer ends of the cuff being drawn backwardly by said jaw members. As said upper jaw members 275<sup>b</sup>—275<sup>b</sup>, commence to open, the cuff stops on the supporting rods, while a further slight rearward movement of the jaw mechanisms gives clearance between the rear edge of the cuff and said jaw members, and the continued upward movement of the jaw members 275<sup>b</sup>—275<sup>b</sup>, by means of their arms 275<sup>c</sup>—275<sup>c</sup>, lift the rods 252<sup>c</sup> and 253<sup>c</sup>, upwardly with them under the cuff, thereby raising the middle portion of the cuff above said jaw members, and so as to permit the jaw members to pass forwardly again under the cuff, for the purpose of removing another cuff from the sewing machine clamps, 240—241.

As the tubular racks and the mechanism carried thereby, are moved forwardly, to the position shown in solid lines in Fig. 59, the cam finger 272, upon the shaft 271, engages the rearwardly extending stud 273, and rocks the rocker arms 279—279, and the bent links 280—281, off of center position, shown in dotted lines, Fig. 59, whereupon the springs 278—278, continue the movement and close the jaw members 275<sup>b</sup> and 227, upon the cuff C, shown in section between the two clamping members 240 and 241, Fig. 59.

I will next describe one of the sewing machine mechanisms and its supporting and guiding base. As these sewing machine mechanisms are substantially alike, it will not be necessary to describe both of them. Before describing the same in detail, a brief general statement of the functions performed by said sewing machine mechanisms may assist in more readily understanding the same.

Assuming that the sewing machine has just finished one trip across the machine and has come to a full stop at the end of its supporting guiding base, with the needle and thread take-up in raised or clearance positions, the guide base next expands carrying the sewing machine with it, and drawing the thread from the spool and bobbin so that it may be cut at a place to leave long ends for starting the next stitches, and also giving clearance for the thread cutters which are then tripped and perform their function of cutting the thread. The sewing machine clamps, or work holders, are then opened to release the sewed cuff and to receive another. After the feeding or transfer mechanism has retreated, the sewing machine guide base closes together, carrying the sewing machine with it to its starting position. At this instant the controlling mechanism for the sewing machine is released and the sewing machine starts on its sewing trip around the edge of the cuff, being propelled by one of its gears which is in mesh with the rack around the edges of the guide base. As the sewing machine turns the corner of the guide base and the rounded corners of the cuff being sewed, the speed of its propelled gear is accelerated in order that the same uniform stitch around the corners of the cuff may be maintained as are made along the sides of the cuff. At the finish of the trip of the sewing machine, the mechanism which controls the reversing of the sewing machine propelling gears is released, and mechanism is set for stopping the sewing machine as it finishes this trip. The machine finishes its trip and is then stopped with the needle and thread take-up raised. The thread is released and the guide base of the sewing machine opens, carrying the sewing machine with it, and drawing the thread from the spool and bobbin in the manner referred to at the beginning of this description.

Referring to the general views, Figs. 1 and 2, the sewing machine supporting and guiding bases are each designated 300, each being composed of two members mounted to slide toward and from each other upon slide-ways 301, and each provided around its end and along one side with a rack 302, and each having relatively deep guide-ways 303, with T-shaped bottoms, as at 304, and extending at right angles with each other lengthwise of said base and across its opposite ends, said guide-ways meeting in an enlarged circular cavity 305, at each corner of said base. Centrally mounted in each of said corner cavities is a turn block 306, having therein a corresponding guide-way 307 adapted to register with the guide-way 303, extending lengthwise of said base when the blocks 306 are in one position, and to register in with the guide-ways 303 across the ends of the base when they are given a quarter turn, as indicated in dotted lines at the right hand side of Fig. 76. Extending through said base parallel with said guide-ways 303, is a clearance groove 308, for a downwardly projecting portion of the sewing machine hereinafter referred to. Each half of said sewing machine supporting and guiding base is provided on its under side with a cam pin as 309. In Fig. 40 of the drawings in which the supporting and guide base for the front or first sewing machine mechanism is shown, the cam pins 309 project down through cam slots, or guide-ways, 129<sup>a</sup>, in the Y-shaped cam plate 129, hereinbefore described, whereupon as said Y-shaped cam plate 129 is moved longitudinally of the machine, the two parts of said sewing machine supporting and guide base are spread apart and drawn together, as indicated in the dotted lines in said Fig. 40, for a purpose hereinafter again referred to.

In Fig. 76 the parts of said sewing machine supporting and guiding base are moved apart and together in a similar manner by means of a cam plate 225, having cam slots 225^b—225^b, therein, into which the cam pin 309 from the under side of each part of said base projects, as clearly indicated in said Fig. 76. Said cam plate 225 is provided on its under side with a cam pin, or stud, 225^a, which projects down into one of the cam grooves in the cam cylinder 8, whereby said cam plate 225 is moved back and forth longitudinally of the machine. Said cam plate 225 also carries the upstanding arm, or standard, 226, for the transfer mechanism, as hereinbefore described.

Referring now to Figs. 61, 61^B, 62 and 63 of the drawings, one of the traveling sewing machines is shown from four different sides thereof, and in Fig. 62 it is shown in relationship to said guide base 300. Said sewing machine comprises a base plate 310, shown in plan view in Fig. 64, and is provided on its under side with a downwardly projecting web, or guide plate, 311, having along its lower edge a T-portion 312, said guide plate, or web, being adapted to fit in the guide-way 303, with its lower end moving in the T-shaped bottoms, as at 304, whereby to retain said base plate and the sewing machine mechanism in proper position as it is moved along the guide base. Mounted upon said base plate 310 is a top, or bearing plate, 313, supported at one corner by a side plate 313^a. Vertically mounted in said base plate 310, and said top or bearing plate 313, is a main operating shaft 314, Figs. 62 and 68, provided at its lower end, on the under side of the base plate 310, with a gear 315 and provided above said base plate with a small gear 316, as clearly shown in Figs. 62 and 68, and above the top plate 313, with a round cam member 317, having therein a cam groove 318, provided on top with a crank arm 319, which crank arm connects with a disk 320 above and at the lower end of a shaft, or spindle, 321, as clearly shown in Figs. 62 and 68. Mounted upon said spindle 321, is a sleeve 322, provided with a driving pulley 323 at its lower end, said sleeve 322 being mounted within another sleeve 324, and secured thereto at its upper end, as at 325. Said outer sleeve is provided with a laterally projecting arm 326, upon which is mounted a guide pulley, 327, for a driving belt 328, running from any desired source of power. Said outer sleeve 324 is supported upon an arm 329 at the upper end of a sleeve 330, mounted upon a supporting pin 331, and provided at its lower end with a projecting cam lug 330^a, shown in Fig. 69, and indicated in dotted lines Fig. 61, by which it is adapted to be intermittently lifted in a manner hereinafter described, whereby to lift the sleeves 322 and 324 and pulley 323, out of driving connection with the disk 320, with which it has a clutch connection as indicated in the drawings. This disk connects the driving pulley 323 with the sewing machine mechanism and allows said pulley to continue to run, while the sewing machine is standing still. At its lower end said sleeve 330 has mounted thereon a hook 330^b, shown in Figs. 61 and 69, held yieldingly in its normal position by means of a spring 330^c, and adapted to perform a function hereinafter referred to.

Projecting upwardly from the bearing plate 313, Figs. 62 and 63, are two bearing arms 332—332, having a bearing sleeve 333, mounted therebetween, projecting upwardly from which is an arm 334, connected by means of a ball and socket joint 335, to a pitman 336, connected at its opposite end with the crank arm 319, as at 337, between the cam member 317 and the disk 320. Also extending from said sleeve 333 is an operating arm 338, extending along the opposite side of the cam member 317, as shown in Figs. 61^B and 62, and connected at its end with a needle bar 339, supported in a sleeve 340, secured in a part of the bearing frame 313, shown in Figs. 61 and 61^B, said arm 338 being connected through a suitable slot extending longitudinally through the side of the sleeve 340, in the usual manner, whereby to vertically reciprocate said needle bar 339, from the connections just described. Said needle bar is provided at its lower end with the usual needle 341.

I will next describe the mechanism which operates to stop the sewing machine with the needle raised so that the cuff can be removed therefrom.

Referring to Figs. 68, 69, 70 and 71, the top, or bearing plate 313 has formed integrally therewith, a bearing sleeve 313^b, through which the shaft 314 extends. Mounted upon said sleeve above said bearing plate 313, is a disk-like member 350, having formed as a part thereof a sleeve 351 and provided on its under side with an annular recess 352. The hollow disk, or cam member, 317, is formed as a part of the upper end of the shaft 314, and sets down over the upper ends of the bearing sleeve 313^b, and the sleeve 351 in the manner clearly indicated in Fig. 68. Mounted upon the top plate 313 is a lug 353, shown in top plan view in Fig. 69, and provided with a laterally projecting stud 353^a. Mounted in the annular recess, or member, 352, in the under side of the member 350, is a coiled spring 354, one end of which fits over the stud 353^a, and the other end of which bears against a web portion 355, formed as a part of the member 350, said spring thus operating normally to hold said disk member 350 in the position indicated in Fig. 69, with said web portion 355 bearing yieldingly against the upstanding stud 353. At one side said disk-like member 350 is provided with a web-like extension 350ª, having formed at one side a wedge-like extension 350ᵇ, shown in side elevation in Fig. 61. Said extension 350ª also has at its outermost edge a shoulder, or notch, 350ᶜ, and a cam portion 350ᵈ, as clearly shown in Figs. 69 and 70.

Mounted upon said extension 350ª is a disk 356, upon the upper end of an operating spindle 357, having a bearing in said extension 350ª, said disk having a projecting cam finger 356ª and provided with upstanding studs, as 356ᵇ—356ᶜ—356ᵈ. Also mounted upon said disk and moving therewith is a curved cam finger 358, pivotally mounted upon a stud 359, upon said disk, said cam finger 358 having its short end formed to engage the stud 356ᵈ, as clearly indicated in Figs. 69 and 70, and being provided with a spring 359ª, upon the stud 359, adapted to normally move and hold said finger in the position shown in full lines, Figs. 69 and 70, shown also in Fig. 61. Also mounted upon said disk 356, is a pawl 360, upon a stud 361, provided with a coiled spring 362, operating to normally move the long end of said pawl 360, toward the stud 356ᵇ, as shown in Figs. 69 and 70. Said pawl 360, is provided with a lug 360ª, at its long end, at which end it is adapted also to bear against the stud 356ᵇ, under the tension of its spring 362. The curved cam finger 358, it will be noticed, underlies the pawl 360, which is adapted to be raised slightly, as indicated in dotted lines, Fig. 71, by said curved cam fingers 358, whereby the outer end of said pawl 360 passes over the end of said stud 356ᵇ, for a purpose hereinafter described.

The cam member 317, is provided at one side and at its lower edge with a notch 317ª, at the side of which, and on the inner side of the body, is a downwardly projecting lug 317ᵇ. When the disk 356 has been partially turned to the full line position shown in Fig. 70, the end of the curved cam finger projects underneath the edge of the cam member 317, in position to be engaged by the lug 317ᵇ, and by means of which said curved cam finger is moved to the dotted line position shown in Fig. 70, lifting the pawl 360 so that its outer end passes over the stud 356ᵇ, and permits the lug 360ª to enter the notch 317ª, thereby stopping said cam member 317, in the desired position with the thread take-up arm 338, in its up position. The momentum of the revolving cam member 317, as it is suddenly stopped by the pawl 360, entering the notch 317ª, is compensated for or taken up by the coiled spring 354, in the annular recess 352, in the under side of the member 350, the momentum being sufficient, however, to throw the extension 350ª, forwardly, until the notch 350ᶜ, in the outer end of said extension 350ª, is caught by the hook 330ᵇ, and by means of which said extension and said member 350 are held until the hook 330ᵇ, has been cammed off of the shoulder 350ᶜ, as the extension 350ª is thrown under the projecting lug 330ª, on the lower end of the sleeve 330, lifting the same and disconnecting the driving pulley 323 from the clutch 320, and thus stopping the sewing machine with the needle up.

The spindle 357, upon which the disk 356 is mounted and by means of which said disk is rotated intermittently in opposite directions, passes through the extension web or plate 350ª, and is provided under said plate with a knuckle joint 363, connecting it to a sleeve 364, telescoping with a rod 365, and made to turn therewith by means of a lug 366, moving in a slot 367 in said sleeve 364, said rod 365 being connected by means of a universal joint at 368, with an operating sleeve 369 anchored upon a stud 370, upon the base plate 310 of the sewing machine, as shown in Fig. 64. Said operating sleeve 369 is provided at one side with a segment 371 adapted to mesh with a corresponding segment 372, upon a short sleeve 373, mounted upon a stud 374, set in the base plate 310. Said segments 371 and 372 are provided with cam fingers 371ª and 372ª, adapted to be moved by means of a lug 375, upon a slide bar 376, so that when said slide bar 376, clearly shown in Fig. 64, is reciprocated in one direction or the other, it will, through the fingers 371ª and 372ª, oscillate the operating sleeve 369, and through its connections, 364 and 365, oscillate the disk 356.

The slide bar 376 is provided with two notches 376ª and 376ᵇ, as clearly shown in Figs. 61ᴬ and 64, adapted to be engaged by a spring-actuated plunger 377 and a sleeve 378, upon the end of an operating lever 379. Slidably mounted along the side of the bar 376, is a coöperating slide bar 380, adapted to slide freely in either direction just preceding each movement of the bar 376. Said bar 380 has oppositely inclined cam surfaces 380ª and 380ᵇ, shown in Figs. 61ᴬ and 64, adapted when the slide member 380 is moved to engage and lift the plunger 377, out of the notches 376ª or 376ᵇ, in the bar 376, for a purpose hereinafter described. The slide bar 376 is provided with a laterally projecting arm 381, shown in Fig. 64, which is attached to a spring-controlled plunger 382, moving in a casing 383, mounted on the base plate 310, and provided therein at its opposite ends with washers, as 384—384, between which is a spring 385, adapted to normally hold said spring-controlled plunger 382, and said slide bar 376 in their middle or normal positions, as shown in full lines of Fig. 64.

The lever 379 is pivotally mounted intermediate its ends upon the base plate 310, as at 379ª, and at its opposite end is connected by means of a link 386, to an arm 387, projecting from a cam ring 388, having at one side cam portions 389 and 390, with a cam recess 391, formed therebetween. Said cam ring is mounted upon a movable gear plate 392, provided at one edge with a slotted extension 393, into which the pin 394, which connects the link 386 with the arm 387, extends, whereby to move said gear plate 392, in opposite directions for a purpose hereinafter referred to. Mounted upon said gear plate 392 and moving therewith upon bearing studs 395, 396, and 397, are gears 398, 399 and 400. The gears 398 and 400 mesh with a larger gear 401, mounted upon an operating shaft 402, which extends through the base plate 310, and has a bearing at its upper end in the top plate 313, as at 403, Figs. 63 and 72. Gears 399 and 400 are adapted to be moved alternately into mesh with a gear 404 upon a shaft 405, mounted between the base plate 310 and the top plate 313, clearly shown in dotted lines in Fig. 62, said shaft 405 being also provided near its upper end with a gear 406, which meshes with the gear 316, on the shaft 314, which shaft is driven, as heretofore seen, from a pulley 323 above. Thus when the lever 379 is rocked to the dotted line position by means of the shift bar 376, in the manner hereinafter described, the gear plate 392 is moved so as to carry the gear 399 into mesh with the gear 404, and to carry gear 400 out of mesh with said gear 404, thus the gear 401 is driven from the gear 404 in one direction or the other, depending upon whether gear 400 or gear 399 is in mesh with gear 404. The gear plate 392 is provided with a notch 392$^a$, into the opposite ends of which is adapted to be inserted the holding ends of a curved rocker lever 407, mounted upon a spring-actuated plunger 408 in a casing 409 mounted upon the base plate 310. Said rocker lever 407, has cam portions as 407$^a$ formed above its points, or ends, and adapted to be engaged, respectively, by the cam portions 389 and 390, of the cam ring 388, as said cam ring is turned by means of the lever 379 and the link 386, whereby the cam portions 389 and 390 alternately cam the ends 407$^a$—407$^a$, out of the notch 392$^a$ in the gear plate 392, so as to permit said gear plate to be shifted from one position to another by the time the pin 394 in the end of the link 386 moves to the end of the slot 393, in said gear plate 392, for the purpose of shifting said gear plate. Thus the cam ring 388 is moved by the link 386, in each direction a sufficient distance to disengage the ends of the rocker arm 407 from the ends of the notch 392$^a$ in the gear plate 392, so as to permit said gear plate to be shifted for the purpose of reversing the direction of the gear 401, and its shaft 402. The shaft 402 is journaled at its upper end in the top plate 313, as shown in Fig. 72, and is provided near its upper end with a gear 410, having a sleeve 410$^a$, integral therewith, and provided with a ring nut 410$^b$, at its upper end. Said gear 410 is provided on its under side with a clutch member 411. Formed upon said shaft as a part is a double clutch portion 412, adapted to mesh in its up position with the clutch member 411, so as to turn the gear 410 therewith and with said shaft, and when said double clutch 412, is in its down position it meshes with a clutch member 413, on the gear 401, also mounted loosely upon said shaft 402, and having a reduced gear portion 401$^a$ formed as a part thereof, said gear 401 being adapted to drive said shaft when the clutch 412, is down in mesh with it. Said shaft 402 is also provided underneath the top plate 310, with a gear 414, projecting from an opening on the inner side of a sleeve or shell 415, and is adapted to mesh with the rack 302, on the sewing machine supporting and guide base 300. Thus when said shaft 402 is turned in one direction the gear 414, being in mesh with the rack 302, propels the sewing machine along said rack in one direction, and when said gear 414 is turned in the opposite direction, it propels said sewing machine in the opposite direction. The shaft 402, terminates in a reduced portion 402$^a$, below the gear 414, and is provided with a sleeve 416, having an annular flange 417, near its upper end, and provided with a ring nut 418, at its lower end, said shaft 402, being provided at its lower end with a ring nut 419. A washer 420 is placed around the sleeve 416, above said nut 418, and a washer 421 is placed around said sleeve under the annular flange 417, with a coiled spring 422 placed around said sleeve between said washers, as clearly indicated in Fig. 72. An inner sleeve, or shell 423, is placed around said coiled spring and said washers, within the outer shell 415, and is provided at its opposite ends with inturned flange portions which underlie and overlie, respectively, the washers 420 and 421. Said inner shell, or sleeve, 423, is provided at one side with a projecting stud 424, through a slot 425, extending longitudinally through one side of the outer sleeve 415. Said stud 424 is adapted to engage diamond shape cam lugs 426, mounted near the corners of the supporting and guide bases 300, of the sewing machine, as clearly shown in Fig. 1. Said diamond shape lugs 426 are so positioned that when said stud 424 is up, it will engage said stud and move it downwardly, and if said stud is down, it will engage it and move it up. In other words as the sewing machine turns the corner the stud is moved from one position to the other and then back again, operating through the spring 422 and its connections to the shaft 402, to move the clutch 412, out of engagement with the gear 410, and into engagement with the gear 401. Mounted around the sleeve 416, above its annular flange 417, is a sleeve or collar 427, provided with a laterally projecting finger 428. A rigid collar 429, is secured around the outer sleeve or shell 415, near the gear 414. Mounted upon said collar is a ring 430, provided with spaced notches 431—432, at opposite sides of said finger 428, said ring being provided at its opposite side with a lug 433, at the opposite side of which said ring is cut away as at 434 and 435. Said ring 430 is held in its normal position, shown in full lines, Fig. 74, by means of U-shaped springs 436 and 437, secured at their lower ends as at 438 and 439, to the sides of the outer casing 415, one end of each spring being held in the collar 429, and the other projecting through said collar and being connected with said ring 430, as indicated in dotted lines, Fig. 62, one of said springs operating to return the ring to its normal position when it has been turned in one direction, and the other spring operating to return said ring to its normal position when it has been turned in the opposite direction. Lugs 440, mounted on the supporting and guide base, one above each of the diamond shape lugs 426, operate to engage the lug 433, on the ring 430, as the sewing machine passes the same, thus operating to turn the ring 430, sufficiently to bring one of its notches 431, or 432, depending upon the direction the machine is traveling, into register with the finger 428, on the sleeve 427, so that as the stud 424 engages its diamond shape lug 426, and depresses stud 424, and its shell or sleeve 423, together with the shaft and the other mechanism within the outer shell 415, the finger 428 will pass through one of the notches 431, or 432, and thereby allow said shaft 402, and the mechanism thereon to be thrown downwardly, under the tension of the spring 422, to the dotted line position indicated in Fig. 72. This movement operates to move the clutch 412, from the gear 411, to the gear 413. When the sewing machine reaches the next diamond shape lug around the corner, the stud 424 will engage therewith, thus tensioning the spring 422, again in the opposite direction, so that as the lug 433 on the ring 430, engages the lug 440, said parts will be thrown back to their up position, as they pass said lug, thus again putting the clutch 412 in mesh with the clutch position of gear 411.

Referring now to Fig. 63, I will describe the gears by means of which the propelling or traveling speed of the sewing machine is thus changed around the corner of the supporting guide base 300, in order to maintain a uniformity of the stitches around the corner of the cuff. The sewing machine, each time it reaches a corner, is given a quick turn around the corner of the supporting and guide base, and turns on a pivotal axis which is near the longitudinal axis of the needle bar. This is accomplished by the entrance of the sewing machine web, or guide plate, 311, into the guide-way 307, of the turn block 306, in the manner hereinbefore described, the sewing machine being propelled by a gear 414, thereon which is in mesh with the rack 302, of the supporting and guide base 300.

Referring now more particularly to Figs. 62 and 63, the gear 406 is driven from the gear 316, on the driving shaft 314, shown in Fig. 62, thus driving the gear 404, on the shaft 405, as indicated in Figs. 62, 63, and 64. The drive from the gear 404, to the gear 401, on the shaft 402, is through the gear 400 and in the opposite direction from the drive through gears 398 and 399 when the gear plate 392 upon which said gears are mounted, is shifted by the lever 379, connected thereto by the link 386, as hereinbefore described. The small gear portion 401$^a$, of said gear 401, meshes with a large gear 441, on a sleeve 442, which sleeve is provided at its upper end with a small gear 443, secured thereto, said sleeve 442, with its gears 441 and 443, being mounted upon a bearing pin 444, between the base plate 310, and the top plate 313, as clearly indicated in Fig. 63. A double gear 445—446 is also mounted loosely upon said bearing pin 444, and a second double gear 447—448 is mounted upon a bearing pin or stud 449, supported in the top plate 313. The gear 443, on the sleeve 442, meshes with the gear 447, and the gear 448, meshes with the gear 445, while the upper or smaller gear 446, of said double gear 445—446, meshes with the gear 410.

Thus from the pulley 323, by means of which the sewing machine is driven, the gears 406 and 404 are driven, and through the gear connections on the shiftable gear plate 392, they drive the gear 401, in either direction, as the lever 379 is shifted from one position to the other by the slide bar 376, shown in Fig. 64. The two different speeds are transmitted to the shaft 402, on which is mounted the sewing machine propelling gear 414, in the sleeve 417, through the gears just described. If the clutch 412, which is secured to said shaft 402, is down in driving connection with the gear 401, then the drive of the shaft 402, is accomplished directly from the gears 399 or 400, depending upon the direction the machine is to travel, one of which is in mesh with said gear 401, and with said gear 404. If the clutch 412 has been lifted, in the manner hereinbefore described, as the machine is about to turn a corner of the supporting or guide base, then the propelling speed is increased for the reason that the drive of the shaft 402, which carries the propelling gear 414, is from the gear 399 or 400, depending upon the direction of travel, and then through the gears 401ª, 441, 443, 447, 448, 445, 446 and 410.

I will now describe the means for shifting the direction control lever 379, in order to put the gears 399 or 340, into mesh with the gear 404. As hereinbefore described, the end of said lever 379, is connected to the slide member 376, by means of the spring-actuated plunger 377, adapted to be seated in either one of the notches 376ª or 376ᵇ, so that said plunger 377, can be lifted from said notches by the coöperating slide member 380, having the inclined cam surfaces 380ª and 380ᵇ, adapted to engage and lift said plunger 377, in a manner clearly indicated in Fig. 61ᴬ.

Referring now to Figs. 76 and 77, there are pivotally mounted upon the opposite rear sides of the sewing machine supporting and guide base 300, at the opposite ends thereof, stop latches, or levers, 450 and 451, shown in top plan views in Fig. 76, and in rear view in Fig. 77. Said stop levers are provided intermediate their ends with bearing sleeves 450ª and 451ª, and are pivotally mounted upon bearing studs 450ᵇ and 451ᵇ, provided with heads as indicated. Coiled springs 452 and 453 are mounted upon said sleeves and bear against the heads on the studs 451ᵇ, and against the latch levers 450 and 451, so as to normally hold said latch levers against the side of the supporting and guide base 300, as shown at the lower side of Fig. 76. Said springs 452 and 453 are also so connected with said levers as to normally and yieldingly turn them on their pivotal bearings into engagement with the studs 450ᶜ and 451ᶜ. Pivotally mounted upon the top of the machine proper, near the lower ends of the stop levers 450 and 451, are holding levers 454—454, adapted to be held in their normal positions against stops 455—455 at one end, by means of springs 456—456.

As the sewing machine comes to either end of its travel, the ends of the slide bars 380 and 376, butt against one or the other of said stop latches 450 or 451, as the case may be, and by means of which stop levers, said slide bars 380 and 376 are moved longitudinally, in the order mentioned, against the tension of the spring-actuated plunger 382, which is connected to the slide bar 376, as hereinbefore referred to, and as clearly shown in Fig. 64. Said stop latch or lever 450 or 451, as the case may be, is pressed outwardly, in the manner indicated at the top of Fig. 76, as the machine comes to a stop, the movement of the slide bar 376 having moved the segments 371 and 372, and through their connections, as hereinbefore described, having stopped the sewing machine with the needle raised, by having disconnected the driving pulley 323. With the slide bars 376 and 380, and the latch 450 in these positions, as shown at the top of Fig. 76, and with the sewing machine standing still with the needle raised, the supporting and guide base 300 separates or expands in a manner hereinbefore described, carrying the sewing machine with it. As the latch lever 450, which is attached to the supporting base 300, moves away from the pivoted lever 454, on the top of the machine proper, said lever is thrown back into its normal position by its spring 456, and in the position shown at the bottom of Fig. 76. As the supporting base and guide member is closed, the lower end of the stop latch 450, butts against the end of the lever 454, and is moved into the position indicated in dotted lines, Fig. 77, thereby releasing the slide bar 376, and permitting it to be thrown back to its normal position, by reason of its connection through the spring-actuated plunger 382, thus shifting the gear plate 392 to change the direction of travel of the sewing machine, and at the same time, through the segments 371 and 372, which are moved by the cam lug 375 on said slide bar 376, throwing the sewing machine into gear by dropping the pulley 323 into driving engagement with the clutch disk 320, in the manner hereinbefore described. Thus as the sewing machine comes to either end of its travel, it is stopped by the mechanism just described, the supporting and guide base therefor is expanded during the removal of the cuff and the insertion of another into the sewing machine clamps, and then as said supporting and guide base closes, it automatically reverses the direction of the propelling gear and starts the sewing machine to operating the instant it starts upon its return trip.

I will next describe the thread cutter by means of which the thread is cut automatically after the sewing machine has reached either end of its travel just after the supporting and guide base members have separated or expanded, carrying the sewing machine with them and drawing the thread from the spool.

Mounted upon the sewing machine base plate 310, Figs. 62, 64 and 76, is a slide box 457, slidably mounted upon the base 310, between two upstanding lugs 310ª and 310ᵇ, said slide box having slidably mounted therein a rod 458, having a reduced portion within said box and provided thereon with a coiled spring 459, mounted between two washers 460 and 461, in the opposite ends of said box 457. Said slide box is mounted underneath a retaining bracket 462, secured to the base plate 310, by means of screws 463, as clearly indicated in Figs. 61, 62 and 64, said slide box having a front portion or plate 457ª, having therein a cam groove 457ᵇ, of inverted V-shape, clearly shown in Fig. 67. Said slide box is provided in its top with two notches 457ᶜ and 457ᵈ, adapted to receive the end of a dog 464, pivotally mounted upon the retaining bracket, as at 465, and being normally held forwardly in one of said notches 457ᶜ or 457ᵈ, by means of a spring 466, screwed to the base plate 310, as at 467.

Pivotally mounted upon the side of the casing 383, which is mounted upon the base plate 310, shown in face view Fig. 66, and in top plan view Fig. 64, are two angle formed cutting knives 468 and 469, pivotally connected at their angles or elbows, by means of a pin 470, which pin is extended and provided with a cam roller 471, adapted to work in the cam slot 457ᵇ, in the face plate 457ᵃ, of the slide box 457, so that if said slide box is moved from one position to the other, as indicated in dotted lines, Fig. 67, said cutting knives 468 and 469, will be thrown closed, as indicated in dotted lines, Fig. 66, and opened again, in a maner clearly indicated. The casing 383, within which works the spring-actuated plunger 382, has an upstanding work plate 383ᵃ, with a needle aperture 383ᵇ therethrough. A portion of one of the sewing machine clamps, designated 241, is shown in position above the slide box 457, and is provided with an aperture 241ᵃ therein, within which is pivotally mounted a stop dog 241ᵇ, adapted to engage the upstanding lug 464ᵃ, on the dog 464, as said sewing machine is moved away from said cuff supporting member, whereby to lift said dog 464, out of one of the notches 457ᶜ or 457ᵈ, in the slide box 457, in order to permit said slide box to be shifted between the lugs 310ᵃ and 310ᵇ, by its spring 459, for actuating the thread cutter blades 468 and 469.

As the sewing machine reaches either end of its travel, the rod 458 engages a fixed lug 473, one of which is mounted at each end of the rear side of the supporting and guide base 300, as clearly shown in Figs. 76 and 77. As said rod 458 butts against said stop lug 473, the spring 459, in the slide box 457, is compressed from one end or the other, as the case may be, by the movement of the rod 458, to the dotted line position indicated in Figs. 64 and 65, under which tensioned condition it is held at the time the supporting and guide base members commence to expand, carrying said sewing machine, with its base plate and the mechanism mounted thereon, with it from under the cuff clamp member 241, whereupon the lug 464ᵃ on the dog 464, engages the trip pawl 241ᵇ, and is thereby lifted out of one of the notches 457ᶜ, or 457ᵈ, whereby to release the slide box 457, in the face of which is the cam groove 457ᵇ, so as to allow it to be thrown by the spring 459, from one lug 310ᵃ, to the other lug 310ᵇ, on said base plate 310, and thereby cause the thread cutter plates to be thrown upwardly and closed, and downwardly again, in the manner hereinbefore described, thus cutting the thread which has been stretched across above the thread cutter, as the sewing machine has been moved away from the cuff. When the sewing machine reaches the other end of its course of travel, the opposite end of the rod 458, engages the stop lug 473, at the opposite side of the supporting and guide base, thereby compressing the spring 459 from its other end, so that as the sewing machine again moves away from the cuff, after finishing its sewing trip, the releasing dog 464, is again tripped, as before described, and the slide box is thrown in the opposite direction, again actuating the thread cutter, in the same manner as just described.

I have also provided means for automatically releasing the tension on the thread at the time the sewing machine stops and the supporting and guide bases spread and carry the sewing machine away from the cuff pulling the thread with it, as hereinbefore described. I accomplish this by providing a curved prong 330ᵈ, upon the back of the finger 330ᵇ, which prong 330ᵈ, is so shaped and positioned that it enters between the tension disks 475, on a thread guide bar 476, when the hooked finger 330ᵇ is forced outwardly, as hereinafter described.

The bobbin 477 of the sewing machine is mounted upon the upper end of a shaft 478, which is provided with a gear 479, positioned to be driven from the gear 315.

While I have shown and described in detail one practical embodiment of my invention, in a machine which is adapted to automatically make cuffs from material blanks fed thereto, I am aware that many changes and improvements can possibly be made therein, as the result of mechanical skill and study, and I do not, therefore, limit my invention to the particular mechanisms shown and described for performing the different steps in the automatic manufacture of a cuff, or similar article, made from a plurality of plies or material blanks, except as I may be limited by the hereto appended claims.

I claim:

1. An automatic cuff making machine comprising in combination, means for receiving and holding a plurality of the plies, or material blanks, a traveling sewing mechanism with means for operating the same around the edges of said blanks, means for turning said sewed article inside out and for passing it forwardly, means for receiving and holding said article for a second sewing, a second traveling sewing mechanism with means for operating the same around the edges of said article, and means for delivering said article from the machine.

2. An automatic cuff making machine comprising in combination, means for receiving and holding a plurality of material blanks together flatwise with their edges projecting therefrom, a traveling sewing mechanism with means for operating the same around the exposed edges of said blanks, means for turning the sewed article inside out and passing it forwardly, means for receiving and holding said turned article, means for turning the unsewed edges inwardly, a second traveling sewing mechanism with means for operating the same around the sewed edges of said turned article, and means for delivering said article from the machine.

3. An automatic cuff making machine comprising in combination, clamping members adapted to receive and hold a plurality of material blanks flatwise therebetween, with their edges exposed, means for automatically closing said members, a traveling sewing mechanism with means for automatically operating the same around the exposed edges of said blanks, means for opening said clamping members, means for automatically turning said article inside out and for passing it forwardly, means for receiving and holding it for a second sewing, and sewing mechanism for sewing said article a second time around its edges, and means for automatically releasing and delivering said article from said machine.

4. In a machine of the character referred to, in combination, means for receiving and holding material blanks, operating mechanism for turning the same one upon the other flatwise and for passing them forwardly, clamping members for receiving and holding said material blanks together with their edges exposed, means for operating the same, sewing mechanism adapted to sew the edges of said blanks, means for operating the same, means for automatically removing said sewed article and for turning it inside out, mechanism adapted to fold inwardly the unsewed edges of said blanks, means for automatically pressing the same, mechanism for again clamping said article for a second sewing, means for automatically transferring said article from the pressing members to said clamping mechanism, sewing mechanism adapted to again sew the edges of said turned article, means for operating the same around the edges thereof, and means for delivering said sewed article from said machine.

5. A machine of the character referred to, comprising a pair of holding clamps adapted to receive and hold therebetween plies or material blanks with their edges exposed, means for automatically closing the same, a traveling sewing machine with means for automatically starting and operating the same around the edges of said material blanks, means for opening said clamping members, means for automatically removing the sewed article and for turning it inside out, means carrying it forwardly, pressing members adapted to receive and press the same, means for closing and opening said pressing members, means for removing said article from said pressing members and transferring it, a second clamping mechanism adapted to receive said article from said transfer means, means for operating the same, a second sewing machine mechanism adapted to be operated around the edges of said article, means for automatically operating the same, and means for removing said article from said pressing members, substantially as described.

6. In a machine of the character referred to, means for receiving and holding material blanks with their edges exposed, a traveling sewing mechanism adapted to travel around and sew the edges of said blanks at their ends and along one side, means for operating the same, means for removing said blanks and for turning them inside out, means for passing them forwardly, pressing members adapted to receive and press said turned blanks, infolding members coöperating with said pressing members and adapted to turn the rear unsewed edges of said blanks inwardly, means for operating said pressing mechanism, means for removing and transferring said article, a second clamping mechanism adapted to receive and hold the same with its edges exposed, a traveling sewing machine with means for operating the same around the edges of said article, and means for removing said article from said clamping means.

7. In a machine of the character referred to, clamping members adapted to receive therebetween, flatwise, a plurality of material blanks, means operating between said blanks to give a fullness to one side thereof, means for automatically operating said clamping members, and a traveling sewing mechanism with means for operating the same around the edges of said material blanks while they are held between said clamping members.

8. In a machine of the character described, in combination, clamping members adapted to receive therebetween material blanks with their edges exposed, one of said clamping members having a yielding bearing part, a member operating between the material blanks and between said clamping members to give a fullness to one of said material blanks, means for operating the same automatically, means for automatically operating said clamping members, a traveling sewing machine adapted to automatically travel around the edge of said material blanks and to sew the same, and means for operating said sewing machine.

9. In a machine of the character referred to, a pair of clamping members with means for automatically opening and closing the same flatwise together, one of said clamping members having an inner yielding bearing part, a filler member adapted to be moved edgewise between said clamping members and to depress said yielding part as said clamping members are closed together, and means for automatically operating the same, for the purpose indicated.

10. In a machine of the character described, a pair of clamping members adapted to be intermittently closed together flatwise, one of said clamping members having a yielding portion forming a part of its bearing face, and means for automatically operating said clamping members.

11. In a machine of the character referred to, means adapted to receive and hold plies, or material blanks, a traveling sewing machine mechanism with means for propelling the same around the edges of said blanks, means for automatically starting said sewing machine, means for operating said sewing machine as it travels, and means for stopping said sewing machine at the end of its travel with its needle up, whereby to permit the withdrawal of said sewed article.

12. In a machine of the character referred to, clamping means for receiving and holding material blanks with their edges exposed, means for automatically opening and closing the same, a traveling sewing machine mounted to travel bodily around the edges of said blanks and to sew the same, means for propelling said sewing machine, means for automatically starting said sewing machine, means for operating said sewing machine as it travels, means for automatically stopping said sewing machine at the end of its travel with its needle up, and means for releasing said sewed article, whereby to permit its removal from said clamping means.

13. In a machine of the character referred to, a pair of clamping members with means for automatically opening and closing the same, one of said clamping members having a yielding bearing portion, means for feeding a plurality of material blanks into said clamping members, and a filler member with means for automatically and intermittently moving the same edgewise into and out of said clamping members and between the plies or material blanks therein, for the purpose referred to.

14. In a machine of the character referred to, a pair of clamping members, one of said clamping members having a yielding bearing face, means for automatically operating said clamping members, a filler member adapted to be moved edgewise into and out of position between said clamping members, means for automatically operating the same, and independent means for automatically feeding material blanks to said clamping members.

15. In a machine of the character referred to, a pair of clamping members, one of said clamping members having a yielding bearing face, means for automatically operating said clamping members, a filler member adapted to be moved into and out of position between said clamping members, means for automatically operating the same, means for automatically feeding material blanks to said clamping members, and a traveling sewing machine with means for automatically starting and operating the same around the edges of said blanks and stopping the same with the needle up, whereby to permit the removal of the sewed article.

16. In a machine of the character referred to, a pair of clamping members, one of said clamping members having a yielding bearing face, means for automatically operating said clamping members, a filler member adapted to be moved into and out of position between said clamping members, means for automatically operating the same, means for automatically feeding material blanks to said clamping members, a traveling sewing machine with means for automatically starting and operating the same around the edges of said blanks and stopping the same with the needle up, whereby to permit the removal of the sewed article, means for automatically removing said sewed article from said clamping members and for transferring them forwardly in said machine, pressing members adapted to receive and press the same, and means for automatically operating said pressing members.

17. In a machine of the character referred to, a pair of clamping members, one of said clamping members having a yielding bearing face, means for automatically operating said clamping members, a filler member adapted to be moved into and out of position between said clamping members, means for automatically operating the same, means for automatically feeding material blanks to said clamping members, a traveling sewing machine with means for automatically starting and operating the same around the edges of said blanks and stopping the same with the needle up, whereby to permit the removal of the sewed article, means for automatically removing said sewed article from said clamping members and for transferring them forwardly in said machine, pressing members adapted to receive and press the same, means for automatically operating said pressing members, and inturning members coöperating with the said pressing members and means for automatically operating the same to turn the rear or unsewed edges of said article inwardly for the pressing operation.

18. In a machine of the character referred to, a pair of clamping members, one of said clamping members having a yielding bearing face, means for automatically operating said clamping members, a filler member adapted to be moved into and out of position between said clamping members, means for automatically operating the same, means for automatically feeding material blanks to said clamping members, a traveling sewing machine with means for automatically starting and operating the same around the edges of said blanks and stopping the same with the needle up, whereby to permit the removal of the sewed article, means for automatically removing said sewed article from said clamping members and for transferring them forwardly in said machine, pressing members adapted to receive and press the same, means for automatically operating said pressing members, inturning members adapted to turn the rear or unsewed edges of said article inwardly for the pressing operation, means for automatically removing said article from said pressing members and for transferring them in the machine, clamping members adapted to receive the same with means for automatically operating said clamping members upon said sewed article, a second traveling sewing mechanism, and means for automatically starting and operating the same around the edges of said article, substantially as described.

19. In a machine of the character referred to, clamping means adapted to receive and hold a plurality of plies or material blanks, means coöperating therewith to give a fullness to one of said plies or material blanks, means for automatically sewing said plies or material blanks around their edges, means for automatically turning the sewed article inside out, a follower member with means for automatically moving the same into said turned article, and means coöperating therewith to form the edges of said turned article beyond the seam thereof, and means for automatically holding and resewing said article with the seam of the first mentioned sewing visible on one side only thereof.

20. In an automatic cuff making machine, means for holding the plies of material together, means for sewing the same together around their edges, means for turning the same so as to form the fold around the outside of the sewed seam, whereby said seam shows on one side only, and means for resewing said article around its edges, whereby only one seam shows on one side of said cuff.

21. An automatic cuff making machine comprising in combination means for holding a plurality of plies or material blanks, means for sewing the same around three edges thereof, means for turning the same, whereby to form the fold outside of said sewed seam, means for turning the unsewed edges inwardly, and means for resewing said article around its sewed edges so that one seam only shows on one side of said article.

22. The method of mechanically and automatically making articles of the character referred to, which consists in holding a plurality of plies or material blanks flatwise together, and automatically sewing the same together around some of their edges, then automatically turning the same inside out so as to form the folded edge outside or beyond the sewed seam, and then automatically resewing said article around its edges, whereby to hold said first seam inwardly from the outermost edge of said article, with only one seam visible on the right side of said article.

23. The method of mechanically and automatically making articles of the character referred to, which consists in holding a plurality of plies of material blanks flatwise together with one of said plies or material blanks slightly fuller than the other, then sewing the same around their ends and along one side, then turning the article inside out with the fuller ply or material blank folded to form the outermost edge of the article with the sewed seam inwardly therefrom on one side, and then automatically resewing the sewed and turned edges of said article, with the first seam invisible from the right side of the article.

24. A machine adapted to automatically manufacture articles of the character referred to, comprising in combination, means adapted to automatically receive and hold a plurality of plies or material blanks flatwise together, means for automatically sewing the same together around their edges, means for automatically turning the same inside out and for forming the edge-fold in one of the outer plies, whereby said sewed seam is inwardly from the edge-fold on one side, means for automatically holding said turned article with its edges exposed, and means for automatically resewing said article around its edges with one seam only visible on the right side of said article.

25. A machine adapted to automatically manufacture articles of the character referred to, comprising in combination, means adapted to automatically receive and hold a plurality of plies or material blanks flatwise together, means for automatically sewing the same together around their edges, means for automatically turning the same inside out and for forming the edge fold in one of the outer plies, whereby said sewed seam is inwardly from the edge-fold on one side, means for turning the selvage or unsewed edges of said plies or material blanks inwardly, means for automatically holding said turned article with its edges exposed, and means for automatically resewing said article around its edges with one seam only visible on the right side of said article.

26. A machine adapted to automatically manufacture articles of the character referred to, comprising in combination, means adapted to automatically receive and hold a plurality of plies or material blanks flatwise together, means for automatically sewing the same together around their edges, means for automatically turning the same inside out and for forming the edge-fold in one of the outer plies, whereby said sewed seam is inwardly from the edge-fold on one side, means for turning the selvage or unsewed edges of said plies or material blanks inwardly, means for automatically pressing said turned and folded article, means for automatically removing said article therefrom, means for automatically receiving and holding said article with its edges exposed, and means for automatically resewing said article around its edges with one seam only visible on the right side of said article.

27. In a machine of the character referred to, in combination, feeding members adapted to receive and hold a plurality of material blanks, clamping mechanism carried thereby, means for operating said feeding members to turn said material blanks flatwise together and to carry them forwardly, clamping members adapted to receive said material blanks from said feeding members, means for automatically operating said clamping members upon said material blanks, means for operating said feeding members to release said material blanks and to return said feeding members to a loading position, a traveling sewing machine adapted to travel around and sew the edges of said material blanks, means for automatically operating the same, means for automatically removing said material blanks from said clamping members and for turning the same inside out, means for pressing the same, means for automatically removing said material blanks from said pressing means, clamping members adapted to receive said article and to hold the same for a second sewing operation, and a sewing mechanism with means for automatically operating the same around the edges of said article, and means for automatically delivering said article from said clamping members.

28. In a machine of the character referred to, in combination, feeding members adapted to receive material blanks, clamping mechanism carried thereby with means for operating the same to hold said blanks in place, means for turning said feeding members and said material blanks flatwise together and for moving them forwardly, clamping members adapted to automatically open to receive said feeding members, means for automatically closing said clamping members, means for automatically operating said feeding members to release said material blanks and to return said feeding members to their loading positions, a traveling sewing mechanism and means for automatically operating the same around the edges of said material blanks, means for automatically removing said sewed material blanks from said clamping members and for automatically turning the same inside out, means adapted to be automatically inserted into said sewed article for forming the turned edges thereof, pressing members with means for heating the same, means for moving said turned article thereinto, means for turning the rear unsewed edges of said article inwardly, means for operating said pressing members, means for removing said article from said pressing members and for transferring it to holding clamps, holding clamps adapted to receive the same with means for operating them, and a second sewing machine adapted to be automatically operated around the edges of said article to resew the same, substantially as described.

29. A machine of the character referred to comprising in combination, means for automatically receiving and holding in flatwise condition a plurality of plies of material with their edges exposed, a supporting and guide base thereunder, a sewing machine mounted to travel on said base and to sew the edges of said plies of material, means for automatically starting, operating and stopping said sewing machine, means for automatically reversing the direction of travel of said sewing machine, means for removing the sewed article from said clamping means and for turning it inside out, means for passing it forwardly during the turning operation thereof, pressing members adapted to receive and press the same, inturning members with means for operating the same for turning the unsewed edges of said article inwardly, means for operating said pressing members, means for resewing said article around its edges, substantially as described.

30. In a machine of the character described, a traveling sewing mechanism having needle bar and thread tensioning mechanism, means for propelling said sewing machine bodily in opposite directions, means for automatically changing the direction of travel, means for automatically starting said sewing machine, means for automatically stopping the same with the needle up, and means for automatically releasing the tensioning on the thread thereof.

31. A machine of the character referred to comprising in combination, feeding members adapted to receive and hold a plurality of material blanks or plies, clamping means carried thereby for securing said blanks in place, means for automatically operating said clamping means, means for automatically operating said feeding members to expand the same and to turn them and said material blanks flatwise together, one upon the other, and to carry them forwardly, clamping members adapted to receive said material blanks from said feeding members, means for automatically operating said clamping members upon said material blanks, means for automatically releasing said material blanks in said feeding members and for returning said feeding members to their receiving position, a traveling sewing machine adapted to travel around and sew the edges of said material blanks, means for propelling said sewing machine around the edges of material blanks, means for automatically operating said sewing mechanism, means for automatically opening said clamping members to release said blanks, means for automatically removing the sewed article from said clamping members and for turning the same inside out, means for automatically receiving and pressing the same, means for heating said pressing members, a second clamping mechanism adapted to receive said article, means for automatically transferring said article thereto, means for automatically closing said second clamping mechanism, a second sewing machine adapted to travel around and resew the edges of said article, means for automatically operating the same, and means for automatically delivering said sewed article from said clamping members.

32. In a machine of the character referred to, means for turning an article inside out, comprising a pair of swinging jaws adapted to grip the opposite sides of the article to be turned, means for swinging the same inwardly between the plies of the material, whereby to carry the gripped ends therewith, and means for spreading the plies, whereby to permit said turning jaws to move therebetween, substantially as described.

33. In a machine of the character referred to, turning mechanism for automatically turning an article inside out, comprising a pair of spaced gripping jaws adapted to grip the opposite ends of the article to be turned, means for moving and turning the same, whereby to swing the ends inwardly toward each other, means for spreading the plies, loop members coöperating with said gripping jaws and adapted to move between the plies of said article, means for moving the same, whereby said gripping jaws move through said loops and turn said articles inside out, substantialy as described.

34. In a machine of the class described, in combination, means for supporting a cuff, collar, or like piece of work having a seam at one edge thereof, and means for coaction with the first-mentioned means to turn the work and bead the seam thereof.

35. In a machine of the class described, means for turning a cuff, collar or like work, and a beading press for beading an edge of the work, an element of the first-mentioned means constituting means for delivering the work from the turning means to the beading press.

36. In a machine of the class described, means for turning a cuff, collar or like work, and beading and pressing means, an element of the first-mentioned means constituting means for delivering the work from the turning means to the beading and pressing means.

37. In a machine of the class described, means for turning a cuff, collar or like work, means for beading an edge of the work, an element of the first-mentioned means constituting means for delivering the work from the first to the second mentioned means, and means for finally pressing the work.

Signed at Portland, Multnomah county, Oregon, this 3rd day of May, 1915.

OMAR A. WHEELER.

Witneses:
I. M. GRIFFIN,
F. A. BULLINGTON.